US012802641B2

(12) United States Patent
Lee et al.

(10) Patent No.: US 12,802,641 B2
(45) Date of Patent: Nov. 17, 2026

(54) DISPLAY PANEL AND DISPLAY DEVICE INCLUDING THE SAME

(71) Applicant: LG DISPLAY CO., LTD., Seoul (KR)

(72) Inventors: Dong Kyu Lee, Paju-si (KR); Guen Sik Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/304,495

(22) Filed: Aug. 19, 2025

(65) Prior Publication Data

US 2026/0094570 A1 Apr. 2, 2026

(30) Foreign Application Priority Data

Sep. 27, 2024 (KR) ........................ 10-2024-0131260

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0819* (2013.01); *G09G 2310/0213* (2013.01); *G09G 2310/08* (2013.01); *G09G 2320/0247* (2013.01); *G09G 2320/028* (2013.01); *G09G 2330/021* (2013.01)

(58) Field of Classification Search
CPC ......... G09G 3/3233; G09G 2310/0213; G09G 2300/0819; G09G 2310/08; G09G 3/32; G09G 2320/0247; G09G 2320/028; G09G 2330/021
See application file for complete search history.

(56) References Cited

U.S. PATENT DOCUMENTS

| | | | | |
|---|---|---|---|---|
| 2012/0127064 | A1 | 5/2012 | Kawano et al. | |
| 2016/0224157 | A1* | 8/2016 | Yang | G06F 3/04184 |
| 2016/0335937 | A1* | 11/2016 | Lee | G09G 3/3233 |
| 2022/0399529 | A1 | 12/2022 | Shin et al. | |
| 2023/0144298 | A1 | 5/2023 | Koo et al. | |
| 2023/0217763 | A1 | 7/2023 | Hong et al. | |
| 2024/0196649 | A1 | 6/2024 | Song et al. | |
| 2024/0212576 | A1* | 6/2024 | Lee | G09G 3/2007 |

(Continued)

FOREIGN PATENT DOCUMENTS

| | | | |
|---|---|---|---|
| JP | 2008-304715 | A | 12/2008 |
| JP | 2012-109137 | A | 6/2012 |
| JP | 2021-138342 | A | 9/2021 |

(Continued)

*Primary Examiner* — Muhammad N Edun
(74) *Attorney, Agent, or Firm* — Morgan, Lewis & Bockius LLP

(57) ABSTRACT

A display panel of one or more examples includes sub-pixels. Each of the sub-pixels includes a first driver configured to receive a pixel driving voltage, a first pixel data voltage, and a plurality of gate signals as input and supply a current to a first light-emitting element, a second driver configured to receive the pixel driving voltage, a second pixel data voltage, and a plurality of gate signals as input and supply a current to a second light-emitting element, and a shared switch part that includes a plurality of transistors connected to the first driver and the second driver, and is configured to receive the first pixel data voltage and the second pixel data voltage as input. A display device including a display panel is also disclosed.

17 Claims, 34 Drawing Sheets

(56) References Cited

U.S. PATENT DOCUMENTS

| | | | | |
|---|---|---|---|---|
| 2024/0257769 | A1* | 8/2024 | Kim | G09G 3/3233 |
| 2024/0260424 | A1 | 8/2024 | Mun et al. | |

FOREIGN PATENT DOCUMENTS

| | | | |
|---|---|---|---|
| JP | 2024-82251 | A | 6/2024 |
| JP | 2024-109115 | A | 8/2024 |
| KR | 10-2022-0165958 | A | 12/2022 |
| KR | 10-2023-0067896 | A | 5/2023 |
| KR | 10-2023-0102365 | A | 7/2023 |

* cited by examiner

DISPLAY PANEL AND DISPLAY DEVICE INCLUDING THE SAME

CROSS-REFERENCE TO RELATED APPLICATIONS

This application claims the benefit of and priority to Korean Patent Application No. 10-2024-0131260, filed Sep. 27, 2024, the entire contents of which are incorporated herein by reference for all purposes.

BACKGROUND

1. Technical Field

The present disclosure relates to a display panel and a display device including the same, and more specifically, for example, without limitation, to a display panel capable of varying a viewing angle and a display device including the same.

2. Description of Related Art

A variable viewing angle technology is being applied to display devices. The variable viewing angle technology allows video content or visual information reproduced on a display device to be visible only to a user within a narrow viewing angle range, or to multiple users within a wide viewing angle range.

As the market for future vehicles such as electric vehicles and autonomous vehicles expands, the demand for in-vehicle display devices is growing rapidly. Research is being conducted on how to split the screen of an in-vehicle display device so that one portion of the screen is controlled at a narrow viewing angle and another portion is controlled at a wide viewing angle. This technology can display private content or information that only a specific user can see on pixels driven at the narrow viewing angle, while displaying shared content that multiple users can view together on the pixels driven at the wide viewing angle. To achieve this, a pixel technology that can freely control each pixel at the narrow viewing angle and the wide viewing angle is required.

The description provided in the description of related art section should not be assumed to be prior art merely because it is mentioned in or associated with the description of related art section. The description of related art section includes information that describes one or more aspects of the subject technology, and the description in this section does not limit the present disclosure.

SUMMARY

Embodiments of the present disclosure solve the above-described shortcomings and/or problems.

One or more aspects of the present disclosure provide a display device capable of separating a viewing angle for pixel data of different contents without adding a channel of a data driver in each pixel and enhancing a privacy protection function.

The problems addressed by the embodiments of the present disclosure are not limited to those described above, and other problems not described will be clearly understood by those skilled in the art from the following description.

A display panel according to one embodiment includes: a plurality of data lines; a plurality of gate lines; a plurality of power lines; a plurality of mode selection lines; and a plurality of sub-pixels. Each of the plurality of sub-pixels includes: a first light-emitting element, a second light-emitting element, a first driver configured to receive a pixel driving voltage, a first pixel data voltage, and a plurality of gate signals as input and supply a current to the first light-emitting element, a second driver configured to receive the pixel driving voltage, a second pixel data voltage, and a plurality of gate signals as input and supply a current to the second light-emitting element, and a shared switch part configured to supply the first pixel data voltage to the first driver and supply the second pixel data voltage to the second driver.

The display panel may include: a wide viewing angle lens that overlaps a light emission area of the first light-emitting element; and a narrow viewing angle lens that overlaps a light emission area of the second light-emitting element.

The first driver may include: a first driving transistor that includes a gate electrode connected to a first node, a first electrode connected to a second node, and a second electrode connected to a third node, and is configured to drive the first light-emitting element in a first refresh frame period; a first capacitor connected between a first voltage node to which the pixel driving voltage is applied and the first node; a first switch transistor that is connected between the first node and the third node, and is turned on in response to a gate high voltage of a first scan signal and turned off in response to a gate low voltage of the first scan signal; a second switch transistor that is connected between the first node and a third voltage node to which an initialization voltage is applied, and is turned on in response to a gate high voltage of a fourth scan signal and turned off in response to a gate low voltage of the fourth scan signal; and a third switch transistor that is connected between the third node and a fourth node, and is turned on in response to a gate low voltage of a second light emission signal and turned off in response to a gate high voltage of the second light emission signal. The first light-emitting element may include an anode electrode connected to the fourth node and a cathode electrode connected to a second voltage node to which a cathode voltage is applied.

The second driver may include: a second driving transistor that includes a gate electrode connected to a fifth node, a first electrode connected to the second node or an eighth node, and a second electrode connected to a sixth node, and is configured to drive the second light-emitting element in a second refresh frame period; a second capacitor connected between the first voltage node and the fifth node; a fourth switch transistor that is connected between the fifth node and the sixth node, and is turned on in response to a gate high voltage of a fifth scan signal and turned off in response to a gate low voltage of the fifth scan signal; a fifth switch transistor that is connected between the fifth node and the third voltage node, and is turned on in response to a gate high voltage of a sixth scan signal and turned off in response to a gate low voltage of the sixth scan signal; and a sixth switch transistor that is connected between the sixth node and a seventh node, and is turned on in response to a gate low voltage of a third light emission signal and turned off in response to a gate high voltage of the third light emission signal. The second light-emitting element may include an anode electrode connected to the seventh node and a cathode electrode connected to the second voltage node.

The shared switch part may include: a seventh switch transistor that is connected between one data line and the second node, and is turned on in response to a gate low voltage of a second scan signal and turned off in response to a gate high voltage of the second scan signal; an eighth switch transistor that is connected between the second node and a fifth voltage node to which an on-bias voltage is applied, and is turned on in response to a gate low voltage of a third-first scan signal and turned off in response to a gate high voltage of the third-first scan signal; a ninth switch transistor that is connected between the first voltage node and the second node, and is turned on in response to a gate low voltage of a first light emission signal and turned off in response to a gate high voltage of the first light emission signal; a tenth switch transistor that is connected between the fourth node and a fourth voltage node to which an anode reset voltage is applied, and is turned on in response to a gate low voltage of a third-second scan signal and turned off in response to a gate high voltage of the third-second scan signal; and an eleventh switch transistor that is connected between the seventh node and the fourth voltage node, and is turned on in response to the gate low voltage of the third-second scan signal and turned off in response to the gate high voltage of the third-second scan signal. Pulses of the third-first scan signal and the third-second scan signal may be sequentially generated as the gate low voltage. The first pixel data voltage may be applied to the data line in the first refresh frame period, and the second pixel data voltage may be applied to the data line in the second refresh frame period.

The shared switch part may include: a seventh switch transistor that is connected between a first data line and the second node, and is turned off in response to a gate low voltage of a second-first scan signal and turned off in response to a gate high voltage of the second-first scan signal; an eighth switch transistor that is connected between a second data line and the eighth node, and is turned on in response to a gate low voltage of a second-second scan signal and turned off in response to a gate high voltage of the second-second scan signal; a ninth switch transistor that is connected between the second node and a fifth voltage node to which an on-bias voltage is applied, and is turned on in response to a gate low voltage of a third-first scan signal and turned off in response to a gate high voltage of the third-first scan signal; a tenth switch transistor that is connected between the first voltage node and the second node, and is turned on in response to a gate low voltage of a first light emission signal and turned off in response to a gate high voltage of the first light emission signal; an eleventh switch transistor that is connected between the second node and the eighth node, and is turned on in response to the gate low voltage of the first scan signal and turned off in response to the gate high voltage of the first scan signal; a twelfth switch transistor that is connected between the fourth node and a fourth voltage node to which an anode reset voltage is applied, and is turned on in response to a gate low voltage of a third-second scan signal and turned off in response to a gate high voltage of the third-second scan signal; and a thirteenth switch transistor that is connected between the seventh node and the fourth voltage node, and is turned on in response to the gate low voltage of the third-second scan signal and turned off in response to the gate high voltage of the third-second scan signal. Pulses of the third-first scan signal and the third-second scan signal may be sequentially generated as the gate low voltage. The eleventh switch transistor may be turned on when the first switch transistor is turned off, and the eleventh switch transistor may be turned off when the first switch transistor is turned on.

The shared switch part may include: a seventh switch transistor that is connected between a first data line and the second node, and is turned on in response to a gate low voltage of a second-first scan signal and turned off in response to a gate high voltage of the second-first scan signal; an eighth switch transistor that is connected between a second data line and the eighth node, and is turned on in response to a gate low voltage of a second-second scan signal and turned off in response to a gate high voltage of the second-second scan signal; a ninth switch transistor that is connected between the second node and a fifth voltage node to which an on-bias voltage is applied, and is turned on in response to a gate low voltage of a third-first scan signal and turned off in response to a gate high voltage of the third-first scan signal; a tenth switch transistor that is connected between the first voltage node and the second node, and is turned on in response to a gate low voltage of a first light emission signal and turned off in response to a gate high voltage of the first light emission signal; an eleventh switch transistor that is connected between the fourth node and a fourth voltage node to which an anode reset voltage is applied, and is turned on in response to a gate low voltage of a third-second scan signal and turned off in response to a gate high voltage of the third-second scan signal; and a twelfth switch transistor that is connected between the seventh node and the fourth voltage node, and is turned on in response to the gate low voltage of the third-second scan signal and turned off in response to the gate high voltage of the third-second scan signal. Pulses of the third-first scan signal and the third-second scan signal are sequentially generated as the gate low voltage.

The display panel may further include: a data switch part configured to apply the first pixel data voltage to the first data line and a park voltage to the second data line in the first refresh frame period, and apply the second pixel data voltage to the second data line and the park voltage to the first data line in the second refresh frame period.

The data switch part may include: first and second transistors connected in series between a first input node and the first data line; third and fourth transistors connected in series between a second input node and the first data line; fifth and sixth transistors connected in series between the first input node and the second data line; and seventh and eighth transistors connected in series between the second input node and the second data line; wherein the first and seventh transistors are turned on in response to a gate on voltage of a first selection signal from a first selection line among the plurality of mode selection lines, and are turned off in response to a gate off voltage of the first selection signal. The third and fifth transistors may be turned on in response to a gate on voltage of a second selection signal from a second selection line among the plurality of mode selection lines, and are turned off in response to a gate off voltage of the second selection signal. The second and sixth transistors may be turned on in response to a gate on voltage of a third selection signal from a third selection line among the plurality of mode selection lines, and are turned off in response to a gate off voltage of the third selection signal. The fourth and eighth transistors may be turned on in response to a gate on voltage of a fourth selection signal from a fourth selection line among the plurality of mode selection lines, and are turned off in response to a gate off voltage of the fourth selection signal.

One or more of the first light-emitting element and the second light-emitting element may emit light in at least one of the first refresh frame period, the second refresh frame period, and a skip frame period during which pixel data is not updated.

A display device according to one embodiment includes: a display panel including a plurality of sub-pixels; a data driver configured to supply data voltages to data lines; and a gate driver configured to supply gate signals to gate lines.

One or more of the first light-emitting element and the second light-emitting element may emit light in at least one of the first refresh frame period, the second refresh frame period, and a skip frame period during which pixel data is not updated.

According to the embodiments of the present disclosure, it is possible to adjust the viewing angle of the pixels according to the user's usage environment and the need for privacy protection of private content. Therefore, the present disclosure provides a display device capable of not only achieving low power and process optimization, but also separating pixel data of private content and pixel data of shared content in each pixel and enhancing a privacy protection function.

According to the embodiments of the present disclosure, it is possible to protect privacy by reproducing a video of private content requiring privacy protection with a narrow viewing angle without interfering with watching a video of shared content.

According to the embodiments of the present disclosure, since it is possible to reproduce a video of shared content with a wide viewing angle and reproduce a video of private content with a narrow viewing angle in one pixel, it is possible to prevent a phenomenon that some pixels have a black grayscale, that is, look black when a wide viewing angle video and a narrow viewing angle video are displayed together.

According to the embodiments of the present disclosure, it is possible to reproduce shared content and private content with different viewing angles in pixels without increasing data lines and the number of channels of a data driver.

The effects of the present disclosure are not limited to the effects described above, and other effects not described will be understood by those skilled in the art from the following description and the appended claims.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further features, advantages, and aspects are discussed below in conjunction with embodiments of the present disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the present disclosure, are incorporated in and constitute a part of this present disclosure, illustrate aspects and embodiments of the present disclosure, and together with the description serve to explain principles and examples of the disclosure. In the drawings.

Figure 1:
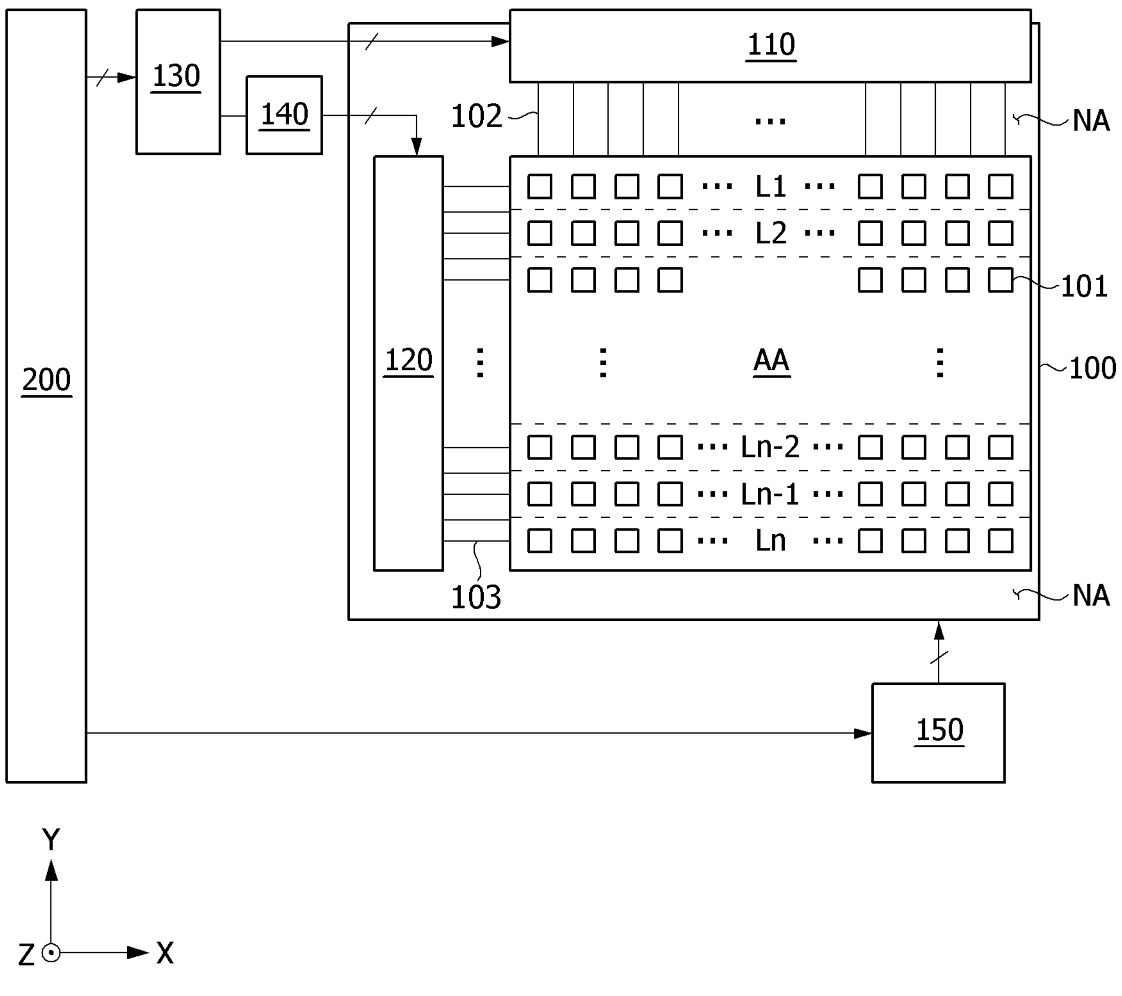
FIG. 1 is a block diagram illustrating a display device according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "containing" used herein are generally intended to allow other components to be added unless the terms are used with the term "only." Any references to singular may include plural unless expressly stated otherwise. For example, an element may be one or more elements. An element may include a plurality of elements. The word "exemplary" is used to mean serving as an example or illustration. Embodiments are example embodiments. Aspects are example aspects. In one or more implementations, "embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after," "following," "next to," "before," or the like, it may not be continuous on a time base unless "immediately" or "directly" is used.

The terms "first," "second," and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit and the gate drive circuit of the display device may include a plurality of transistors. The transistor may be implemented as a thin film transistor (TFT). The transistors may be implemented as an oxide thin film transistor (Oxide TFT) including an oxide semiconductor, a low temperature poly silicon TFT (LTPS TFT) including a low temperature poly silicon, and the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various embodiments of the present disclosure will be described in detail with reference to the accompanying drawings.

Referring to FIG. 1, a display device according to an embodiment of the present disclosure includes a display panel 100 and a display panel driving circuit for writing pixel data to pixels of the display panel 100. In addition, the display device includes a power supply 150.

The display panel 100 may be, but is not limited to, a panel having a rectangular structure with a length in the X-axis direction, a width in the Y-axis direction, and a thickness in the Z-axis direction. For example, the display panel 100 may be a deformed panel that is at least partially curved or elliptical.

A display area AA of the display panel 100 includes a pixel array for displaying an input image thereon. The pixel array includes a plurality of data lines 102, a plurality of gate lines 103 intersected with the data lines 102, and the pixels arranged in a matrix form. The display panel 100 may further include a plurality of power lines. The power lines are connected to constant voltage nodes of the pixel circuits and supply a constant voltage necessary for driving the pixels 101 to the pixels 101. The power lines may be implemented as striped or mesh wirings to be connected in common to the pixels 101 of the display panel 100.

Each of the pixels 101 may be divided into a red sub-pixel, a green sub-pixel, and a blue sub-pixel for color implementation. Each of the pixels may further include a white sub-pixel. Each of the sub-pixels may include a pixel circuit for driving first and second light-emitting elements that selectively emit light according to the selected viewing angle mode. Light-emitting elements may be a light-emitting element, such as an organic light emitting diode (OLED) or a micro light-emitting diode (LED). In the following, a pixel may be interpreted as a sub-pixel.

The display array AA includes a plurality of pixel lines L1 to Ln. Each of the pixel lines L1 to Ln includes one line of pixels arranged along the X-axis direction in the pixel array of the display panel 100. The pixels 101 arranged in one pixel line may share the gate lines 103. The sub-pixels arranged along the Y-axis direction may share the same data line 102. One horizontal period is a time obtained by dividing one frame period by the total number of the pixel lines L1 to Ln.

Touch sensors may be arranged on the display panel 100 to sense touch inputs. The touch sensors may be arranged on the display panel 100 as an on-cell type or an add-on type, or implemented as in-cell type touch sensors embedded in the pixel array.

The display panel 100 may be implemented as a non-transmissive display panel or a transmissive display panel. The transmissive display panel may be employed in a transparent display device in which an image is displayed on a screen and an actual object is visible beyond the display panel. The display panel 100 may be made as a flexible display panel that may be flexibly bent.

The power supply 150 receives an input voltage from a host system 200 and outputs voltages required to drive the pixels 101 of the display panel 100 and the display panel driving circuit. To this end, the power supply 150 may include a direct current to direct current converter (DC-DC converter). The DC-DC converter may include a charge pump, a regulator, a buck converter, a boost converter, and the like. The power supply 150 may output constant voltages (or direct current voltages), such as a gate high voltage, a gate low voltage, a pixel driving voltage, a cathode voltage, an initialization voltage, and an IC driving voltage for the display panel driving circuit through the DC-DC converter. The gate high voltage and the gate low voltage may be supplied to a level shifter 140 and the gate driver 120. The voltages such as the pixel driving voltage, the cathode voltage, and the initialization voltage are supplied to the pixels 101 via the power lines commonly connected to the pixels 101.

The power supply 150 may further include a gamma voltage generator. The gamma voltage generator receives a high potential reference voltage and a low potential reference voltage and outputs a plurality of gamma reference voltages divided by a predetermined voltage interval on a preset gamma curve, for example, 2.2 gamma curve. The gamma reference voltages are supplied to the data driver 110. In the data driver 110, the gamma reference voltages are divided by a voltage division circuit and subdivided into grayscale voltages. The gamma voltage generator may be implemented as a programmable gamma circuit capable of adjusting each of the gamma reference voltages according to digital data. A timing controller 130 or the host system 200 or a separate external device may update digital data stored in a register of the programmable gamma circuit through a communication interface.

The display panel driving circuit writes the pixel data of the input image to the pixels 101 of the display panel 100 under the control of the timing controller 130. The display panel driving circuit includes the data driver 110 and the gate driver 120. The display panel driving circuit may further include a touch sensor driver for driving touch sensors. The touch sensor driver is omitted from FIG. 1. The data driver 110 and the touch sensor driver may be integrated into a source drive integrated circuit (IC).

The data driver 110 receives the pixel data of the input image received as a digital signal from the timing controller 130 and outputs the data voltage. The input image may be image data including various contents such as private content, shared content, and the like. The data driver 110 may receive the gamma reference voltages and generate gamma compensated voltages for each grayscale through the voltage division circuit. A gamma-compensated voltage for each grayscale is supplied to a digital to analog converter ("DAC") disposed on each of the channels of the data driver 110. The data driver 110 samples and latches the pixel data and then inputs the digital data to the DAC. The DAC converts the pixel data to the gamma compensated voltage and outputs pixel data voltage.

The gate driver 120 may be formed on the display panel 100 together with circuit elements of the display area AA and the wires. The gate driver 120 may be disposed in the non-display area NA on at least one of the right or left sides outside the display area AA in the display panel 100, or at least a portion thereof may be disposed within the display area AA.

The gate driver 120 may be disposed in the non-display areas NA on both sides of the display panel 100 with the display area AA of the display panel 100 interposed therebetween, and may supply gate pulses from the both sides of the gate lines 103 in a double feeding method. In another embodiment, the gate driver 120 may be disposed in at least one of the left and right non-display areas NA of the display panel 100 to supply gate signals to the gate lines 103 in a single feeding method. The gate driver 120 sequentially outputs pulses of the gate signals to the gate lines 103 under the control of the timing controller 130. The gate driver 120 may sequentially supply the gate signals to the gate lines 103 by shifting the pulses of the gate signals using a shift register or an edge trigger.

The timing controller 130 receives digital video data of the input image and a timing signal synchronized with the digital video data from the host system 200. The timing signal may include a vertical synchronization signal Vsync, a horizontal synchronization signal Hsync, and a data enable signal DE. A vertical period and a horizontal period may be known by counting the data enable signal DE, and thus the vertical synchronization signal Vsync and the horizontal synchronization signal Hsync may be omitted. The horizontal synchronization signal Hsync and the data enable signal DE have a period of one horizontal period (1H).

The timing controller 130 generates a data timing control signal for controlling the operation timing of the data driver 110, a gate timing control signal for controlling the operation timing of the gate driver 120, and a mode selection signal to control the viewing angle mode of each of the pixels 101, based on the timing signals Vsync, Hsync, and DE received from the host system 200, thereby controlling the pixels 101 and the display panel driving circuit. The timing controller 130 may synchronize the data driving circuit 110 and the gate driver 120 by controlling the operation timing of the display panel driving circuit.

A gate timing control signal output from the timing controller 130 may be inputted to the shift register of the gate driver 120 through the level shifter 140. The level shifter 140 may convert a voltage level of the gate timing signal received from the timing controller 130 to a swing width between the gate low voltage and the gate high voltage and supply it to the gate driver 120. The clock signals output from the level shifter 140 may include a start signal and a clock to independently control the rising edges, gate-on voltage periods, and polling edges of each of the gate signals.

The host system 200 may scale an image signal from a video source to match the resolution of the display panel 100, and may transmit it to the timing controller 130 together with the timing control signal. The host system 200 may transmit a mode signal for controlling the viewing angle together with the image signal, and a flag signal indicating the presence or absence of data of personal content that requires privacy protection to the timing controller 130. The timing controller 130 may control the gate signals output from the gate driver 120 in the viewing angle mode selected by a mode signal from the host system 200, and controls the data driver 110 in the selected viewing angle mode. The timing controller 130 may output a mode selection signal based on the mode signal from the host system 200.

Figure 2A:
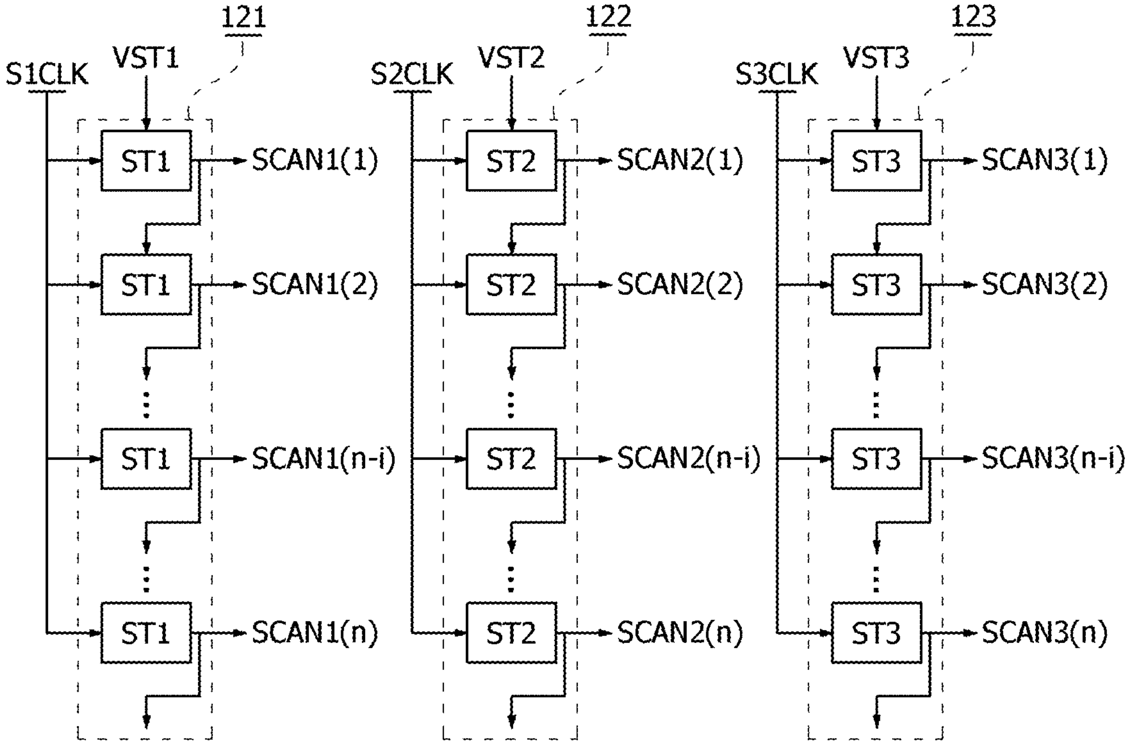
FIGS. 2A to 2C are diagrams illustrating an example of a gate driver.
Figure 2B:
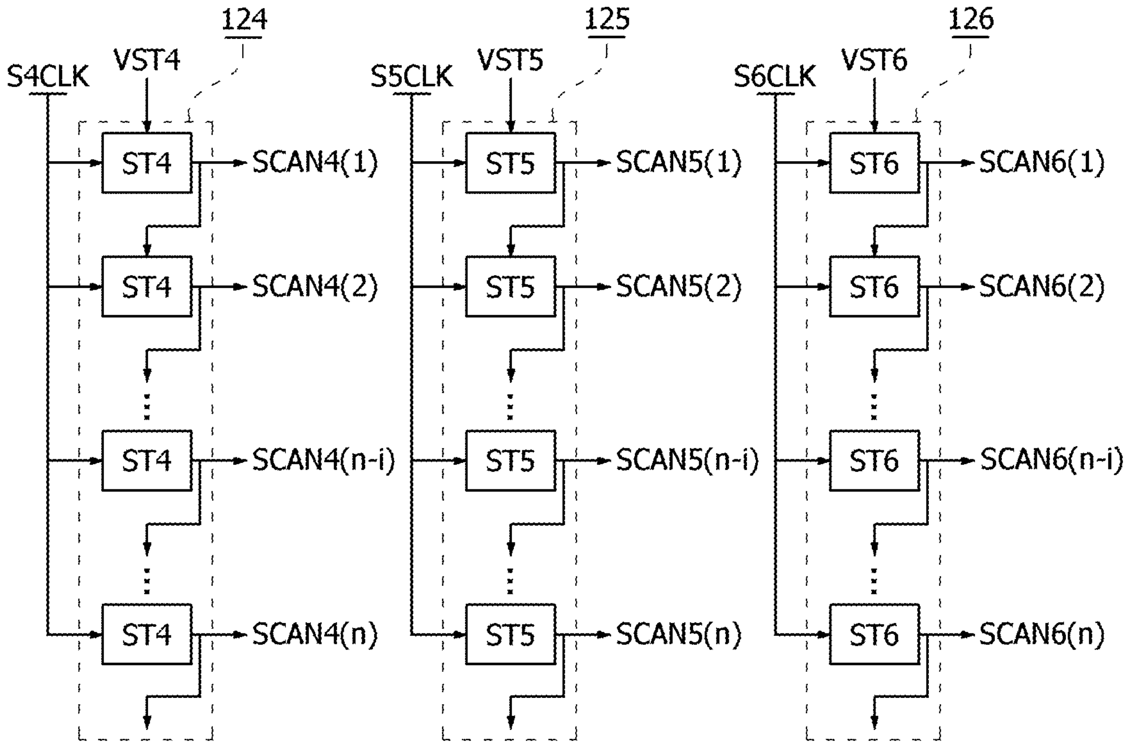
Figure 2C:
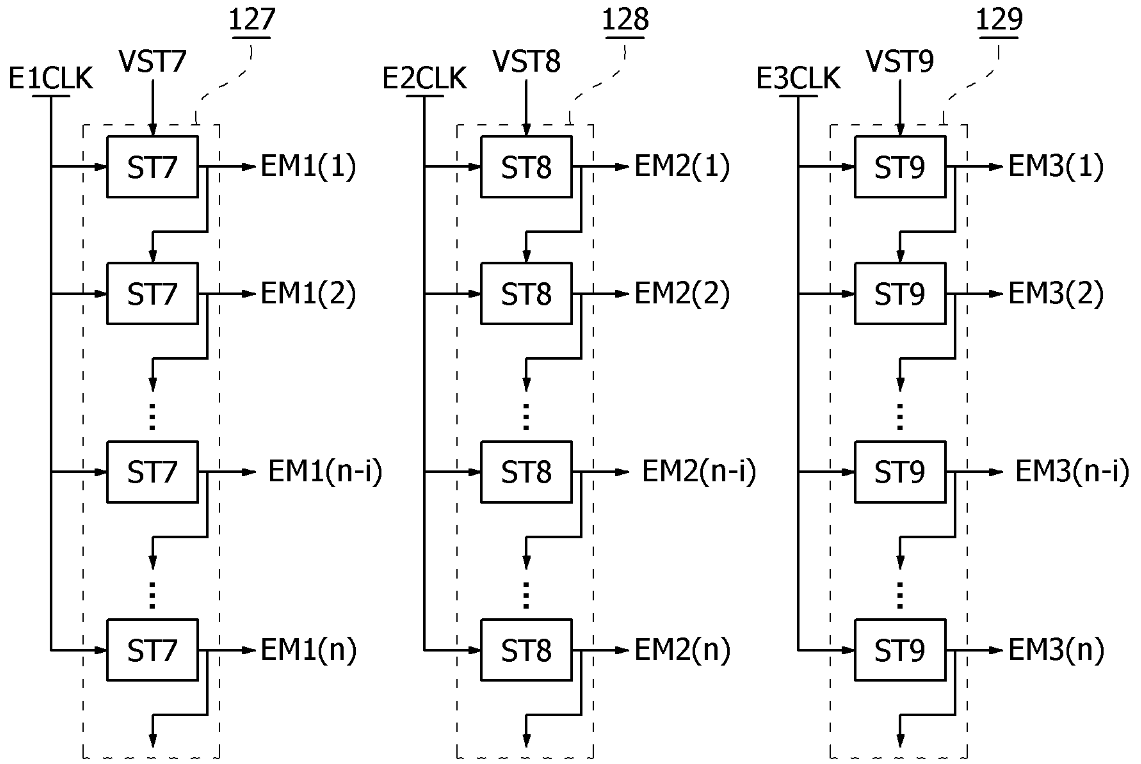

In the case where a plurality of gate signals are applied to each of the pixels, the gate driver 120 may include a plurality of gate drivers. The gate signal may include first scan signals SCAN1(1) to SCAN1($n$), second scan signals SCAN2(1) to SCAN2($n$), third scan signals SCAN3(1) to SCAN3($n$), fourth scan signals SCAN4(1) to SCAN4(*n*), fifth scan signals SCAN5(1) to SCAN5(*n*), sixth scan signals SCAN6 (1) to SCAN6(*n*), first emission signals EM1(1) to EM1(*n*), and second EM signals EM2(1) to EM2(*n*), which are input to the pixel circuit via the plurality of gate lines, as shown in FIGS. 2A to 2C. Hereafter, "emission signal" is referred to as "EM signal." in this case, the gate driver 120 includes a first gate driver 121 that outputs the first scan signals SCAN1(1) to SCAN1(*n*), a second gate driver 122 that outputs the second scan signals SCAN2(1) to SCAN2(*n*), a third gate driver 123 that outputs the third scan signals SCAN3(1) to SCAN3(*n*), a fourth gate driver 124 that outputs the fourth scan signals SCAN4(1) to SCAN4(*n*), a fifth gate driver 125 that outputs the fifth scan signals SCAN5(1) to SCAN5(*n*), a sixth gate driver 126 that outputs the sixth scan signals SCAN6(1) to SCAN6(*n*), a seventh gate driver 127 that outputs the first EM signals EM1(1) to EM1(*n*), an eighth gate driver 128 that outputs the second EM signals EM2(1) to EM2(*n*), and a ninth gate driver 129 for outputting third EM signals EM3(1) to EM3(*n*). In (n-i) illustrated in FIGS. 2A to 2C, i is a positive integer less than n. The gate high voltage and gate low voltage can be set the same for all gate signals or can be set differently between the scan signals and the EM signals.

Figure 6:
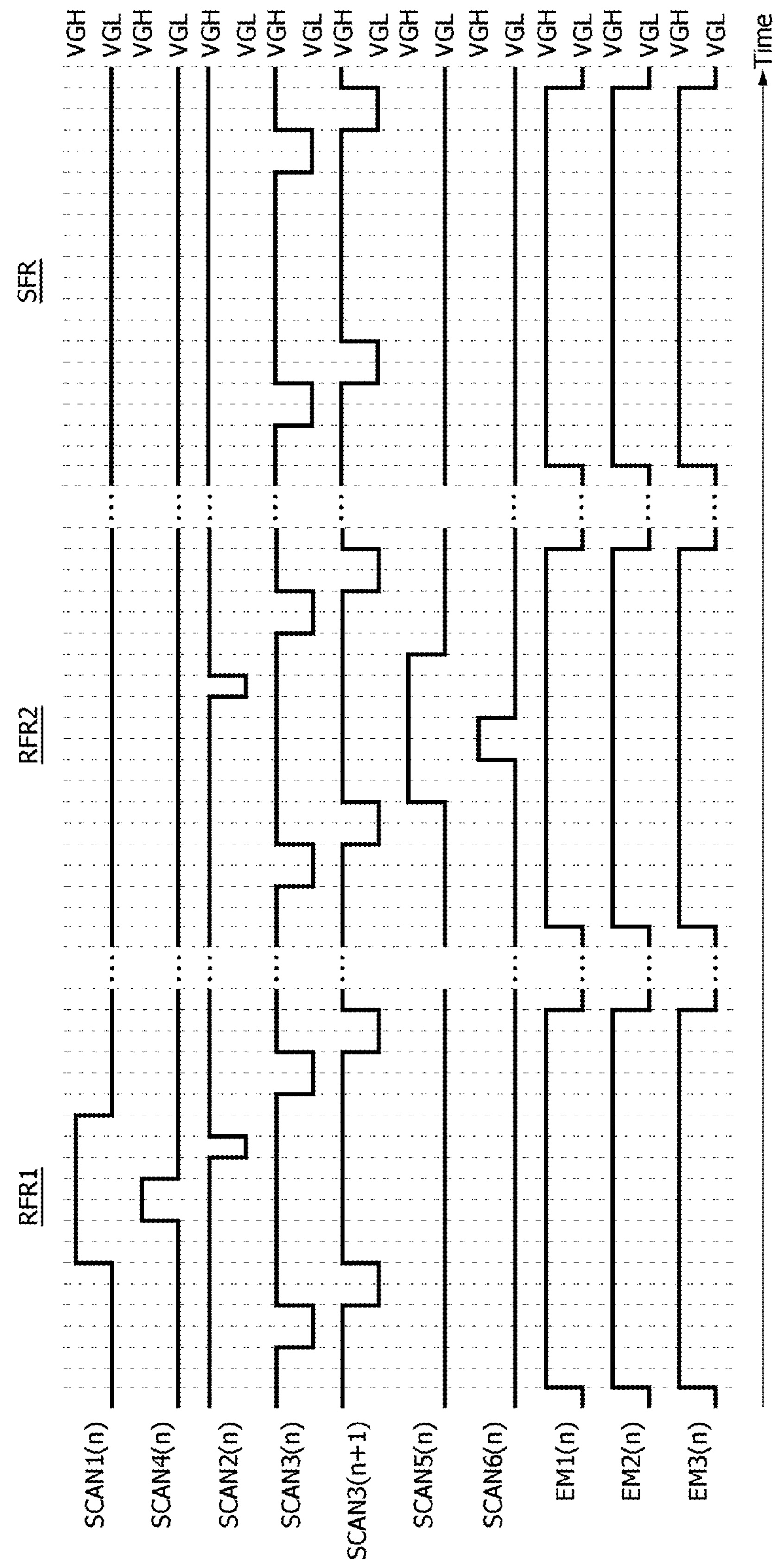
FIG. 6 is a waveform chart illustrating gate signals that are applied to the pixel circuit illustrated in FIG. 5 during a first refresh frame period, a second refresh frame period, and a skip frame period.

Start signals VST1 to VST9 and clocks S1CLK to E3CLK may be input to the gate drivers 121 to 129, respectively. Each of the gate drivers 121 to 129 includes a plurality of signal transmission parts ST1 to ST9 that are connected in cascade. The signal transmission parts ST1 to ST9 of the gate driver 121 to 129 receive the start signals VST1 to VST9 and the clock signals S1CLK to E3CLK, and sequentially output the gate signals SCAN1(1) to SCAN1(*n*), SCAN2(1) to SCAN2(*n*), SCAN3(1) to SCAN3(*n*), SCAN4 (1) to SCAN4(*n*), SCAN5(1) to SCAN5(*n*), SCAN6(1) to SCAN6(*n*), EM1(1) to EM1(*n*), EM2(1) to EM2(*n*), and EM3(1) to EM3(*n*). The waveform of the gate signals SCAN1(1) to SCAN1(*n*), SCAN2(1) to SCAN2(*n*), SCAN3 (1) to SCAN3(*n*), SCAN4(1) to SCAN4(*n*), SCAN5(1) to SCAN5(*n*), SCAN6(1) to SCAN6(*n*), EM1(1) to EM1(*n*), EM2(1) to EM2(*n*), and EM3(1) to EM3(*n*) may be changed, as shown in FIG. 6, depending on the viewing angle mode. The timing controller 130 may adjust the waveforms of the gate signals SCAN1(1) to SCAN1(*n*), SCAN2(1) to SCAN2 (*n*), SCAN3(1) to SCAN3(*n*), SCAN4(1) to SCAN4(*n*), SCAN5(1) to SCAN5(*n*), SCAN6(1) to SCAN6(*n*), EM1(1) to EM1(*n*), EM2(1) to EM2(*n*), and EM3(1) to EM3(*n*) to match the selected viewing angle mode by modulating the start signals VST1 to VST9 and the clocks S1CLK to E3CLK based on the viewing angle mode of the sub-pixels.

Figure 3:
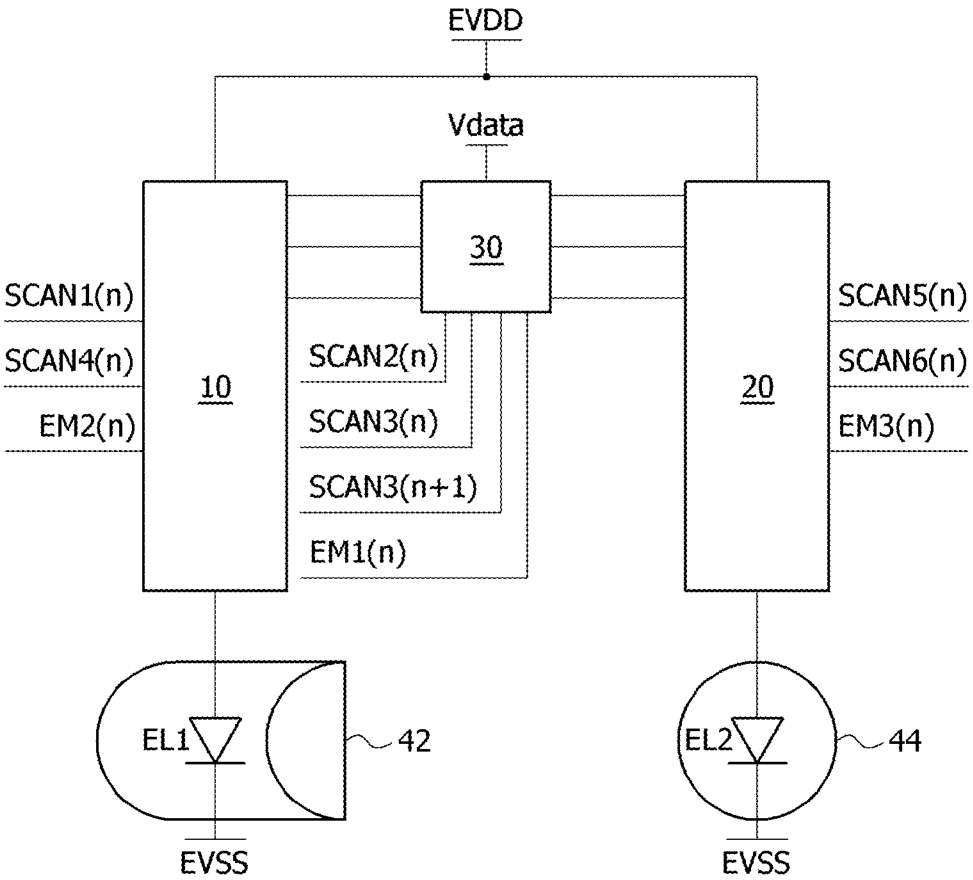
FIG. 3 is a circuit diagram illustrating a pixel circuit according to the embodiment of the present disclosure.
Figure 4:
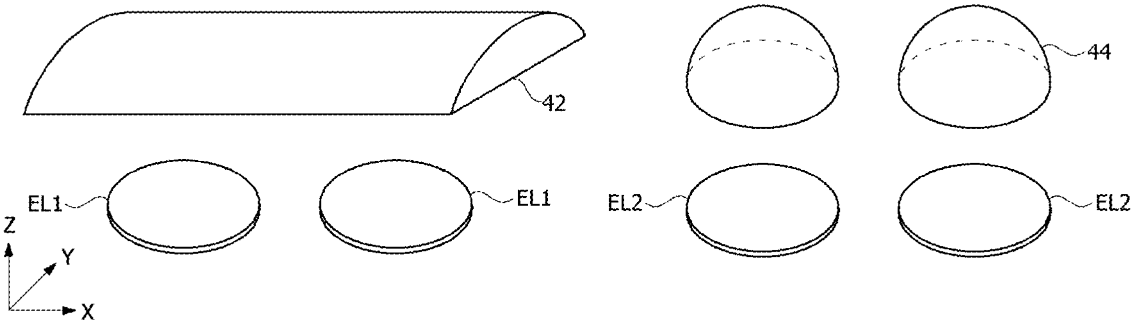
FIG. 4 is a diagram illustrating an example of lenses provided in sub-pixels.

FIG. 3 is a circuit diagram illustrating a pixel circuit according to the embodiment of the present disclosure. FIG. 4 is a diagram illustrating an example of lenses provided in sub-pixels.

Referring to FIGS. 3 and 4, each of the sub-pixels of the display panel 100 includes a first light-emitting element EL1, a second light-emitting element EL2, a first driver 10, a second driver 20, and a shared switch part 30.

Each of the first and second light-emitting elements EL1 and EL2 may be a light-emitting element such as an organic light-emitting diode (OLED) or a micro light-emitting element (LED), but the present disclosure is not limited thereto. The first light-emitting element EL1 may be driven in a first viewing angle mode to emit light. When the first light-emitting element EL1 emits light, light from the first light-emitting element EL1 may be diffused via a first lens 42 and emitted with a wide viewing angle. The second light-emitting element EL2 may be driven in a second viewing angle mode to emit light. When the second light-emitting element EL2 emits light, light from the second light-emitting element EL2 may be condensed via a second lens 44 and emitted with a narrow viewing angle.

The first driver 10 receives a pixel driving voltage EVDD, a first pixel data voltage Vdata, and gate signals SCAN1(*n*), SCAN4(*n*), and EM2(*n*) as input and supplies a current to the first light-emitting element EL1 to drive the first light-emitting element EL1. The first driver 10 may include a first capacitor and a plurality of transistors. The second driver 20 receives the pixel driving voltage EVDD, a second pixel data voltage Vdata, and gate signals SCAN5(*n*), SCAN6(*n*), and EM3(*n*) as input and supplies a current to the second light-emitting element EL2 to drive the second light-emitting element EL2. The second driver 20 may include a second capacitor and a plurality of transistors.

The shared switch part 30 includes a plurality of transistors that are electrically connected to the first driver 10 and the second driver 20. The shared switch part 30 receives the first pixel data voltage and the second pixel data voltage as input, receives gate signals SCAN2(*n*), SCAN3(*n*), SCAN3 (*n*+1), and EM1(*n*) as input, and selectively transfers the data voltages Vdata to the first driver 10 and the second driver 20.

Referring to FIG. 3, the first lens 42 is a lens for a wide viewing angle provided above the first light-emitting element EL1. The first lens 42 overlaps a light emission area of the first light-emitting element EL1. The first lens 42 may be implemented by a semicylindrical lens to limit upper and lower viewing angles and widen right and left viewing angle. The first lens 42 is long in a right-left direction (or an X-axis direction) of the display panel 100 and is narrow in an up-down direction (a Y-axis direction) of the display panel 100. The first lens 42 condenses light of the first light-emitting element EL1 in the up-down direction and diffuses light of the first light-emitting element EL1 with a wide viewing angle in the right-left direction to make light from the first light-emitting element EL1 travel with a wide viewing angle in the right-left direction.

The second lens 44 is a lens for a narrow viewing angle provided above the second light-emitting element EL2. The second lens 44 overlaps a light emission area of the second light-emitting element EL2. The second lens 44 may be a semispherical lens that is thick in the center portion and thinner toward an edge in the up-down direction and the right-left direction. The second lens 44 condenses light of the second light-emitting element EL2 to make the light emitted from the second light-emitting element EL2 travel with a narrow viewing angle in the up-down direction and the right-left direction.

The first and second lenses 42 and 44 may be implemented with a transparent medium or transparent insulation layer pattern provided in the display panel 100, but the present disclosure is not limited thereto. The first and second lenses 42 and 44 can prevent a phenomenon that light from pixels is reflected on a windshield of a vehicle and a screen of the display device is visible, by limiting upper and lower viewing angles of pixels.

The display panel driving circuit may be driven at a variable refresh rate (VRR) under the control of the timing controller 130 or the host system 200. For example, the timing controller 130 can reduce the power consumption of the display device by analyzing the input video and lowering the refresh rate when the input video has not change for a preset time. For example, the display panel driving circuit can reduce the power consumption of the display device by controlling a data writing period to be long by lowering the refresh rate of the pixels P when a still image is input for a given time or more under the control of the timing controller 130. The display device may operate in a standby mode or the driving circuit of the display panel 100 may lower the refresh rate in response to a user's command. The refresh rate may be lowered on an always on display (AOD) screen. The AOD screen is a partial pixel area of the display area AA on which preset information, that is, brief information such as a state of charge of a battery and time is displayed in the standby mode.

The timing controller 130 or the host system 200 may control a viewing angle of a pixel to a first viewing angle during a first frame period by controlling the display panel driving circuit. The timing controller 130 or the host system 200 may control a viewing angle of a pixel to a second viewing angle during a second frame period by controlling the display panel driving circuit. The timing controller 130 or the host system 200 may change the viewing angle of each pixel using the variable refresh rate. In this case, the first frame period may be a frame period of a pixel driving period during which the refresh rate is high and the second frame period may be a frame period of a pixel driving period during which the refresh rate is relatively low, but the present disclosure is not limited thereto. The refresh rate may be a frequency of a refresh frame in which data is written to pixels. When pixel data of an ordinary general video is written to pixels, pixel data may be written to the pixels at the refresh rate equal to or higher than 60 Hz or 120 Hz. When the above-described low-speed driving event occurs, a low-speed driving mode may be advanced and the pixel data may be written to the pixels at the refresh rate lower than 60 Hz, for example, at the frequency of 1 Hz to 10 Hz. When the refresh rate is 1 Hz, pixel data may be written to the pixels in one refresh frame period per second and 119 frame periods may be a skip frame period or a blank period during which pixel data is not written and the data voltage charged in a previous refresh frame period is maintained. When the refresh rate is 120 Hz, pixel data may be written to the pixels in 120 refresh frame period per second.

Figure 5:
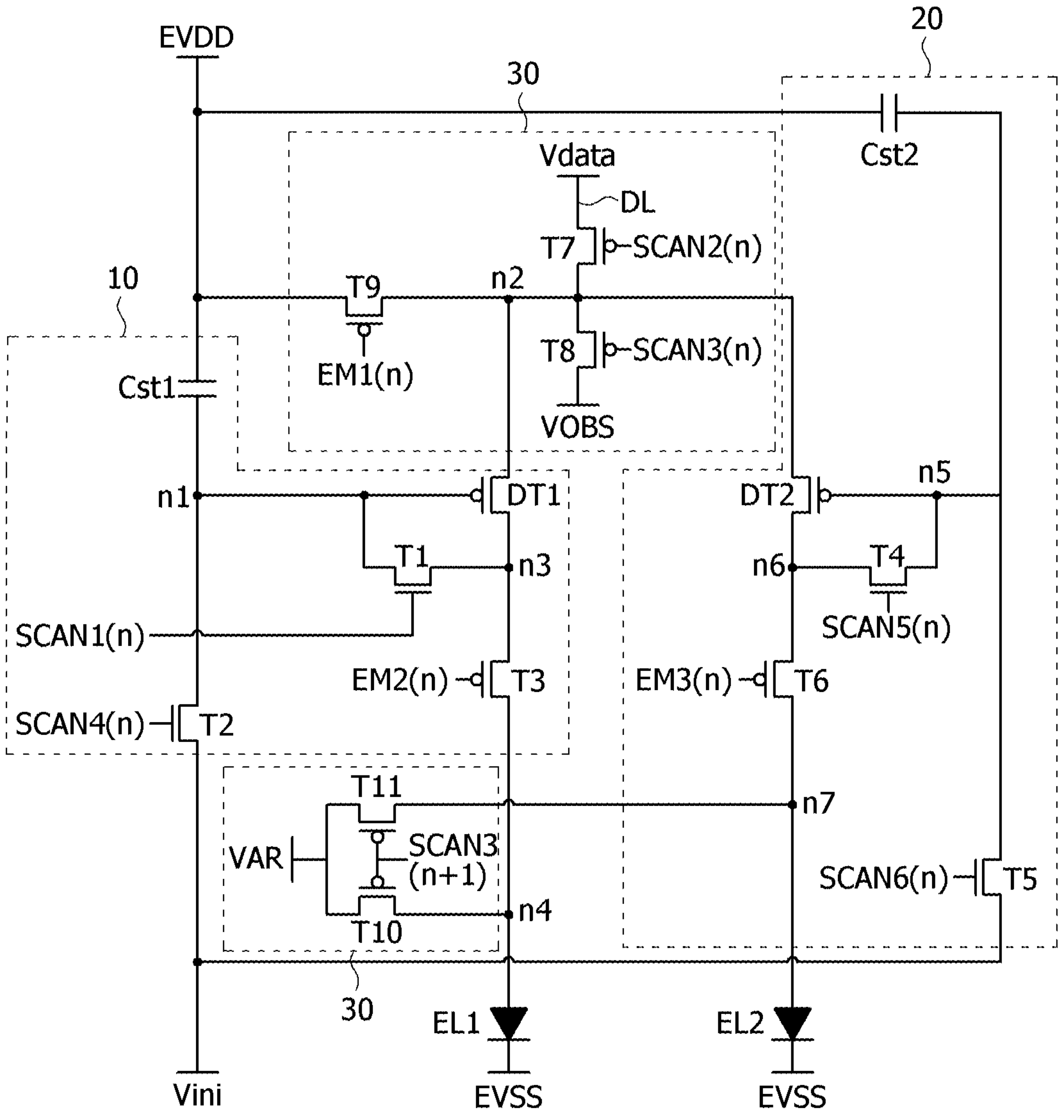
FIG. 5 is a circuit diagram illustrating an example of the pixel circuit illustrated in FIG. 3 in detail.

FIG. 5 is a circuit diagram illustrating an example of the pixel circuit illustrated in FIG. 3 in detail. The pixel circuit illustrated in FIG. 5 may be a pixel circuit for a sub-pixel in an n-th (where n is a natural number) pixel line. FIG. 6 is a waveform chart illustrating gate signals that are applied to the pixel circuit illustrated in FIG. 5 during a first refresh frame period, a second refresh frame period, and a skip frame period.

Referring to FIGS. 5 and 6, the pixel circuit is connected to data lines to which a pixel data voltage Vdata is applied, and gate lines to which gate signals SCAN1(*n*) to SCAN6 (*n*), EM1(*n*), EM2(*n*), and EM3(*n*) are applied.

The pixel circuit may be connected to power nodes to which constant voltages are applied such as a first voltage node to which a pixel driving voltage EVDD is applied, a second voltage node to which a cathode voltage EVSS is applied, a third voltage node to which an initialization voltage Vini is applied, a fourth voltage node to which an anode reset voltage VAR is applied, and a fifth voltage node to which an on-bias voltage VOBS is applied. The cathode voltage cathode voltage EVSS may be a pixel ground voltage. Power lines to which the voltage nodes are connected may be connected in common to all pixels on the display panel 100.

The pixel driving voltage EVDD and the cathode voltage EVSS may be set to voltages at which a driving transistor DT1 can operate in a saturation region. The pixel driving voltage EVDD may be set to a voltage of 2 V to 4 V and the cathode voltage EVSS may be set to a voltage of −9 V to −7 V, but the present disclosure is not limited thereto.

The anode reset voltage VAR may be a voltage of −13 V to −10 V, but the present disclosure is not limited thereto. For example, the anode reset voltage VAR may be separated by color of sub-pixels. The anode reset voltage VAR may initialize the anode electrodes of the light-emitting elements EL1 and EL2. The on-bias voltage VOBS may be a voltage of 4 V to 6 V, but the present disclosure is not limited thereto. The on-bias voltage VOBS can improve the hysteresis of the driving transistor DT1 by changing a direction of a current flowing in the driving transistor DT1.

The initialization voltage Vini may be set to a voltage lower than a lower limit voltage of the data voltage Vdata and higher than the cathode voltage EVSS, but the present disclosure is not limited thereto. For example, the data voltage Vdata may have a dynamic range of 2 V to 6 V. Within this dynamic range, the voltage level of the data voltage Vdata may be selected according to a grayscale value of pixel data. In this case, the initialization voltage Vini may be set to a voltage of −6 V to −3 V, but the present disclosure is not limited thereto.

The gate signals SCAN1(*n*) to SCAN6(*n*), EM1(*n*), EM2 (*n*), and EM3(*n*) may include pulses that swing between the gate high voltage VGH and the gate low voltage VGL. The gate high voltage VGH of the gate signals SCAN1(*n*) to SCAN6(*n*), EM1(*n*), and EM2(*n*), EM3(*n*) may be set to a voltage higher than the pixel driving voltage EVDD, and the gate low voltage VGL may be set to a voltage lower than the cathode voltage EVSS. For example, the gate high voltage may be set to a voltage of 5 to 10 V and the gate low voltage may be set to a voltage of −18 to −10 V.

The first driver 10 includes a first driving transistor DT1, a first switch transistor T1, a second switch transistor T2, a third switch transistor T3, and a first capacitor Cst1. The first driving transistor DT1 and the third switch transistor T3 may be implemented by p-channel LTPS TFTs having good on-current characteristics, but the present disclosure is not limited thereto. The first and second switch transistors T1 and T2 may be implemented by n-channel oxide TFTs having a low off-current, but the present disclosure is not limited thereto. The off-current is a leakage current flowing through a semiconductor channel of a transistor in an off state.

The first driving transistor DT1 generates a current according to a gate-source voltage Vgs in a first refresh frame period RFR1 and drives the first light-emitting element EL1. The first driving transistor DT1 includes a gate electrode connected to a first node n1, a first electrode connected to a second node n2, and a second electrode connected to a third node n3. The first capacitor Cst1 is connected between the first voltage node to which the pixel driving voltage EVDD is applied and the first node n1.

The first light-emitting element EL1 may be driven by the current from the first driving transistor DT1 and may emit light. An anode electrode of the first light-emitting element EL1 is connected to a fourth node n4, and a cathode electrode of the first light-emitting element EL1 is connected to the second voltage node to which the cathode voltage EVSS is applied.

The first switch transistor T1 is connected between the first node n1 and the third node n3. The first switch transistor T1 is turned on in response to the gate high voltage VGH of the first scan signal SCAN1(*n*) and may be turned off in response to the gate low voltage VGL of the of the first scan signal SCAN1(*n*). When the first switch transistor T1 is turned on, the first node n1 is electrically connected to the third node n3. The first switch transistor T1 includes a gate electrode connected to a first gate line to which the first scan signal SCAN1(n) is applied, a first electrode connected to the first node n1, and a second electrode connected to the third node n3.

The second switch transistor T2 is connected between the first node n1 and the third voltage node to which the initialization voltage Vini is applied. The second switch transistor T2 may be turned on in response to the gate high voltage VGH of the fourth scan signal SCAN4(n) and may be turned off in response to the gate low voltage of the fourth scan signal SCAN4(n). When the second switch transistor T2 is turned on, the initialization voltage Vini is applied to the first node n1. The second switch transistor T2 includes a gate electrode connected to a fourth gate line to which the fourth scan signal SCAN4(n) is applied, a first electrode connected to the first node n1, and a second electrode to which the initialization voltage Vini is applied.

The third switch transistor T3 is connected between the third node n3 and the fourth node n4. The third switch transistor T3 may be turned on in response to the gate low voltage VGL of the second EM signal EM2(n). When the third switch transistor T3 is turned on, the third node n3 may be electrically connected to the fourth node n4. The third switch transistor T3 includes a gate electrode connected to an eighth gate line to which the second EM signal EM2(n) is applied, a first electrode connected to the third node n3, and a second electrode connected to the fourth node n4.

The second driver 20 includes a second driving transistor DT2, a fourth switch transistor T4, a fifth switch transistor T5, a sixth switch transistor T6, and a second capacitor Cst2. The second driving transistor DT2 and the sixth switch transistor T6 may be implemented by p-channel LTPS TFTs, but the present disclosure is not limited thereto. The fourth and fifth switch transistors T4 and T5 may be implemented by n-channel oxide TFTs, but the present disclosure is not limited thereto.

The second driving transistor DT2 generates a current according to a gate-source voltage Vgs in a second refresh frame period RFR2 and drives the second light-emitting element EL2. The second driving transistor DT2 includes a gate electrode connected to a fifth node n5, a first electrode connected to the second node n2, and a second electrode connected to a sixth node n6. The second capacitor Cst2 is connected between the first voltage node to which the pixel driving voltage EVDD is applied and the fifth node n5.

The second light-emitting element EL2 may be driven by the current from the second driving transistor DT2 and may emit light. An anode electrode of the second light-emitting element EL2 is connected to a seventh node n7, and a cathode electrode of the second light-emitting element EL2 is connected to the second voltage node to which the cathode voltage EVSS is applied.

The fourth switch transistor T4 is connected between the fifth node n5 and the sixth node n6. The fourth switch transistor T4 may be turned on in response to the gate high voltage VGH of the fifth scan signal SCAN5(n) and may be turned off in response to the gate low voltage VGL of the fifth scan signal SCAN5(n). When the fourth switch transistor T4 is turned on, the fifth node n5 is electrically connected to the sixth node n6. The fourth switch transistor T4 includes a gate electrode connected to a fifth gate line to which the fifth scan signal SCAN5(n) is applied, a first electrode connected to the fifth node n5, and a second electrode connected to the sixth node n6.

The fifth switch transistor T5 is connected between the fifth node n5 and the third voltage node to which the initialization voltage Vini is applied. The fifth switch transistor T5 may be turned on in response to the gate high voltage VGH of the sixth scan signal SCAN6(n) and may be turned off in response to the gate low voltage VGL of the sixth scan signal SCAN6(n). When the fifth switch transistor T5 is turned on, the initialization voltage Vini is applied to the fifth node n5. The fifth switch transistor T5 includes a gate electrode connected to a sixth gate line to which the sixth scan signal SCAN6(n) is applied, a first electrode connected to the fifth node n5, and a second electrode to which the initialization voltage Vini is applied.

The sixth switch transistor T6 is connected between the sixth node n6 and the seventh node n7. The sixth switch transistor T6 may be turned on in response to the gate low voltage VGL of the third EM signal EM3(n) and may be turned off in response to the gate high voltage VGH of the third EM signal EM3(n). When the sixth switch transistor T6 is turned on, the sixth node n6 may be electrically connected to the seventh node n7. The sixth switch transistor T6 includes a gate electrode connected to a ninth gate line to which the third EM signal EM3(n) is applied, a first electrode connected to the sixth node n6, and a second electrode connected to the seventh node n7.

The shared switch part 30 includes a seventh switch transistor T7, an eighth switch transistor T8, a ninth switch transistor T9, a tenth switch transistor T10, and an eleventh switch transistor T11. The seventh and eleventh switch transistors T7 to T11 may be implemented by p-channel LTPS TFTs, but the present disclosure is not limited thereto.

The first pixel data voltage is applied to a data line DL in the first refresh frame period RFR1. The second pixel data voltage is applied to the data line DL in the second refresh frame period RFR2. Accordingly, pixel data of different contents may be written sequentially to the sub-pixels via one data line DL.

The seventh switch transistor T7 is connected between the data line DL to which the data voltage Vdata is applied and the second node n2. The seventh switch transistor T7 may be turned on in response to the gate low voltage VGL of the second scan signal SCAN2(n) and may turned off in response to the gate high voltage VGH of the second scan signal SCAN2(n). When the seventh switch transistor T7 is turned on, the data line DL to which the pixel data voltage Vdata is applied is electrically connected to the second node n2 and the data voltage Vdata is applied to the second node n2. The seventh switch transistor T7 includes a gate electrode connected to a second gate line to which the second scan signal SCAN2(n) is applied, a first electrode connected to the data line DL, and a second electrode connected to the second node n2.

The eighth switch transistor T8 is connected between the second node n2 and the fifth voltage node to which the on-bias voltage VOBS is applied. The eighth switch transistor T8 may be turned on in response to the gate low voltage VGL of the third-first scan signal SCAN3(n) and may be turned off in response to the gate high voltage VGH of the third-first scan signal SCAN3(n). When the eighth switch transistor T8 is turned on, the on-bias voltage VOBS is applied to the second node n2. The eighth switch transistor T8 includes a gate electrode connected to a third-first gate line to which the third-first scan signal SCAN3(n) is applied, a first electrode connected to the second node n2, and a second electrode to which the on-bias voltage VOBS is applied.

The ninth switch transistor T9 is connected between the first voltage node to which the pixel driving voltage EVDD is applied and the second node n2. The ninth switch transistor T9 may be turned on in response to the gate low voltage VGL of the first EM signal EM1(n) and may be turned off in response to the gate high voltage VGH of the first EM signal EM1(n). When the ninth switch transistor T9 is turned on, the pixel driving voltage EVDD is applied to the second node n2. The ninth switch transistor T9 includes a gate electrode connected to a seventh gate line to which the first EM signal EM1(n) is applied, a first electrode connected to the first voltage node, and a second electrode connected to the second node n2.

The tenth switch transistor T10 is connected between the fourth node n4 and the fourth voltage node to which the anode reset voltage VAR is applied. The tenth switch transistor T10 may be turned on in response to the gate low voltage VGL of the third-second scan signal SCAN3(n+1) and may be turned off in response to the gate high voltage VGH of the third-second scan signal SCAN3(n+1). When the tenth switch transistor T10 is turned on, the anode reset voltage VAR is applied to the fourth node n4. The tenth switch transistor T10 includes a gate electrode connected to a third-second gate line to which the third-second scan signal SCAN3(n+1) is applied, a first electrode connected to the fourth node n4, and a second electrode connected to the fourth voltage node.

The eleventh switch transistor T11 is connected between the seventh node n7 and the fourth voltage node to which the anode reset voltage VAR is applied. The eleventh switch transistor T11 may be turned on in response to the gate low voltage VGL of the third-second scan signal SCAN3(n+1) and may be turned off in response to the gate high voltage VGH of the third-second scan signal SCAN3(n+1). When the eleventh switch transistor T11 is turned on, the anode reset voltage VAR is applied to the seventh node n7. The eleventh switch transistor T11 includes a gate electrode connected to the third-second gate line to which the third-second scan signal SCAN3(n+1) is applied, a first electrode connected to the seventh node n7, and a second electrode connected to the fourth voltage node.

The pulses of the third-first scan signal SCAN3(n) and the third-second scan signal SCAN3(n+1) are sequentially generated as the gate low voltage VGL. The pulse of the third-first scan signal SCAN3(n) is applied to the gate electrode of the eighth switch transistor T8 in pixels of an n-th pixel line and is applied to the gate electrodes of the tenth and eleventh switch transistors T10 and T11 in pixels of an (n−1)th pixel line. Subsequently, the pulse of the third-second scan signal SCAN3(n+1) is applied to the gate electrodes of the tenth and eleventh switch transistors T10 and T11 in the pixels of the n-th pixel line and is applied to the gate electrode of the eighth switch transistor T8 in pixels of an (n+1)th pixel line. Accordingly, in each pixel line, the tenth and eleventh switch transistors T10 and T11 may be turned on after the eighth switch transistor T8 is turned on.

Referring to FIG. 6, the first refresh frame period RFR1 is a frame period during which the first pixel data voltage Vdata is charged in the first capacitor Cst1. The first pixel data may be data of shared content that is reproduced with a wide viewing angle. The second refresh frame period RFR2 is a frame period during which the second pixel data voltage Vdata is charged in the second capacitor Cst2. The second pixel data may be data of private content or content that requires privacy protection. The skip frame period SFR is a period during which the new data voltage is not charged when the refresh rate is lower than 60 Hz in the low-speed driving mode and the data voltage charged in the first capacitor Cst1 or the second capacitor Cst2 in a previous refresh frame period is maintained. The pulse of the second scan signal SCAN2(n) that is synchronized with the pixel data voltage Vdata is applied to the pixel circuit in the first and second refresh frame periods RFR1 and RFR2, but is not generated in the skip frame period SFR.

In each of the first refresh frame period RFR1, the second refresh frame period RFR2, and the skip frame period SFR, one or more of the light-emitting elements EL1 and EL2 may emit light after the capacitors Cst1 and Cst2 are programmed with the pixel data. After the sub-pixel is programmed with the first pixel data during the first refresh frame period RFR1, one of more of the light-emitting elements EL1 and EL2 of the sub-pixel may emit light during a light emission period of the first refresh frame. After the sub-pixel is programmed with the second pixel data during the second refresh frame period RFR2, one or more of the light-emitting elements EL1 and EL2 of the sub-pixel may emit light. One or more of the light-emitting elements EL1 and EL2 of the sub-pixel may emit light with no update of pixel data during the skip frame period SFR. In each of the first refresh frame period RFR1, the second refresh frame period RFR2, and the skip frame period SFR, the light-emitting elements EL1 and EL2 may be selectively driven according to the data voltage charged in the capacitors Cst1 and Cst2 and the second and third EM signals EM2(n) and EM3(n).

In each of the first refresh frame period RFR1, the second refresh frame period RFR2, and the skip frame period SFR, when the third switch transistor T3 is turned on in response to the second EM signal EM2(n), a current that is generated according to the gate-source voltage of the first driving transistor DT1 charged in the first capacitor Cst1 may be supplied to the first light-emitting element EL1, and the first pixel data may be reproduced with a wide viewing angle. When the sixth switch transistor T6 is turned on in response to the third EM signal EM3(n), a current that is generated according to the gate-source voltage of the second driving transistor DT2 charged in the second capacitor Cst2 may be supplied to the second light-emitting element EL2 and the second pixel data may be reproduced with a narrow viewing angle.

In the low-speed driving mode, after the first pixel data is written to the pixels in the first refresh frame period RFR1, the second pixel data may be written to the pixels in the second refresh frame period RFR2. The third to 120th frame periods may be controlled as the skip frame period, the pixel data may not be written, and the sub-pixels may be driven with the voltage stored in the capacitors Cst1 and Cst2.

Figure 7:
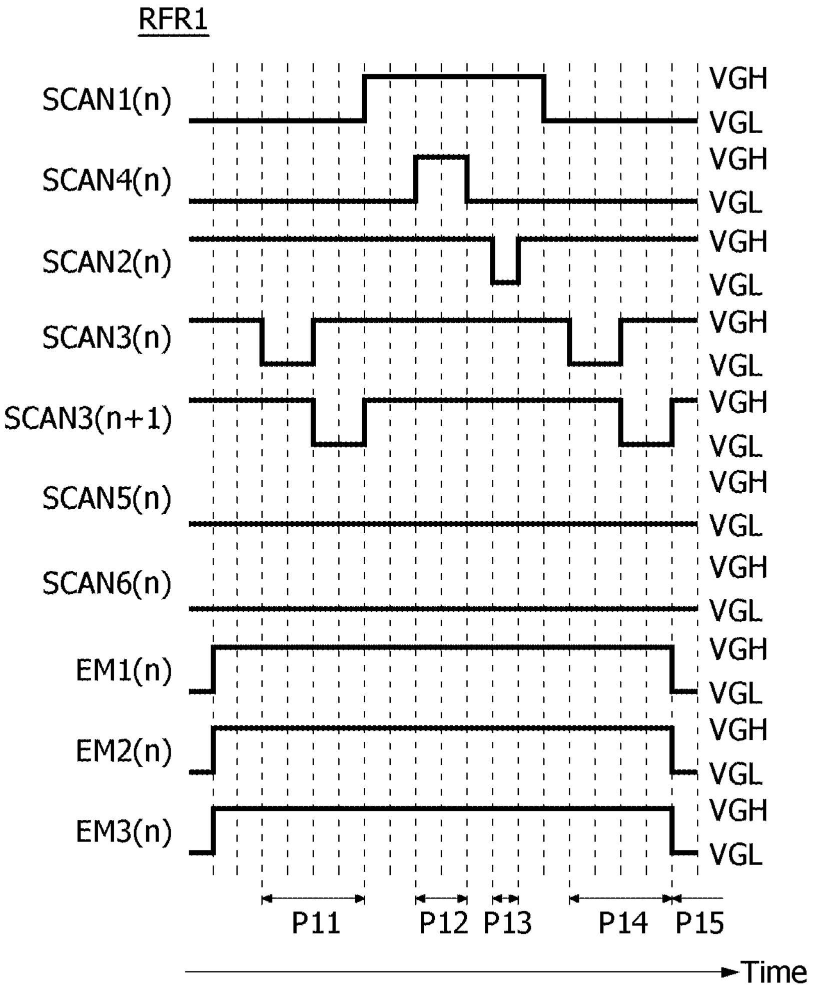
FIG. 7 is a waveform chart illustrating an example of the gate signals that are applied to the pixel circuit illustrated in FIG. 5 during the first refresh frame period.
Figure 8A:
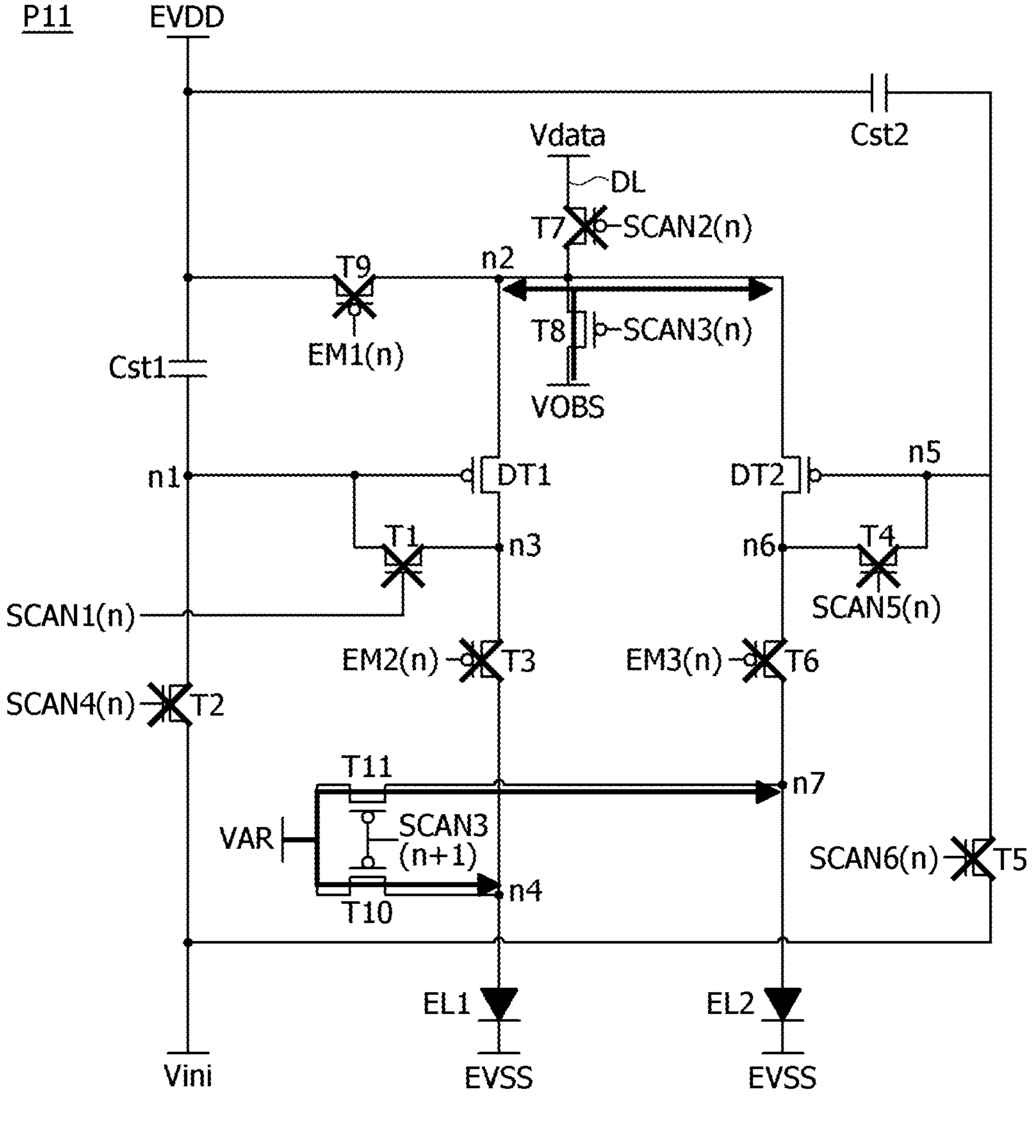
FIGS. 8A to 8E are circuit diagrams illustrating the operation of the pixel circuit illustrated in FIG. 5 during the first refresh frame period in stages.
Figure 8B:
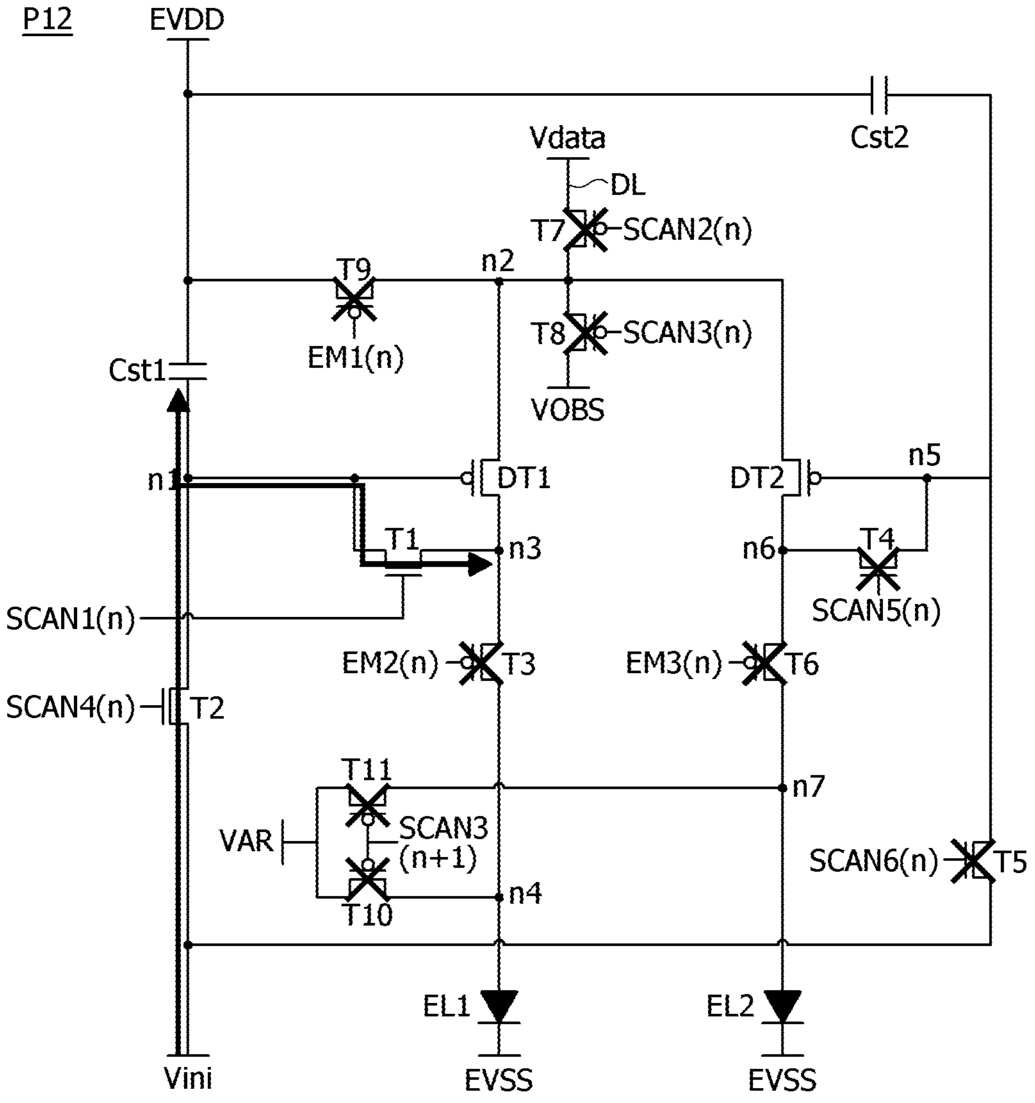
Figure 8C:
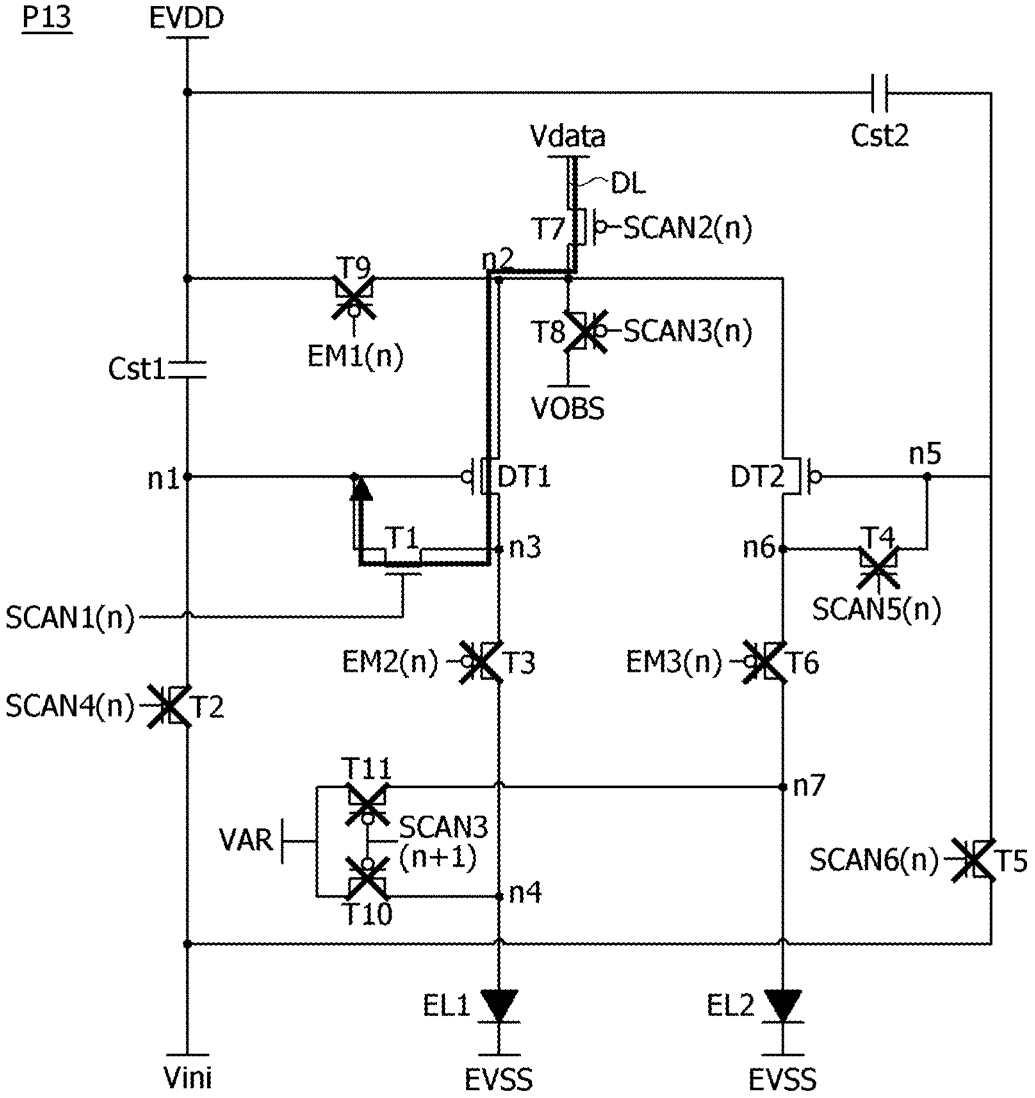
Figure 8D:
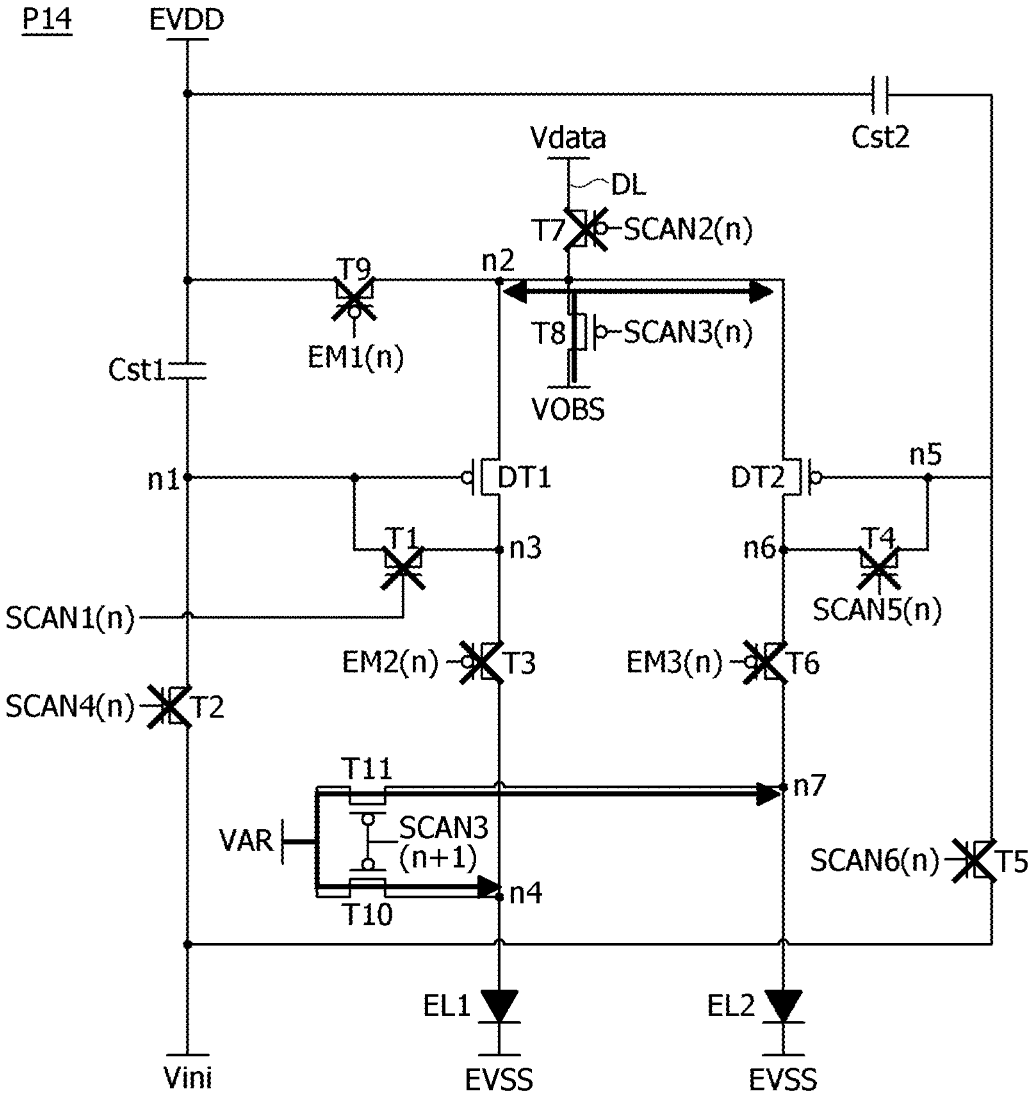
Figure 8E:
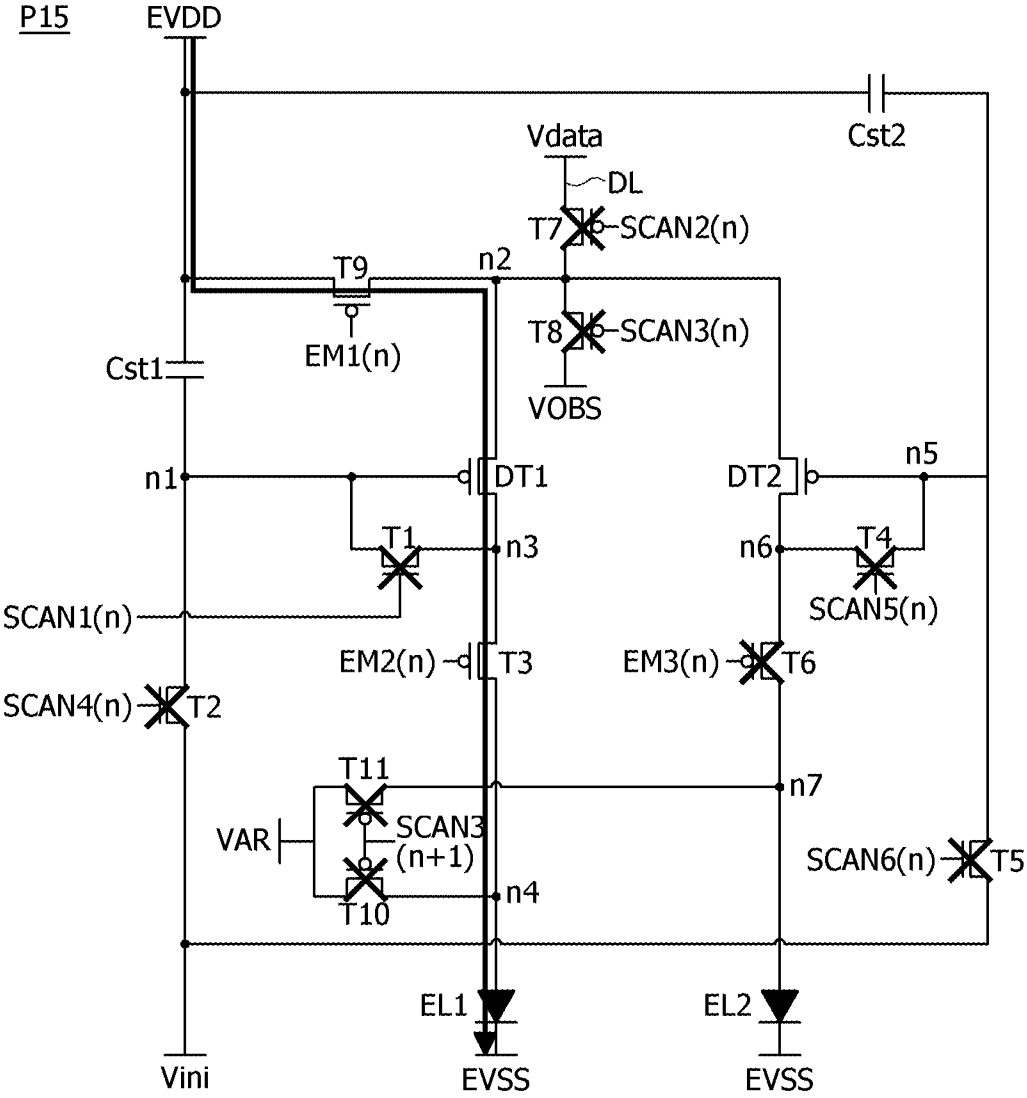

FIGS. 7 to 8E are diagrams illustrating the operation of the pixel circuit during the first refresh frame period in stages. FIG. 7 is a waveform chart illustrating an example of gate signals that are applied to the pixel circuit illustrated in FIG. 5 during the first refresh frame period. FIGS. 8A to 8E are circuit diagrams illustrating the operation of the pixel circuit illustrated in FIG. 5 during the first refresh frame period in stages. In FIGS. 8A to 8E, "X" indicates a transistor in an off state, and an arrow is a current path.

Referring to FIGS. 7 to 8E, the first refresh frame period RFR1 may include a first period P11, a second period P12, a third period P13, a fourth period P14, and a fifth period P15. During the first refresh frame period RFR1, the voltages of the fifth and sixth scan signals SCAN5(n) and SCAN6(n) that are input to the second driver 20 may be the gate low voltage VGL, and the voltage of the third EM signal EM3(n) may be the gate high voltage VGH. In this case, the switch transistors T4, T5, and T6 of the second driver 20 are maintained in the off state during the first refresh frame period RFR1.

During the first period P11, the voltages of the first, fourth, fifth, and sixth scan signals SCAN1(*n*), SCAN4(*n*), SCAN5(*n*), and SCAN6(*n*) are the gate low voltage VGL. The voltages of the third-first and third-second scan signals SCAN3(*n*) and SCAN3(*n*+1) are generated as the pulse of the gate low voltage VGL that is sequentially shifted during the first period P11. The voltage of the second scan signal SCAN2(*n*) is the gate high voltage VGH during the first period P11. The voltages of the EM signals EM1(*n*), EM2 (*n*), and EM3(*n*) are the gate high voltage VGH during the first period P11. Accordingly, during the first period P11, as illustrated in FIG. 8A, the eighth, tenth, and eleventh switch transistors T8, T10, and T11 are turned on, the on-bias voltage VOBS is applied to the second node n2, and the anode reset voltage VAR is applied to the fourth and seventh nodes n4 and n7.

During the first period P11, as illustrated in FIG. 8A, the switch transistors T1 to T6 of the first and second drivers 10 and 20, the seventh switch transistor T7, and the ninth switch transistor T9 are turned off in response to the gate off voltage (VGH or VGL). During the first period P11, the driving transistors DT1 and DT2 may be turned on; however, since the third and sixth switch transistors T3 and T6 are in the off state, a current cannot be supplied to the light-emitting elements EL1 and EL2. Furthermore, since a voltage difference between the anode reset voltage VAR and the cathode voltage EVSS is smaller than a threshold voltage of each of the light-emitting elements EL1 and EL2, the light-emitting elements EL1 and EL2 do not emit light during the first period P11.

During the second period P12, the voltages of the fifth and sixth scan signals SCAN5(*n*) and SCAN6(*n*) are the gate low voltage VGL, and the voltages of other gate signals SCAN1(*n*), SCAN2(*n*), SCAN3(*n*), SCAN3(*n*+1), SCAN4 (*n*), EM1(*n*), EM2(*n*), and EM3(*n*) are the gate high voltage VGH. Accordingly, during the second period P12, as illustrated in FIG. 8B, the first and second switch transistors T1 and T2 are turned on, and the initialization voltage Vini is applied to the first and third nodes n1 and n3. Other switch transistors T3 to T11 are in the off state. During the second period P12, since the light-emitting elements EL1 and EL2 are in the off state, the light-emitting elements EL1 and EL2 do not emit light.

During the third period P13, the voltage of the second scan signal SCAN2(*n*) is generated as the pulse of the gate low voltage VGL that is synchronized with the first pixel data voltage Vdata. During the third period P13, the voltages of the first and third scan signals SCAN1(*n*), SCAN3(*n*), and SCAN3(*n*+1) and the EM signals EM1(*n*), EM2(*n*), and EM3(*n*) are the gate high voltage VGH, and the voltage of the fourth scan signal SCAN4(*n*) is the gate low voltage VGL. During the third period P13, the voltages of the fifth and sixth scan signals SCAN5(*n*) and SCAN6(*n*) are maintained at the gate low voltage VGL. As illustrated in FIG. 8C, when the seventh switch transistor T7 is turned on in response to the gate low voltage VGL of the second scan signal SCAN2(*n*), the first pixel data voltage Vdata is applied to the second node n2. The data voltage Vdata is also applied to the first and third nodes n1 and n3 via the first driving transistor DT1 in the on state. When the third period P13 ends, the voltage of the second node n2 is the data voltage Vdata, and the voltage of each of the first and third nodes n1 and n3 is a voltage corresponding to a sum of the data voltage Vdata and a threshold voltage Vth of the first driving transistor DT1. During the third period P13, since the fourth and seventh nodes n4 and n7 are in a floating state, and the light-emitting elements EL1 and EL2 are in the off state, the light-emitting elements EL1 and EL2 do not emit light.

During the fourth period P14, the voltages of the first, fourth, fifth, and sixth scan signals SCAN1(*n*), SCAN4(*n*), SCAN5(*n*), and SCAN6(*n*) are the gate low voltage VGL. The voltages of the third-first and third-second scan signals SCAN3(*n*) and SCAN3(*n*+1) are generated as the pulse of the gate low voltage VGL that is sequentially shifted during the fourth period P14. The voltage of the second scan signal SCAN2(*n*) is the gate high voltage VGH during the fourth period P14. The voltages of the EM signals EM1(*n*), EM2 (*n*), and EM3(*n*) are the gate high voltage VGH during the fourth period P14. Accordingly, during the fourth period P14, as illustrated in FIG. 8D, the eighth, tenth, and eleventh switch transistors T8, T10, and T11 are turned on, the on-bias voltage VOBS is applied to the second node n2, and the anode reset voltage VAR is applied to the fourth and seventh nodes n4 and n7. During the fourth period P14, the switch transistors T1 to T6 of the first and second drivers 10 and 20, the seventh switch transistor T7, and the ninth switch transistor T9 are turned off.

During the fifth period P15, the voltages of the first, fourth, fifth, and sixth scan signals SCAN1(*n*), SCAN4(*n*), SCAN5(*n*), and SCAN6(*n*) are the gate low voltage VGL, and the voltages of the second and third scan signals SCAN2(*n*), SCAN3(*n*), and SCAN3(*n*+1) are the gate high voltage VGH. During the fifth period P15, the voltages of the first and second EM signals EM1(*n*) and EM2(*n*) may be the gate low voltage VGL, and the voltage of the third EM signal EM3(*n*) may be the gate high voltage VGH. In this case, as illustrated in FIG. 8E, during the fifth period P15, the third and ninth switch transistors T3 and T9 are turned on, a current path is formed between the pixel driving voltage EVDD and the first light-emitting element EL1, and the first light-emitting element EL1 may emit light. In this case, the first light-emitting element EL1 may emit light with luminance corresponding to the grayscale value of the first pixel data by a current that is generated according to the gate-source voltage Vgs of the first driving transistor DT1 charged in the first capacitor Cst1. During the fifth period P15, other switch transistors T1, T2, T4 to T8, T10, and T11 excluding the third and ninth switch transistors T3 and T9 may be in the off state.

During the fifth period P15, the voltages of the first, second, and third EM signals EM1(*n*), EM2(*n*), and EM3(*n*) may be the gate low voltage VGL. In this case, during the fifth period P15, the third, sixth, and ninth switch transistors T3, T6, and T9 may be turned on, the first light-emitting element EL1 may emit light by a current that is generated according to the gate-source voltage Vgs of the first driving transistor DT1 charged in the first capacitor Cst1, and the second light-emitting element EL2 may emit light by a current that is generated according to the gate-source voltage Vgs of the second driving transistor DT2 charged in the second capacitor Cst2. As a result, in one pixel circuit, the first pixel data can be reproduced with a wide viewing angle and the second pixel data can be reproduced with a narrow viewing angle.

Figure 9:
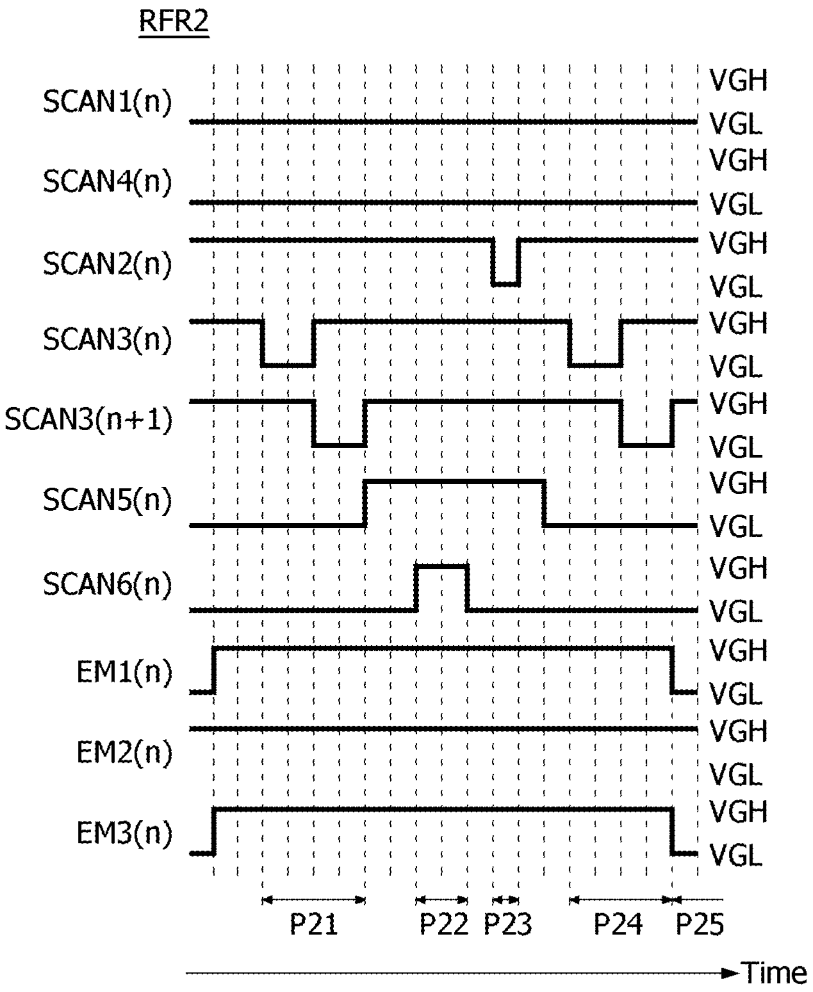
FIG. 9 is a waveform chart illustrating an example of the gate signals that are applied to the pixel circuit illustrated in FIG. 5 during the second refresh frame period.
Figure 10A:
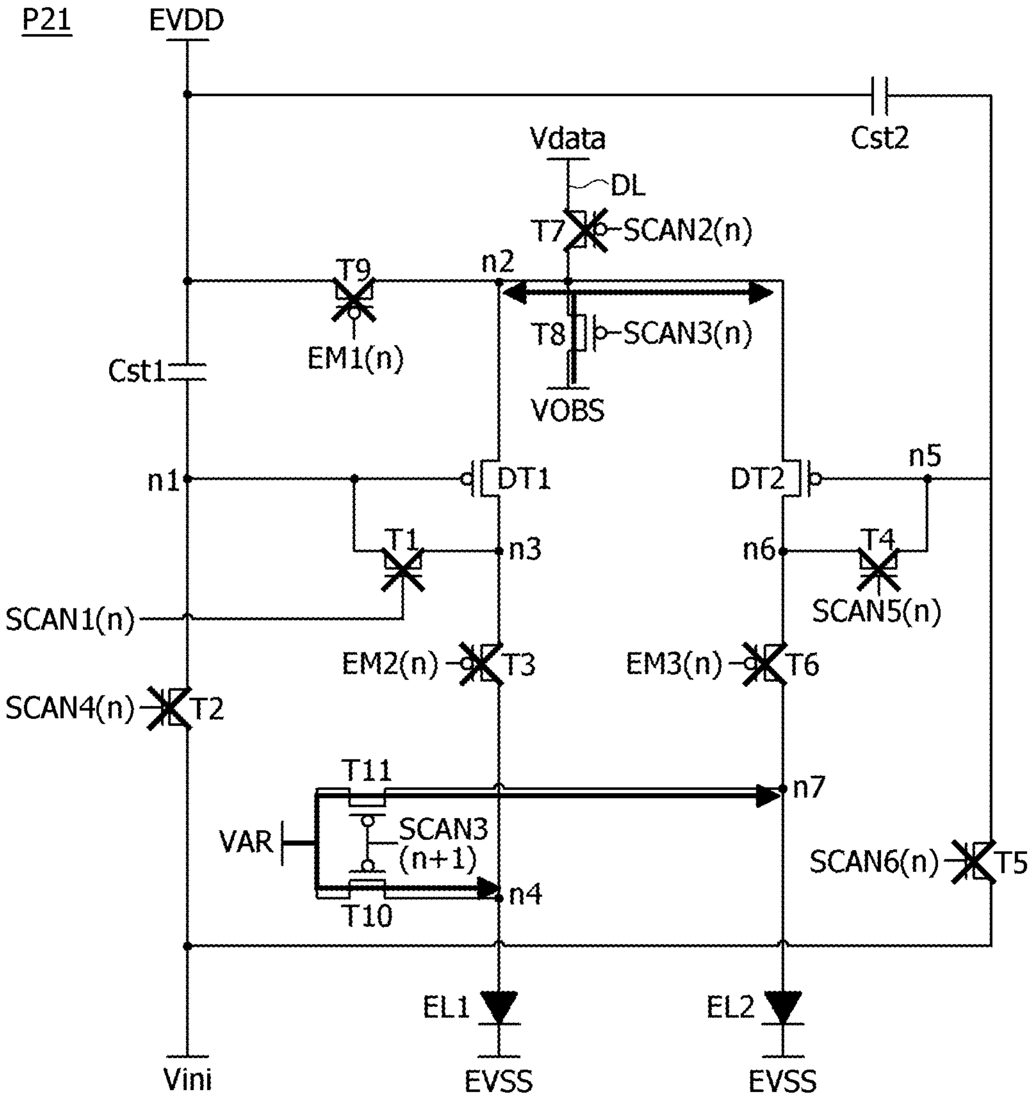
FIGS. 10A to 10E are circuit diagrams illustrating the operation of the pixel circuit illustrated in FIG. 5 during the second refresh frame period in stages.
Figure 10B:
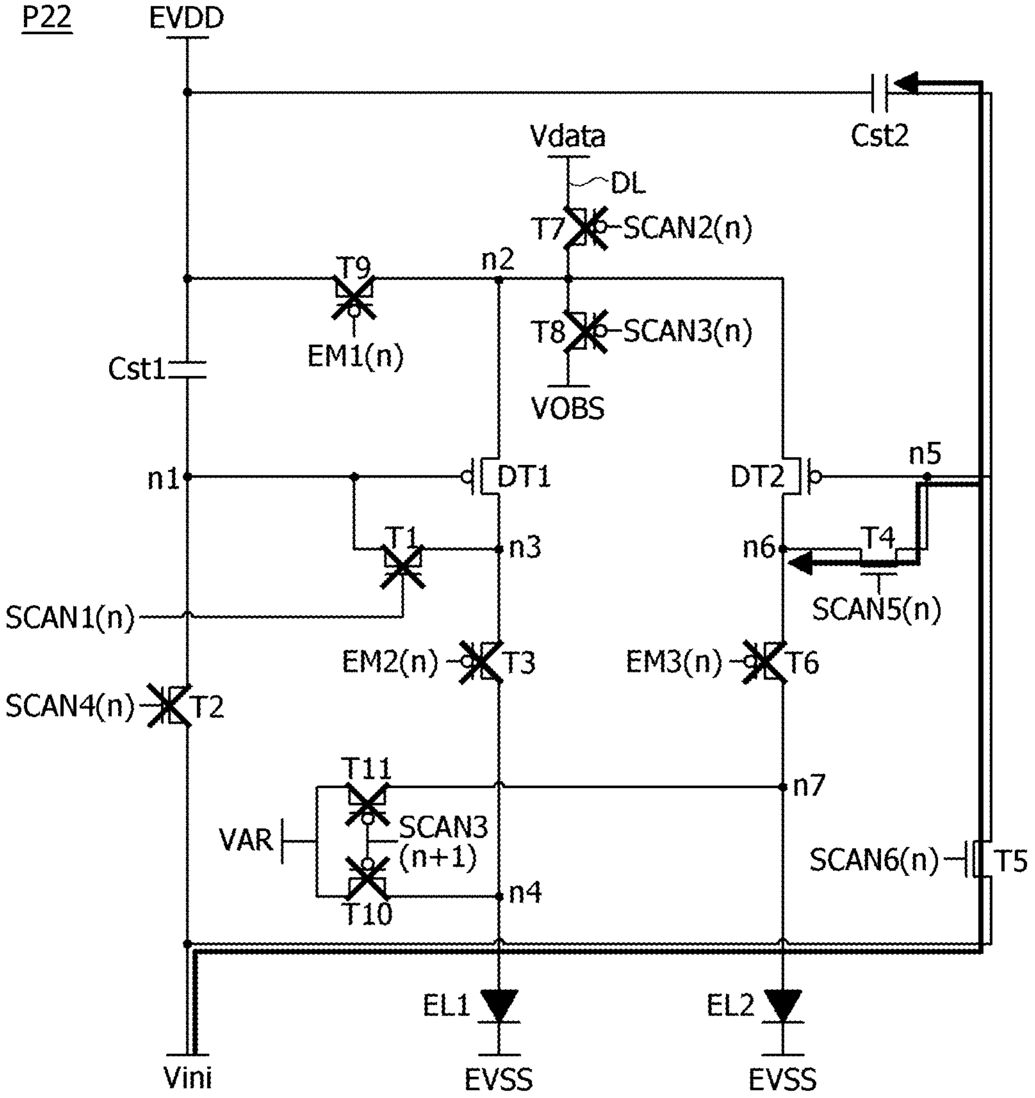
Figure 10C:
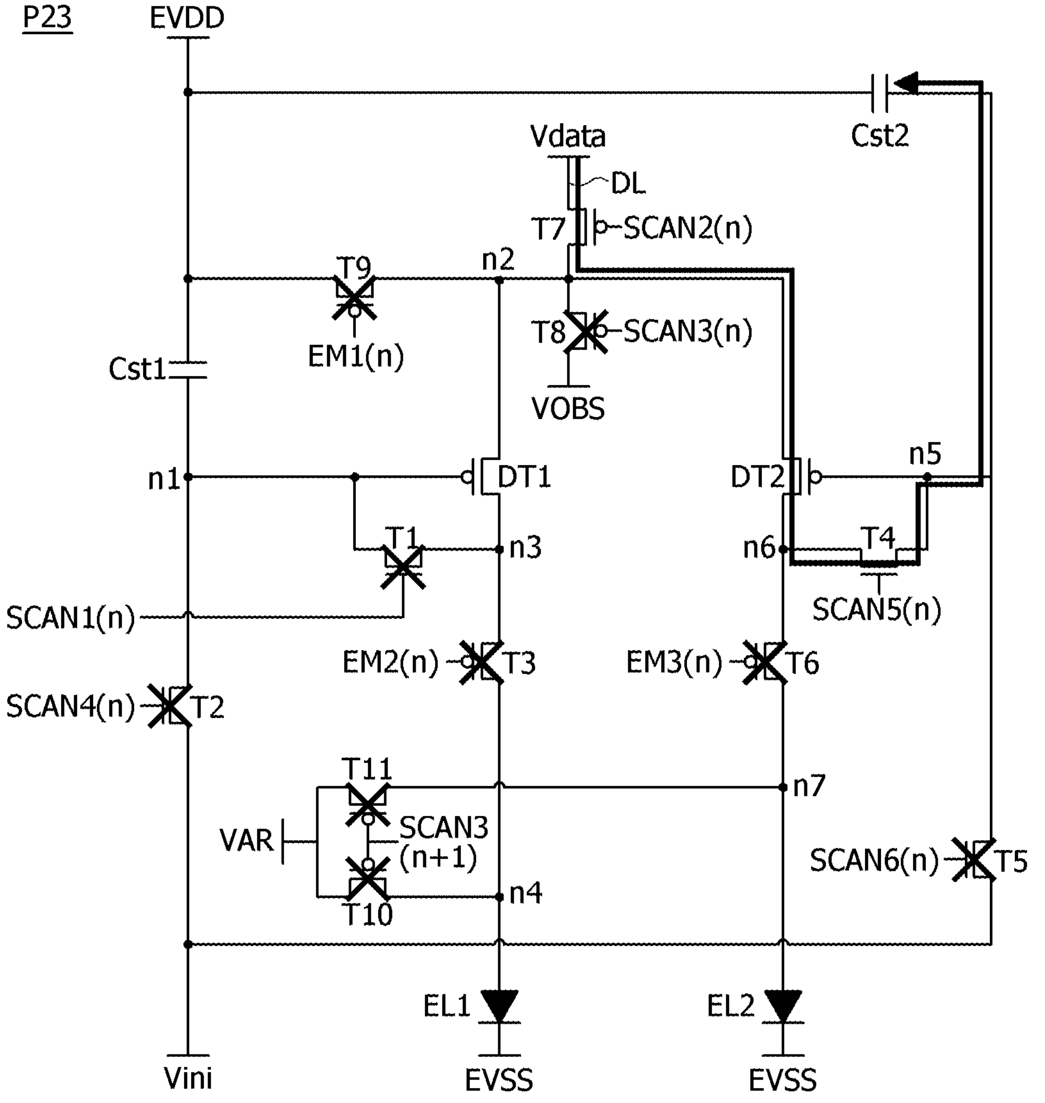
Figure 10D:
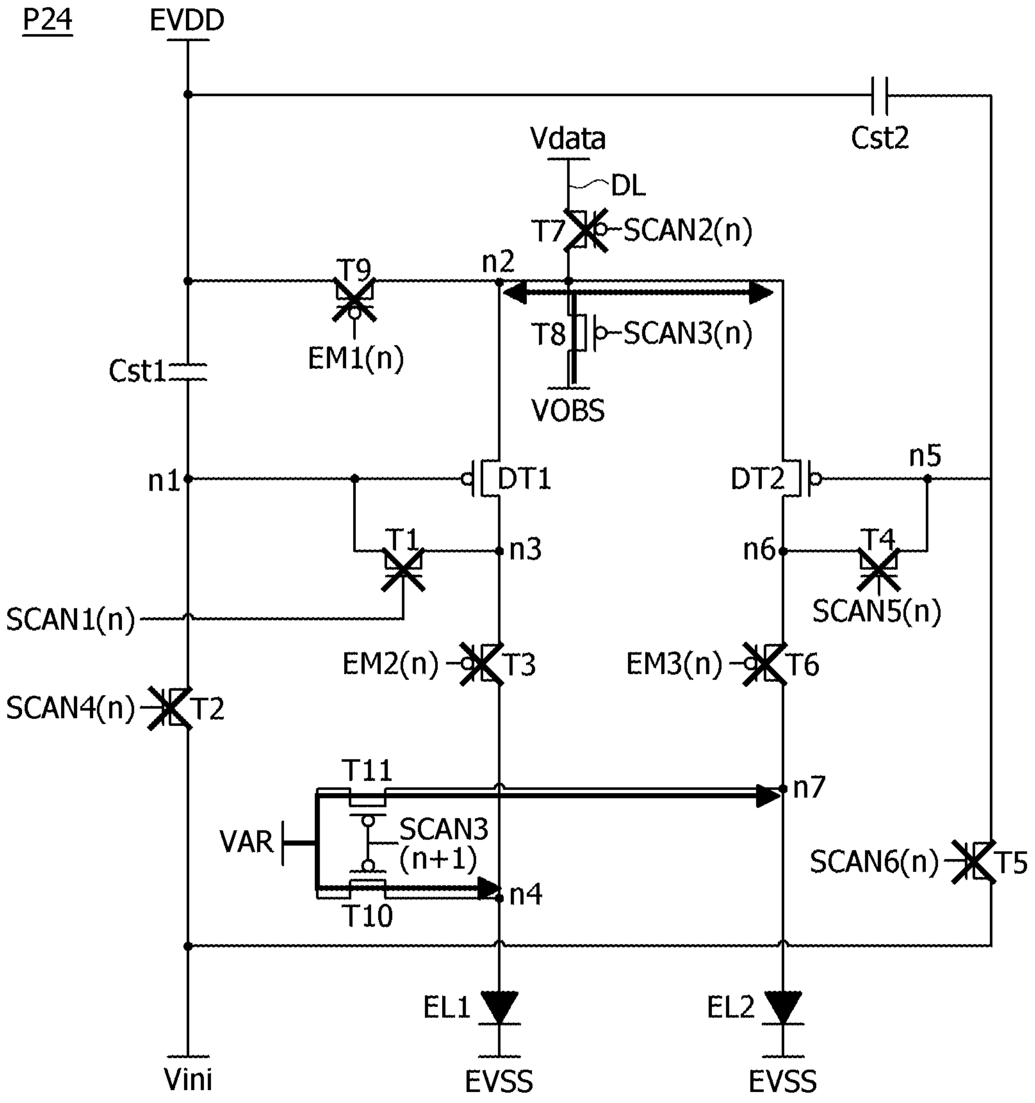
Figure 10E:
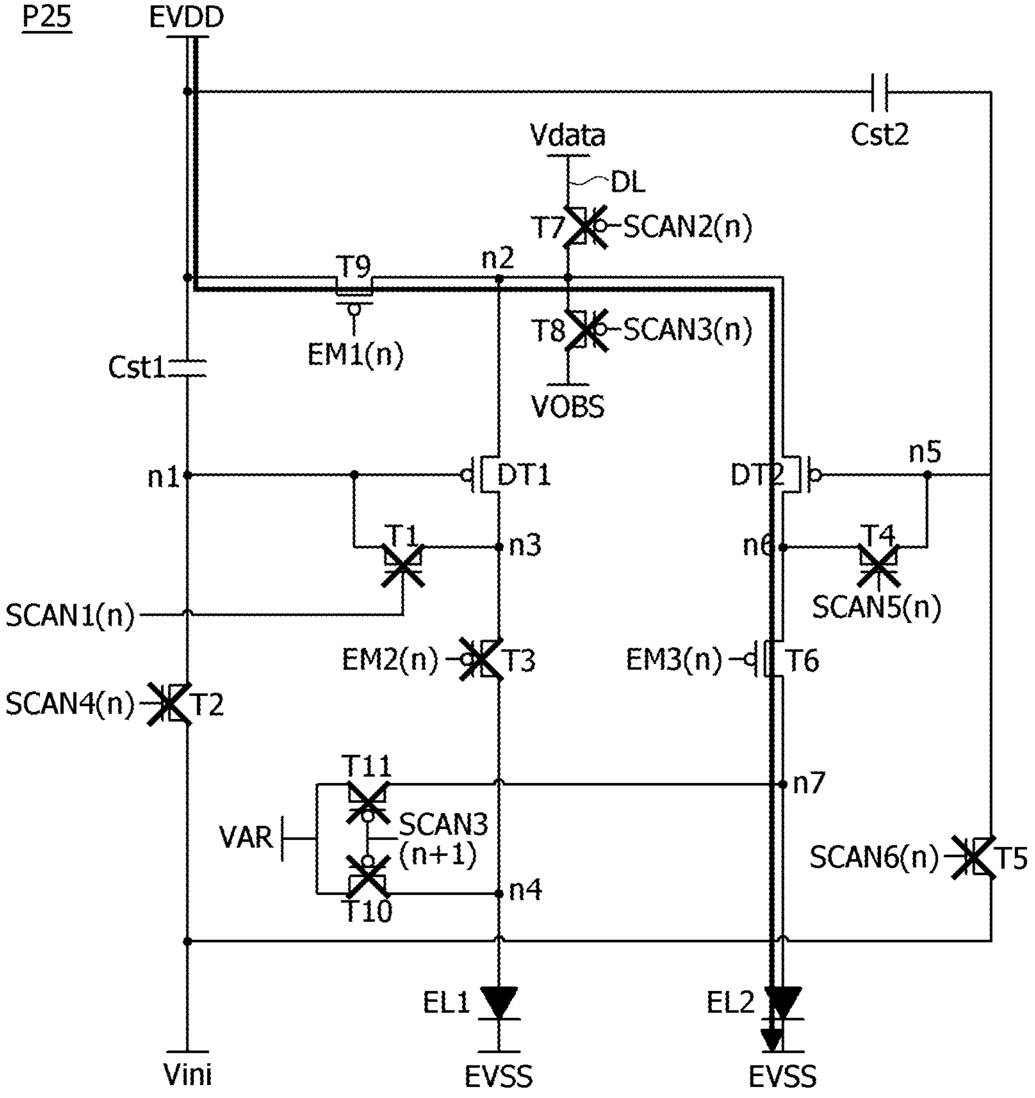

FIGS. 9 to 10E are drawings illustrating the operation of the pixel circuit during the second refresh frame period in stages. FIG. 9 is a waveform chart illustrating gate signals that are applied to the pixel circuit illustrated in FIG. 5 during the second refresh frame period. FIGS. 10A to 10E are circuit diagrams illustrating the operation of the pixel circuit illustrated in FIG. 5 during the second refresh frame period. In FIGS. 10A to 10E, "X" indicates a transistor in an off state, and an arrow is a current path.

Referring to FIGS. 9 to 10E, the second refresh frame period RFR2 may include a first period P21, a second period P22, a third period P23, a fourth period P24, and a fifth period P25. During the second refresh frame period RFR2, the voltages of the first and fourth scan signals SCAN1(*n*) and SCAN4(*n*) that are input to the first driver 10 may be the gate low voltage VGL, and the voltage of the second EM signal EM2(*n*) may be the gate high voltage VGH. In this case, during the second refresh frame period RFR2, the switch transistors T1, T2, and T3 of the first driver 10 are maintained in the off state.

During the first period P21, the voltages of the first, fourth, fifth, and sixth scan signals SCAN1(*n*), SCAN4(*n*), SCAN5(*n*), and SCAN6(*n*) are the gate low voltage VGL. The voltages of the third-first and third-second scan signals SCAN3(*n*) and SCAN3(*n*+1) are generated as the pulse of the gate low voltage VGL that is sequentially shifted during the first period P21. The voltage of the second scan signal SCAN2(*n*) is the gate high voltage VGH during the first period P21. The voltages of the EM signals EM1(*n*), EM2(*n*), and EM3(*n*) are the gate high voltage VGH during the first period P21. Accordingly, during the first period P21, as illustrated in FIG. 10A, the eighth, tenth, and eleventh switch transistors T8, T10, and T11 are turned on, the on-bias voltage VOBS is applied to the second node n2, and the anode reset voltage VAR is applied to the fourth and seventh nodes n4 and n7.

During the first period P21, as illustrated in FIG. 10A, the switch transistors T1 to T6 of the first and second drivers 10 and 20, the seventh switch transistor T7, and the ninth switch transistor T9 are turned off in response to the gate off voltage (VGH or VGL). During the first period P21, the driving transistors DT1 and DT2 may be turned on; however, since the third and sixth switch transistors T3 and T6 are in the off state, a current cannot be supplied to the light-emitting elements EL1 and EL2. Furthermore, since a voltage difference between the anode reset voltage VAR and the cathode voltage EVSS is smaller than the threshold voltage of each of the light-emitting elements EL1 and EL2, the light-emitting elements EL1 and EL2 do not emit light during the first period P21.

During the second period P22, the voltages of the first and fourth scan signals SCAN1(*n*) and SCAN4(*n*) are the gate low voltage VGL, and the voltages of other gate signals SCAN2(*n*), SCAN3(*n*), SCAN3(*n*+1), SCAN5(*n*), SCAN6(*n*), EM1(*n*), EM2(*n*), and the voltage of the EM3(*n*) are the gate high voltage VGH. Accordingly, during the second period P22, as illustrated in FIG. 10B, the fourth and fifth switch transistors T4 and T5 are turned on, and the initialization voltage Vini is applied to the fifth and sixth nodes n5 and n6. Other switch transistors T1, T2, T3, and T6 to T11 are in the off state. During the second period P22, since the light-emitting elements EL1 and EL2 are in the off state, the light-emitting elements EL1 and EL2 do not emit light.

During the third period P23, the voltage of the second scan signal SCAN2(*n*) is generated as the pulse of the gate low voltage VGL that is synchronized with the second pixel data voltage Vdata. During the third period P23, the voltages of the third and fifth scan signals SCAN3(*n*), SCAN3(*n*+1), and SCAN5(*n*) and the EM signals EM1(*n*), EM2(*n*), and EM3(*n*) are the gate high voltage VGH, and the voltage of the sixth scan signal SCAN6(*n*) is the gate low voltage VGL. During the third period P23, the voltages of the first and fourth scan signals SCAN1(*n*) and SCAN4(*n*) are maintained at the gate low voltage VGL. As illustrated in FIG. 10C, when the seventh switch transistor T7 is turned on in response to the gate low voltage VGL of the second scan signal SCAN2(*n*), the second pixel data voltage Vdata is applied to the second node n2. The data voltage Vdata is also applied to the fifth and sixth nodes n5 and n6 via the second driving transistor DT2 in the on state. When the third period P23 ends, the voltage of the second node n2 is the data voltage Vdata, and the voltage of each of the fifth and sixth nodes n5 and n6 is a voltage corresponding to a sum of the data voltage Vdata and a threshold voltage Vth of the second driving transistor DT2. During the third period P23, since the fourth and seventh nodes n4 and n7 are in a floating state, and the light-emitting elements EL1 and EL2 are in the off state, the light-emitting elements EL1 and EL2 do not emit light.

During the fourth period P24, the voltages of the first, fourth, fifth, and sixth scan signals SCAN1(*n*), SCAN4(*n*), SCAN5(*n*), and SCAN6(*n*) are the gate low voltage VGL. The voltages of the third-first and third-second scan signals SCAN3(*n*) and SCAN3(*n*+1) are generated as the pulse of the gate low voltage VGL that is sequentially shifted during the fourth period P24. The voltage of the second scan signal SCAN2(*n*) is the gate high voltage VGH during the fourth period P24. The voltages of the EM signals EM1(*n*), EM2(*n*), and EM3(*n*) are the gate high voltage VGH during the fourth period P24. Accordingly, during the fourth period P24, as illustrated in FIG. 10D, the eighth, tenth, and eleventh switch transistors T8, T10, and T11 are turned on, the on-bias voltage VOBS is applied to the second node n2, and the anode reset voltage VAR is applied to the fourth and seventh nodes n4 and n7. During the fourth period P24, the switch transistors T1 to T6 of the first and second drivers 10 and 20, the seventh switch transistor T7, and the ninth switch transistor T9 are turned off.

During the fifth period P25, the voltages of the first, fourth, fifth, and sixth scan signals SCAN1(*n*), SCAN4(*n*), SCAN5(*n*), and SCAN6(*n*) are the gate low voltage VGL, and the second and third scan signals SCAN2(*n*), SCAN3(*n*), and SCAN3(*n*+1) are the gate high voltage VGH. During the fifth period P25, the voltage of the first and third EM signals EM1(*n*) and EM3(*n*) may be the gate low voltage VGL, and the voltage of the second EM signal EM2(*n*) may be the gate high voltage VGH. In this case, as illustrated in FIG. 10E, during the fifth period P25, the sixth and ninth switch transistors T6 and T9 may be turned on, a current path may be formed between the pixel driving voltage EVDD and the second light-emitting element EL2, and the second light-emitting element EL2 may emit light. In this case, the second light-emitting element EL2 may emit light with luminance corresponding to the grayscale value of the second pixel data by a current that is generated according to the gate-source voltage Vgs of the second driving transistor DT2 charged in the second capacitor Cst2. During the fifth period P25, other switch transistors T1 to T5, T7, T8, T10, and T11 excluding the sixth and ninth switch transistors T6 and T9) may be in the off state.

During the fifth period P25, the voltages of the first, second, and third EM signals EM1(*n*), EM2(*n*), and EM3(*n*) may be the gate low voltage VGL. In this case, during the fifth period P25, the third, sixth, and ninth switch transistors T3, T6, and T9 may be turned on, the first light-emitting element EL1 may emit light by a current that is generated according to the gate-source voltage Vgs of the first driving transistor DT1 charged in the first capacitor Cst1, and the second light-emitting element EL2 may emit light by a current that is generated according to the gate-source voltage Vgs of the second driving transistor DT2 charged in the second capacitor Cst2. As a result, in one pixel circuit, the first pixel data can be reproduced with a wide viewing angle and the second pixel data can be reproduced with a narrow viewing angle.

To compensate for luminance fluctuation of the pixels when the refresh rate of the pixels is lowered, as illustrated in FIGS. 11 to 16B, a preset park voltage Vpark may be applied to the data lines. The park voltage Vpark may be applied to data lines connected to a driver not driven in the pixel circuit. The park voltage Vpark may be set to a voltage of 2 to 5 V, but the present disclosure is not limited thereto. Since an IR drop of the pixel driving voltage EVDD applied to the sub-pixels increases for high luminance, the park voltage Vpark that is optimal for preventing flickering may be set to a low voltage. Then, since the IR drop of the pixel driving voltage EVDD decreases for low luminance, the park voltage Vpark may be set to a high voltage. For example, when the luminance of the display panel is 450 nit in the refresh frame period, the park voltage Vpark that is applied to the data line in a next skip frame period may be made higher to 2.1 V. When the luminance of the display panel is 200 nit in the refresh frame period, the park voltage Vpark that is applied to the data line in a next skip frame period may be made higher to 2.5 V. When the luminance of the display panel is 20 nit in the refresh frame period, the park voltage Vpark that is applied to the data line in a next skip frame period may be made higher to 2.9 V. Here, the luminance may be average luminance.

Figure 11:
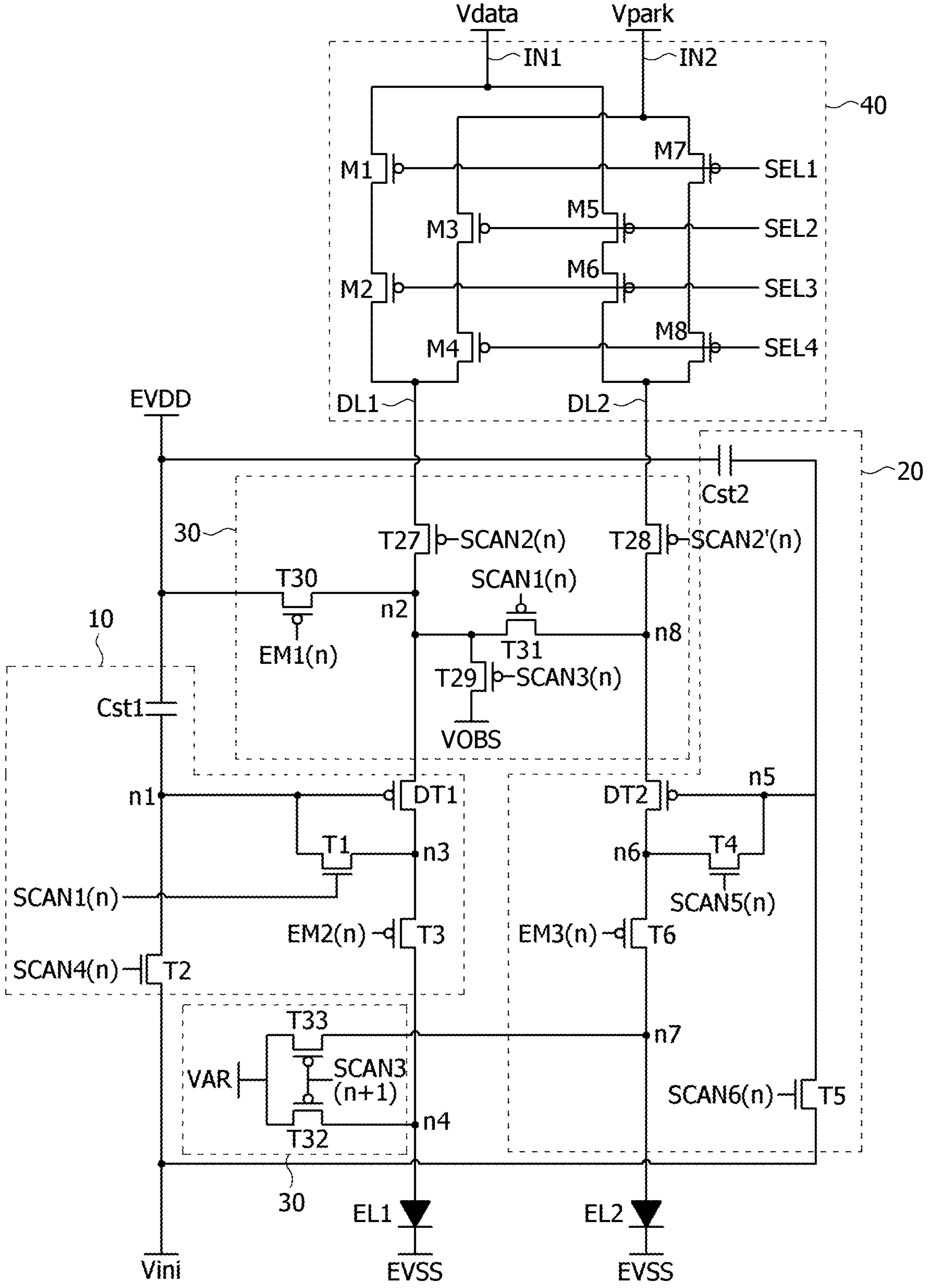
FIG. 11 is a circuit diagram illustrating a pixel circuit and a switch part according to another embodiment of the present disclosure.
Figure 12:
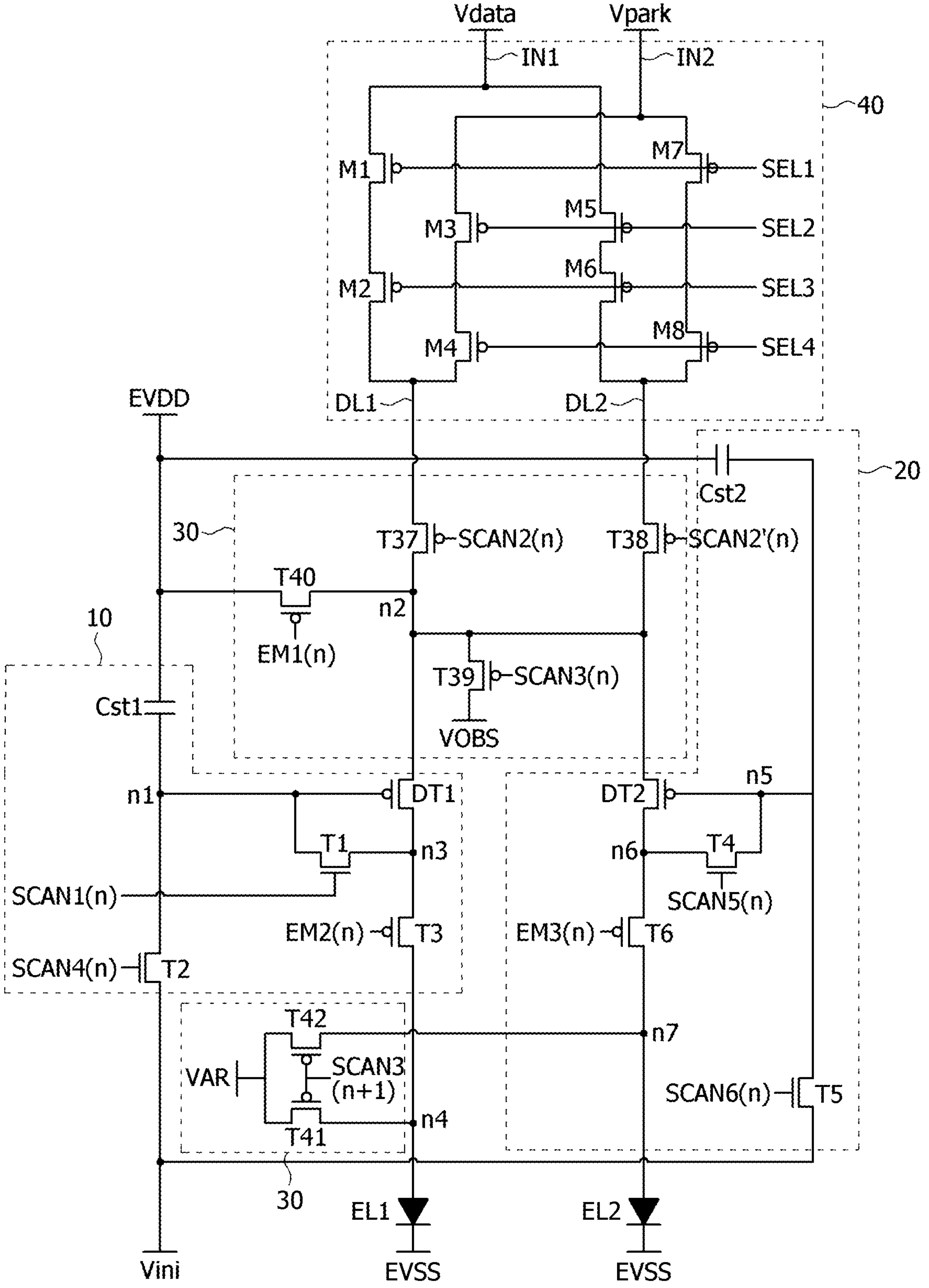
FIG. 12 is a circuit diagram illustrating a pixel circuit and a switch part according to still another embodiment of the present disclosure.

FIGS. 11 and 12 illustrate embodiments illustrating a pixel circuit and a data switch part with which a viewing angle can be changed and to which a park voltage can be applied. In these embodiments, substantially the same configurations as those in the pixel circuit illustrated in FIG. 5 are represented by the same reference numbers, and redundant description thereof will not be repeated.

Referring to FIG. 11, each of the sub-pixels of the display panel 100 includes a first driver 10 that drives the first light-emitting element EL1, a second driver 20 that drives the second light-emitting element EL2, a shared switch part 30 connected to the first driver 10 and the second driver 20, and a data switch part 40 connected to the shared switch part 30.

The first driver 10 includes a first driving transistor DT1, a first switch transistor T1, a second switch transistor T2, a third switch transistor T3, and a first capacitor Cst1. The first light-emitting element EL1 may be driven by a current that is generated according to a gate-source voltage of the first driving transistor DT1 charged in the first capacitor Cst1 and may emit light in a first viewing angle mode. When the first light-emitting element EL1 emits light, light may propagate with a wide viewing angle.

The second driver 20 includes a second driving transistor DT2, a fourth switch transistor T4, a fifth switch transistor T5, a sixth switch transistor T6, and a second capacitor Cst2. The second driving transistor DT2 includes a gate electrode connected to a fifth node n5, a first electrode connected to an eighth node n8, and a second electrode connected to a sixth node n6. The second light-emitting element EL2 may be driven by a current that is generated according to a gate-source voltage of the second driving transistor DT2 charged in the second capacitor Cst2 and may emit light in a second viewing angle mode. When the second light-emitting element EL2 emits light, light may propagate with a narrow viewing angle.

The shared switch part 30 includes seventh to thirteenth switch transistors T27 to T33. The seventh to thirteenth switch transistors T27 to T33 may be implemented by p-channel LTPS TFTs, but the present disclosure is not limited thereto.

Figure 13:
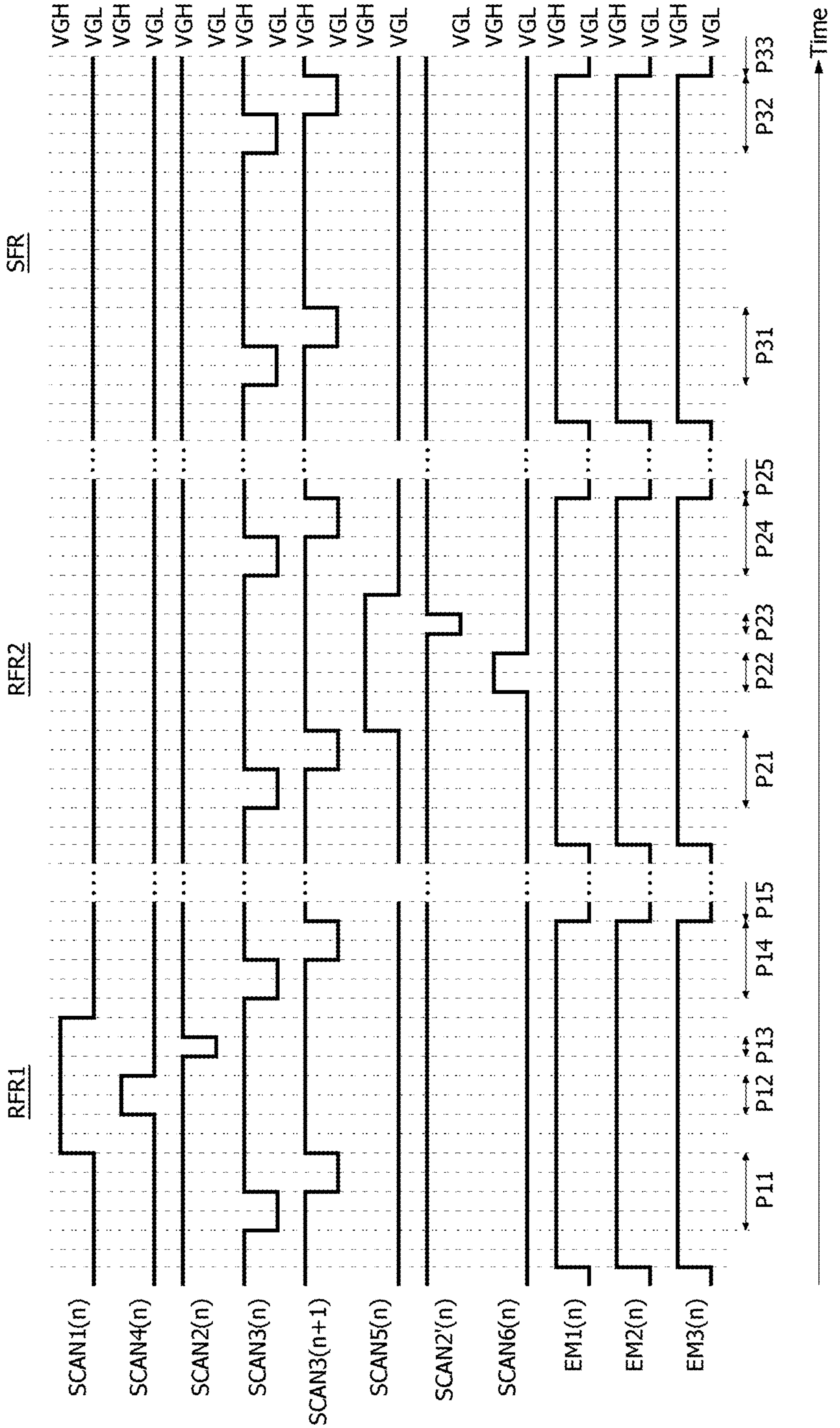
FIG. 13 is a waveform chart illustrating gate signals that are applied to the pixel circuits illustrated in FIGS. 11 and 12 during a first refresh frame period, a second refresh frame period, and a skip frame period.

A gate driver 120 may include a gate driver that outputs a second-first scan signal SCAN2(*n*) controlling the seventh switch transistor T27, and a gate driver that outputs a second-second scan signal SCAN2'(*n*) controlling the eighth switch transistor T28. As illustrated in FIG. 13, the second-first scan signal SCAN2(*n*) may include a pulse of a gate low voltage VGL that is generated in the first refresh frame period RFR1. As illustrated in FIG. 13, the second-second scan signal SCAN2'(*n*) may include a pulse of a gate low voltage VGL that is generated in the second refresh frame period RFR2.

The data switch part 40 may apply a pixel data voltage Vdata to a first data line DL1 and may apply a park voltage Vpark to a second data line DL2 in the first refresh frame period RFR1 under the control of the timing controller 130. The data switch part 40 may apply the pixel data voltage Vdata to the second data line DL2 and may apply the park voltage Vpark to the first data line DL1 in the second refresh frame period RFR2. The data switch part 40 may apply the park voltage Vpark to the first and second data lines DL1 and DL2 in the skip frame period SFR.

The seventh switch transistor T27 is connected between the first data line DL1 and a second node n2. The seventh switch transistor T27 may be turned on in response to the gate low voltage VGL of the second-first scan signal SCAN2(*n*) and may be turned off in response to a gate high voltage VGH of the second-first scan signal SCAN2(*n*). When the seventh switch transistor T27 is turned on, the first data line DL1 is electrically connected to the second node n2. The seventh switch transistor T27 includes a gate electrode connected to a second-first gate line to which the second-first scan signal SCAN2(*n*) is applied, a first electrode connected to the first data line DL1, and a second electrode connected to the second node n2.

The eighth switch transistor T28 is connected between the second data line DL2 and the eighth node n8. The eighth switch transistor T28 may be turned on in response to the gate low voltage VGL of the second-second scan signal SCAN2'(*n*) and may be turned off in response to a gate high voltage VGH of the second-second scan signal SCAN2'(*n*). When the eighth switch transistor T28 is turned on, the second data line DL2 is electrically connected to the eighth node n8. The eighth switch transistor T28 includes a gate electrode connected to a second-second gate line to which the second-second scan signal SCAN2'(*n*) is applied, a first electrode connected to the second data line DL2, and a second electrode connected to the eighth node n8.

The ninth switch transistor T29 is connected between the second node n2 and the fifth voltage node to which the on-bias voltage VOBS is applied. The ninth switch transistor T29 may be turned on in response to a gate low voltage VGL of a third-first scan signal SCAN3(*n*) and may be turned off in response to a gate high voltage VGH of the third-first scan signal SCAN3(*n*). When the ninth switch transistor T29 and the eleventh switch transistor T31 are turned on, the on-bias voltage VOBS is applied to the second and eighth nodes n2 and n8. The ninth switch transistor T29 includes a gate electrode connected to a third-first gate line to which the third-first scan signal SCAN3(*n*) is applied, a first electrode connected to the second node n2, and a second electrode to which the on-bias voltage VOBS is applied.

The tenth switch transistor T30 is connected between the first voltage node to which the pixel driving voltage EVDD is applied and the second node n2. The tenth switch transistor T30 may be turned on in response to the gate low voltage VGL of the first EM signal EM1(n) and may be turned off in response to the gate high voltage VGH of the first EM signal EM1(n). When the tenth switch transistor T30 and the eleventh switch transistor T31 are turned on, the pixel driving voltage EVDD is applied to the second and eighth nodes n2 and n8. The tenth switch transistor T30 includes a gate electrode connected to the seventh gate line to which the first EM signal EM1(n) is applied, a first electrode connected to the first voltage node, and a second electrode connected to the second node n2.

The eleventh switch transistor T31 is connected between the second node n2 and the eighth node n8, and may be turned on in response to the gate low voltage VGL of the first scan signal SCAN1(n) and turned off in response to the gate high voltage VGH of the first scan signal SCAN1(n). When the eleventh switch transistor T31 is turned on, the second node n2 is electrically connected to the eighth node n8. The eleventh switch transistor T31 includes a gate electrode connected to the first gate line to which the first scan signal SCAN1(n) is applied, a first electrode connected to the second node n2, and a second electrode connected to the eighth node n8.

The first switch transistor T1 and the eleventh switch transistor T31 may be implemented by different types of transistors and may operate to be opposite to each other in response to the pulse of the first scan signal SCAN1(n). For example, as illustrated in FIGS. 14A to 14E, when the first switch transistor T1 is turned off, the eleventh switch transistor T31 may be turned on. When the first switch transistor T1 is turned on, the eleventh switch transistor T31 may be turned off.

When the twelfth switch transistor T32 is turned on, the anode reset voltage VAR is applied to a fourth node n4. The twelfth switch transistor T32 includes a gate electrode connected to the third-second gate line to which the third-second scan signal SCAN3(n+1) is applied, a first electrode connected to the fourth node n4, and a second electrode connected to the fourth voltage node to which the anode reset voltage VAR is applied.

When the thirteenth switch transistor T33 is turned on, the anode reset voltage VAR is applied to a seventh node n7. The thirteenth switch transistor T33 includes a gate electrode connected to the third-second gate line to which the third-second scan signal SCAN3(n+1) is applied, a first electrode connected to the seventh node n7, and a second electrode connected to the fourth voltage node.

The data switch part 40 includes first to eighth transistors M1 to M8. The first to eighth transistors M1 to M8 may be implemented by p-channel LTPS TFTs that are turned on in response to the gate low voltage VGL and are turned off in response to the gate high voltage VGH, but the present disclosure is not limited thereto. The data switch part 40 may be built in a drive IC in which the data driver 110 is integrated or may be provided in the non-display area NA of the display panel 100. Each of the transistors M1 to M8 of the data switch part 40 may be turned on/off under the control of the timing controller 130. A level shifter 140 may output selection signals SEL1 to SEL4 that swing between the gate low voltage VGL and the gate high voltage VGH in response to the clock input from the timing controller 130.

The first and second transistors M1 and M2 are connected in series between a first input node IN1 and the first data line DL1. The data voltage Vdata or the park voltage Vpark output from a first channel of the data driver 110 may be applied to the first input node IN1. In another embodiment, the park voltage Vpark may be output from the power supply 150. The first transistor M1 may be turned on in response to a gate low voltage VGL of a first selection signal SEL1. When the first transistor M1 is turned on, the first input node IN1 is electrically connected to a first electrode of the second transistor M2. The first transistor M1 includes a gate electrode connected to a first selection line to which the first selection signal SEL1 is applied, a first electrode connected to the first input node IN1, and a second electrode connected to the first electrode of the second transistor M2.

The second transistor M2 may be turned on in response to a gate low voltage VGL of a third selection signal SEL3. When the second transistor M2 is turned on, the second electrode of the first transistor M1 is electrically connected to the first data line DL1. The second transistor M2 includes a gate electrode connected to a third selection line to which the third selection signal SEL3 is applied, the first electrode connected to the second electrode of the first transistor M1, and a second electrode connected to the first data line DL1.

The third and fourth transistors M3 and M4 are connected in series between a second input node IN2 and the first data line DL1. The data voltage Vdata or the park voltage Vpark output from a second channel of the data driver 110 may be applied to the second input node IN2. The park voltage Vpark may be output from the power supply 150. The third transistor M3 may be turned on in response to a gate low voltage VGL of a second selection signal SEL2. When the third transistor M3 is turned on, the second input node IN2 is electrically connected to a first electrode of the fourth transistor M4. The third transistor M3 includes a gate electrode connected to a second selection line to which the second selection signal SEL2 is applied, a first electrode connected to the second input node IN2, and a second electrode connected to a first electrode of the fourth transistor M4.

The fourth transistor M4 may be turned on in response to a gate low voltage VGL of a fourth selection signal SEL4. When the fourth transistor M4 is turned on, the second electrode of the third transistor M3 is electrically connected to the first data line DL1. The fourth transistor M4 includes a gate electrode connected to a fourth selection line to which the fourth selection signal SEL4 is applied, the first electrode connected to the second electrode of the third transistor M3, and a second electrode connected to the first data line DL1.

The fifth and sixth transistors M5 and M6 are connected in series between the first input node IN1 and the second data line DL2. The fifth transistor M5 may be turned on in response to the gate low voltage VGL of the second selection signal SEL2. When the fifth transistor M5 is turned on, the first input node IN1 is electrically connected to a first electrode of the sixth transistor M6. The fifth transistor M5 includes a gate electrode connected to the second selection line to which the second selection signal SEL2 is applied, a first electrode connected to the first input node IN1, and a second electrode connected to the first electrode of the sixth transistor M6.

The sixth transistor M6 may be turned on in response to the gate low voltage VGL of the third selection signal SEL3. When the sixth transistor M6 is turned on, the second electrode of the fifth transistor M5 is electrically connected to the second data line DL2. The sixth transistor M6 includes a gate electrode connected to the third selection line to which the third selection signal SEL3 is applied, the first electrode connected to the second electrode of the fifth transistor M5, and a second electrode connected to the second data line DL2.

The seventh and eighth transistors M7 and M8 are connected in series between the second input node IN2 and the second data line DL2. The seventh transistor M7 may be turned on in response to the gate low voltage VGL of the first selection signal SEL1. When the seventh transistor M7 is turned on, the second input node IN2 is electrically connected to a first electrode of the eighth transistor M8. The seventh transistor M7 includes a gate electrode connected to the first selection line to which the first selection signal SEL1 is applied, a first electrode connected to the second input node IN2, and a second electrode connected to the first electrode of the eighth transistor M8.

The eighth transistor M8 may be turned on in response to the gate low voltage VGL of the fourth selection signal SEL4. When the eighth transistor M8 is turned on, the second electrode of the seventh transistor M7 is electrically connected to the second data line DL2. The eighth transistor M8 includes a gate electrode connected to the fourth selection line to which the fourth selection signal SEL4 is applied, the first electrode connected to the second electrode of the seventh transistor M7, and a second electrode connected to the second data line DL2.

Referring to FIG. 12, each of the sub-pixels of the display panel 100 includes a first driver 10 that drives the first light-emitting element EL1, a second driver 20 that drives the second light-emitting element EL2, a shared switch part 30 connected to the first driver 10 and the second driver 20, and a data switch part 40 connected to the shared switch part 30. The first driver 10, the second driver 20, and the data switch part 40 are substantially the same as those in the pixel circuit illustrated in FIG. 11 described above.

The first driving transistor DT1 includes the gate electrode connected to the first node n1, the first electrode connected to the second node n2, and the second electrode connected to the third node n3, and generates a current for driving the first light-emitting element EL1. The second driving transistor DT2 includes the gate electrode connected to the fifth node n5, the first electrode connected to the second node n2, and the second electrode connected to the sixth node n6, and generates a current for driving the second light-emitting element EL2.

The shared switch part 30 includes seventh to twelfth switch transistors T37 to T42. The seventh to twelfth switch transistors T37 to T42 may be implemented by p-channel LTPS TFTs, but the present disclosure is not limited thereto.

The seventh switch transistor T37 is connected between the first data line DL1 and the second node n2. The seventh switch transistor T37 may be turned on in response to the gate low voltage VGL of the second-first scan signal SCAN2(*n*). When the seventh switch transistor T37 is turned on, the first data line DL1 is electrically connected to the second node n2. The eighth switch transistor T38 is connected between the second data line DL2 and the second node n2. The eighth switch transistor T38 may be turned on in response to the gate low voltage VGL of the second-second scan signal SCAN2'(*n*). When the eighth switch transistor T38 is turned on, the second data line DL2 is electrically connected to the second node n2.

The seventh switch transistor T37 includes a gate electrode connected to the second-first gate line to which the second-first scan signal SCAN2(*n*) is applied, a first electrode connected to the first data line DL1, and a second electrode connected to the second node n2. The eighth switch transistor T38 includes a gate electrode connected to the second-second gate line to which the second-second scan signal SCAN2'(*n*) is applied, a first electrode connected to the second data line DL2, and a second electrode connected to the second node n2.

The ninth switch transistor T39 is connected between the second node n2 and the fifth voltage node to which the on-bias voltage VOBS is applied. The ninth switch transistor T39 may be turned on in response to the gate low voltage VGL of the third-first scan signal SCAN3(*n*). When the ninth switch transistor T39 is turned on, the on-bias voltage VOBS is applied to the second node n2. The ninth switch transistor T39 includes a gate electrode connected to the third-first gate line to which the third-first scan signal SCAN3(*n*) is applied, a first electrode connected to the second node n2, and a second electrode to which the on-bias voltage VOBS is applied.

The tenth switch transistor T40 is connected between the first voltage node to which the pixel driving voltage EVDD is applied and the second node n2. The tenth switch transistor T40 is turned on in response to the gate low voltage VGL of the first EM signal EM1(*n*) and applies the pixel driving voltage EVDD to the second node n2.

When the eleventh switch transistor T41 is turned on, the anode reset voltage VAR is applied to the fourth node n4. The eleventh switch transistor T41 includes a gate electrode connected to the third-second gate line to which the third-second scan signal SCAN3(*n*+1) is applied, a first electrode connected to the fourth node n4, and a second electrode connected to the fourth voltage node to which the anode reset voltage VAR is applied.

When the twelfth switch transistor T42 is turned on, the anode reset voltage VAR is applied to the seventh node n7. The twelfth switch transistor T42 includes a gate electrode connected to the third-second gate line to which the third-second scan signal SCAN3(*n*+1) is applied, a first electrode connected to the seventh node n7, and a second electrode connected to the fourth voltage node.

Hereinafter, the operation of the pixel circuit illustrated in FIG. 11 will be described with reference to FIGS. 13 to 16. The pixel circuit illustrated in FIG. 11 is different from the pixel circuit illustrated in 12 in that the switch transistor T31 that selectively connects the second node n2 and the eighth node n8 is provided, and the rest of operation is substantially the same. Thus, the description of the operation of the pixel circuit illustrated in FIG. 12 will not be repeated.

FIG. 13 is a waveform chart illustrating gate signals that are applied to the pixel circuits illustrated in FIGS. 11 and 12 during the first refresh frame period, the second refresh frame period, and the skip frame period. FIGS. 14A to 14E are circuit diagrams illustrating the operation of the pixel circuit illustrated in FIG. 11 during the first refresh frame period in stages. FIGS. 15A to 15E are circuit diagrams illustrating the operation of the pixel circuit illustrated in FIG. 11 during the second refresh frame period in stages. FIGS. 16A and 16B are circuit diagrams illustrating the operation of the pixel circuit illustrated in FIG. 11 during the skip frame period in stages. In FIGS. 14A to 16B, "X" indicates a transistor in an off state, and an arrow is a current path.

Figure 14A:
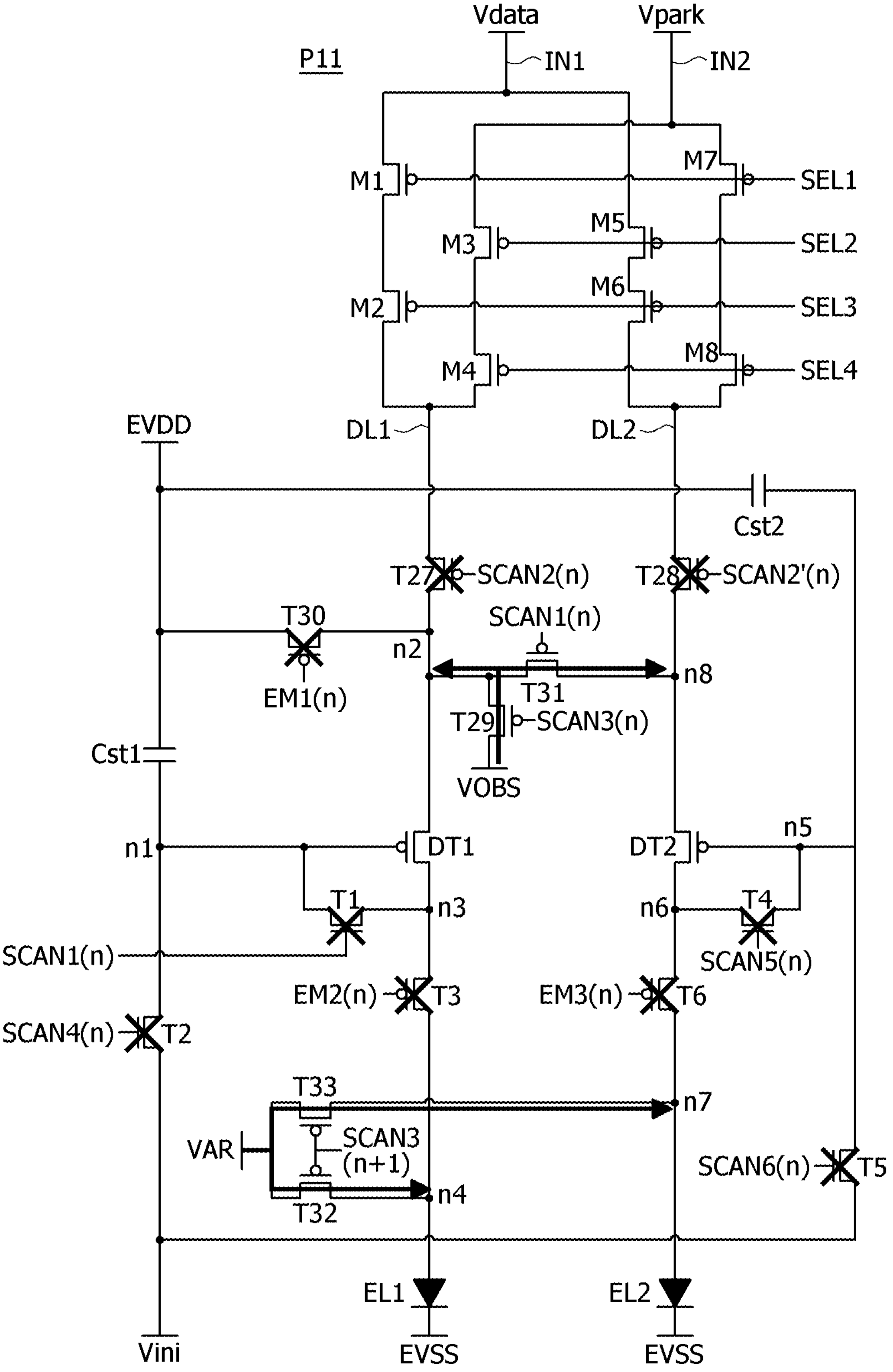
FIGS. 14A to 14E are circuit diagrams illustrating the operation of the pixel circuit illustrated in FIG. 11 during the first refresh frame period in stages.
Figure 14B:
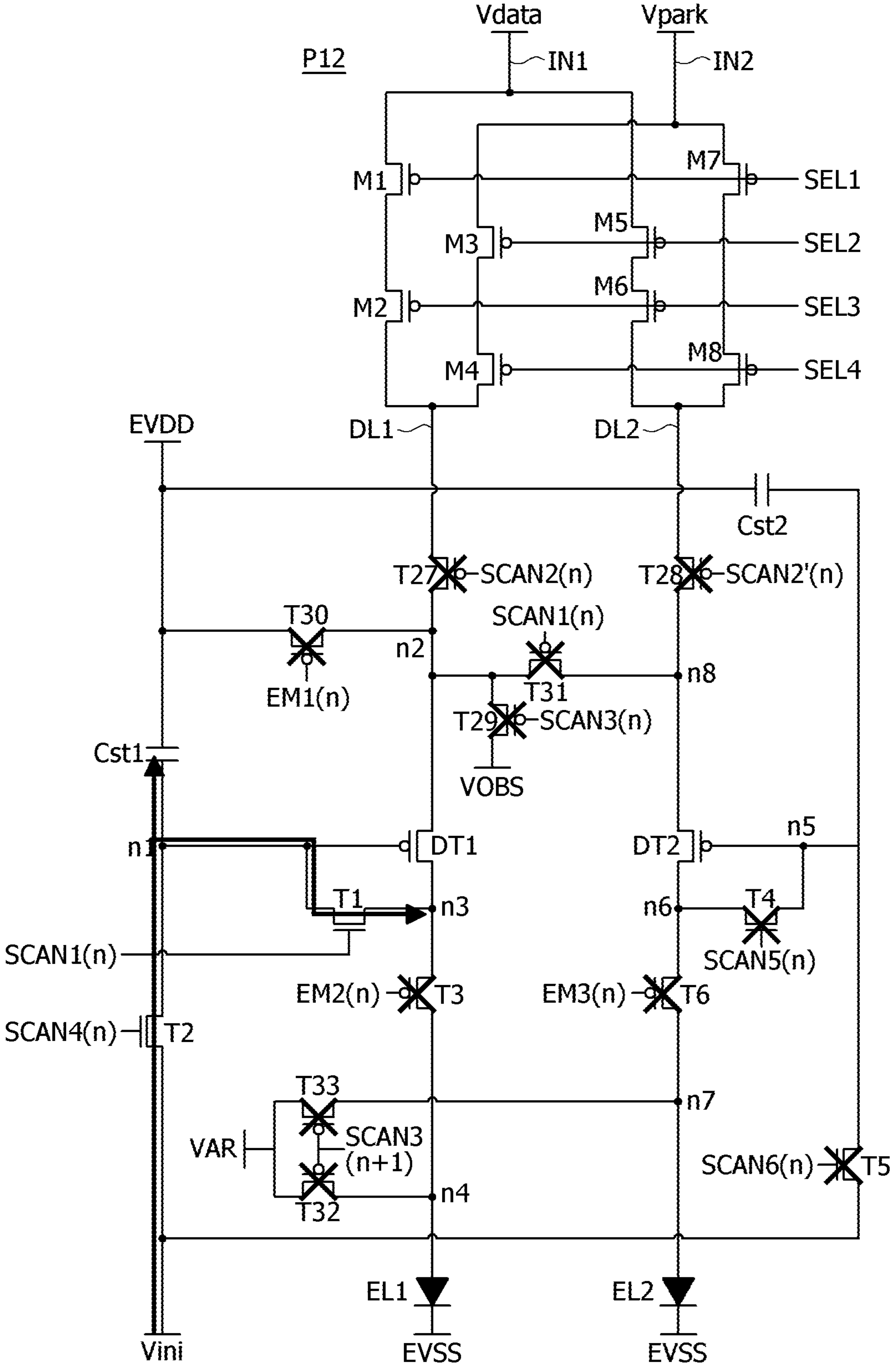
Figure 14C:
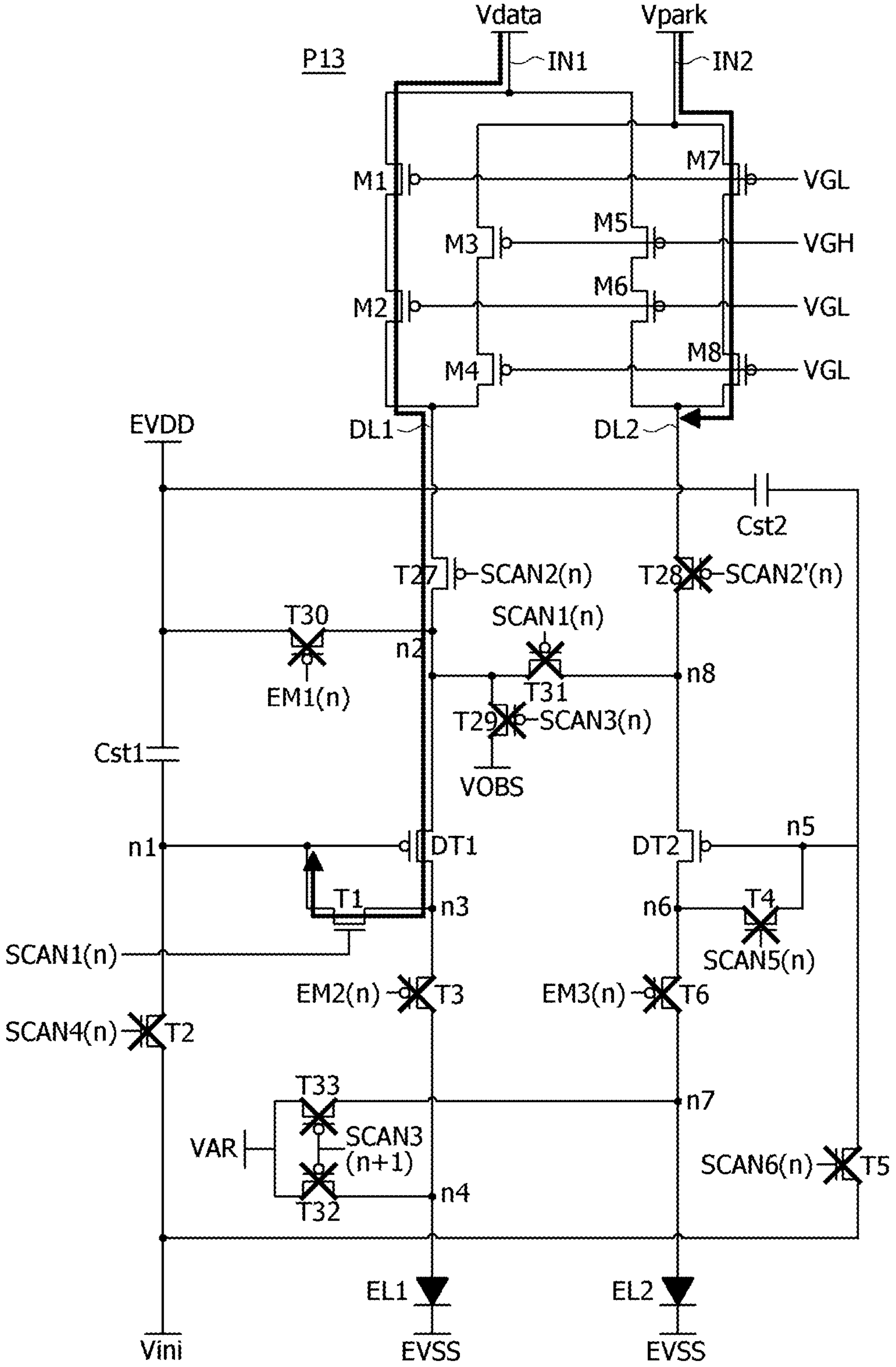
Figure 14D:
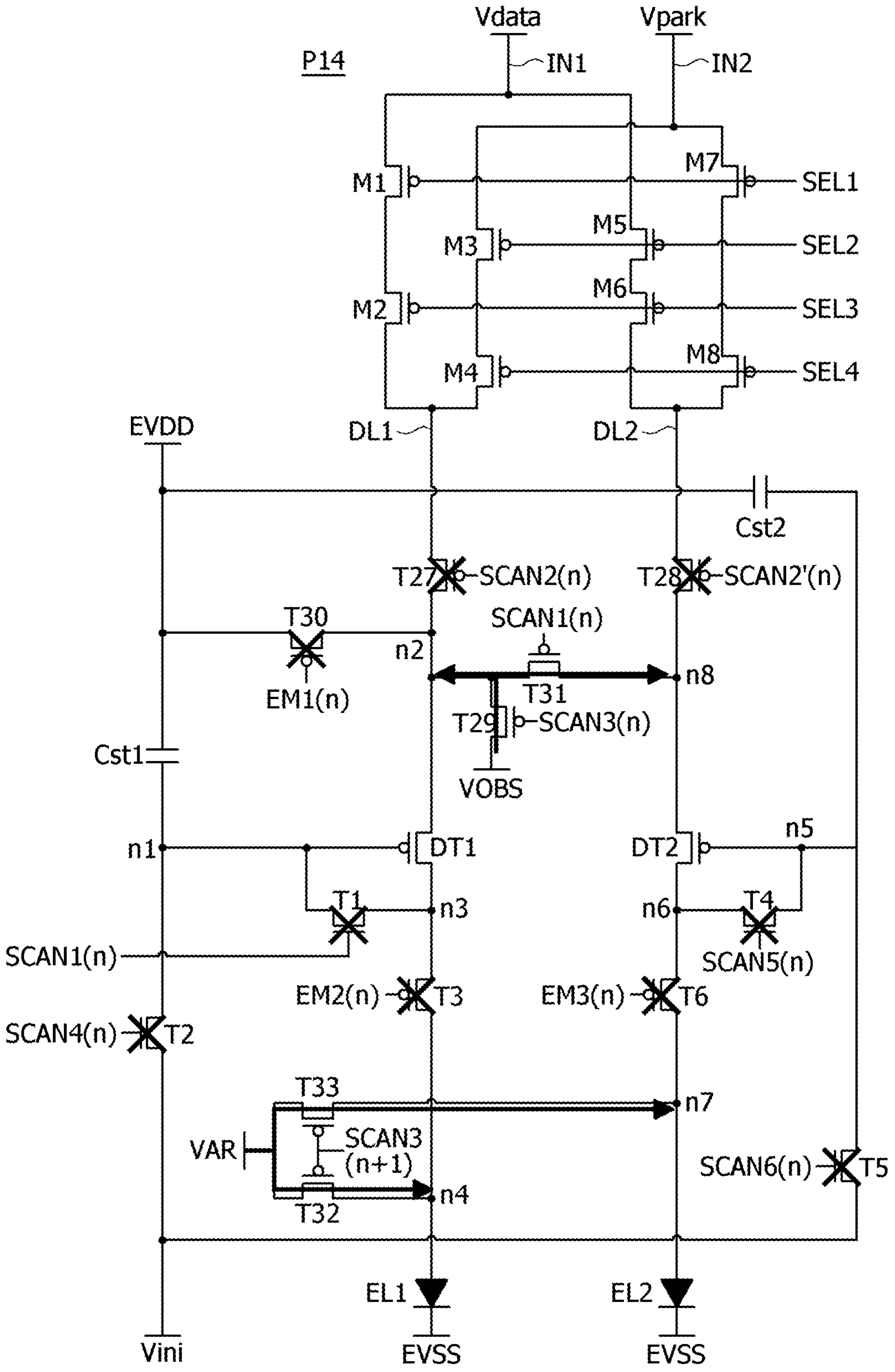
Figure 14E:
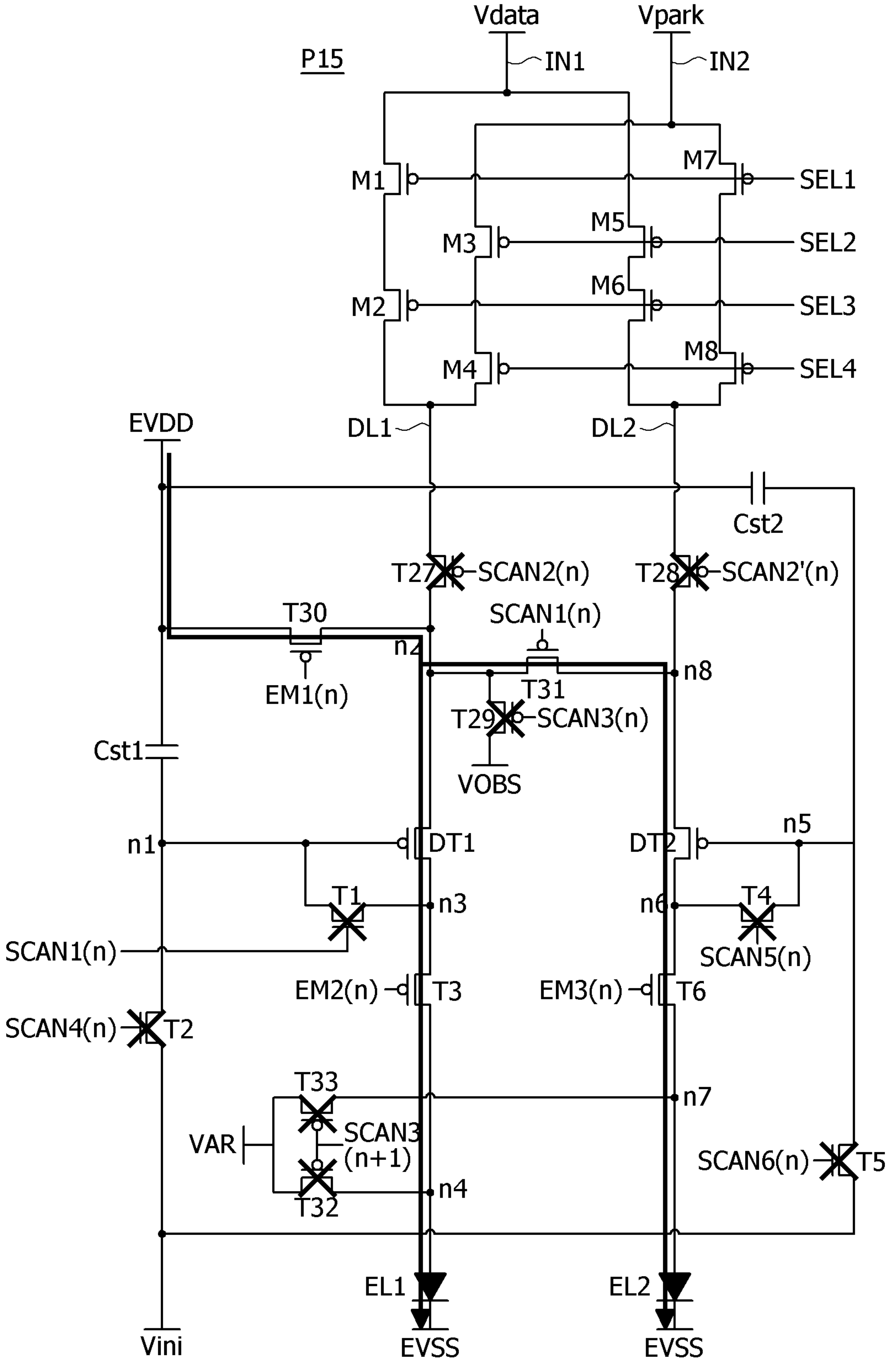

Referring to FIGS. 13 to 14E, the first refresh frame period RFR1 may include the first period P11, the second period P12, the third period P13, the fourth period P14, and the fifth period P15. During the first refresh frame period RFR1, the voltages of the fifth and sixth scan signals SCAN5(*n*) and SCAN6(*n*) that are input to the second driver 20 may be the gate low voltage VGL, and the voltage of the second-second scan signal SCAN2'(*n*) may be the gate high voltage VGH. In this case, during the first refresh frame period RFR1, the switch transistors T4, T5, and T6 of the second driver 20 and the eighth switch transistor T28 are maintained in the off state.

During the first period P11 of the first refresh frame period RFR1, the voltages of the first, fourth, fifth, and sixth scan signals SCAN1(n), SCAN4(n), SCAN5(n), and SCAN6(n) are the gate low voltage VGL. The voltages of the third-first and third-second scan signals SCAN3(n) and SCAN3(n+1) are generated as the pulse of the gate low voltage VGL that is sequentially shifted during the first period P11. The voltages of the second-first scan signal SCAN2(n) and the second-second scan signal SCAN2'(n) are the gate high voltage VGH during the first period P11. The voltages of the EM signals EM1(n), EM2(n), and EM3(n) are the gate high voltage VGH during the first period P11. Accordingly, during the first period P11, as illustrated in FIG. 14A, the ninth, eleventh, twelfth, and thirteenth switch transistors T29, T31, T32, and T33 are turned on, the on-bias voltage VOBS is applied to the second and eighth nodes n2 and n8, and the anode reset voltage VAR is applied to the fourth and seventh nodes n4 and n7.

During the first period P11, as illustrated in FIG. 14A, the switch transistors T1 to T6 of the first and second drivers 10 and 20, the seventh switch transistor T27, the eighth switch transistor T28, and the tenth switch transistor T30 are turned off in response to the gate off voltage (VGH or VGL). During the first period P11, the light-emitting elements EL1 and EL2 do not emit light.

During the second period P12 of the first refresh frame period RFR1, the voltages of the fifth and sixth scan signals SCAN5(n) and SCAN6(n) are the gate low voltage VGL, and the voltages of other gate signals SCAN1(n), SCAN2(n), SCAN2'(n), SCAN3(n), SCAN3(n+1), SCAN4(n), EM1(n), EM2(n), and EM3(n) are the gate high voltage VGH. Accordingly, during the second period P12, as illustrated in FIG. 14B, the first and second switch transistors T1 and T2 are turned on, and the initialization voltage Vini is applied to the first and third nodes n1 and n3. Other switch transistors T3 to T33 are in the off state. During the second period P12, the light-emitting elements EL1 and EL2 do not emit light.

During the third period P13 of the first refresh frame period RFR1, the data switch part 40 supplies the first pixel data voltage Vdata to the first data line DL1, and supplies the park voltage Vpark to the second data line DL2. The selection signals SEL1 to SEL4 that control the transistors M1 to M8 of the data switch part 40 may be updated in the third period P13, and then, may be maintained until the second period P12 of the next refresh frame period RFR1. In another embodiment, during other periods excluding the third periods P13 and P23 of the refresh frame periods RFR1 and RFR2 and first and second periods P31 and P32 of the skip frame period SFR, the voltages of the selection signals SEL1 to SEL4 may be maintained at the gate low voltage VGL turning on the transistors M1 to M8 or may be maintained at the gate high voltage VGH turning off the transistors M1 to M8.

During the third period P13, the voltages of the first, third, and fourth selection signals SEL1, SEL3, and SEL4 are the gate low voltage VGL, and the voltage of the second selection signal SEL2 is the gate high voltage VGH. As a result, as illustrated in FIG. 14C, the first, second, seventh, and eighth transistors M1, M2, M7, and M8 are turned on, the first pixel data voltage Vdata is applied to the first data line DL1, and the park voltage Vpark is applied to the second data line DL2.

During the third period P13, the voltage of the second-first scan signal SCAN2(n) is generated as the pulse of the gate low voltage VGL that is synchronized with the pixel data voltage Vdata. During the third period P13, the voltages of the first, second-second, and third scan signals SCAN1(n), SCAN2'(n), SCAN3(n), and SCAN3(n+1) and the EM signals EM1(n), EM2(n), and EM3(n) are the gate high voltage VGH. During the third period P13, the voltages of the fourth, fifth, and sixth scan signals SCAN4(n), SCAN5(n), and SCAN6(n) are maintained at the gate low voltage VGL. As illustrated in FIG. 14C, when the seventh switch transistor T27 is turned on in response to the gate low voltage VGL of the second-first scan signal SCAN2(n), the first pixel data voltage Vdata is applied to the second node n2. The data voltage Vdata is also applied to the first and third nodes n1 and n3 via the first driving transistor DT1 in the on state. When the third period P13 ends, the voltage of the second node n2 is the data voltage Vdata, and the voltage of each of the first and third nodes n1 and n3 is a voltage corresponding to a sum of the data voltage Vdata and the threshold voltage Vth of the first driving transistor DT1. During the third period P13, the light-emitting elements EL1 and EL2 do not emit light.

During the fourth period P14 of the first refresh frame period RFR1, the voltages of the first, fourth, fifth, and sixth scan signals SCAN1(n), SCAN4(n), SCAN5(n), and SCAN6(n) are the gate low voltage VGL. The voltages of the third-first and third-second scan signals SCAN3(n) and SCAN3(n+1) are generated as the pulse of the gate low voltage VGL that is sequentially shifted during the fourth period P14. The voltages of the second-first scan signal SCAN2(n) and the second-second scan signal SCAN2'(n) are the gate high voltage VGH during the fourth period P14. The voltages of the EM signals EM1(n), EM2(n), and EM3(n) are the gate high voltage VGH during the fourth period P14. Accordingly, during the fourth period P14, as illustrated in FIG. 14D, the ninth, eleventh, twelfth, and thirteenth switch transistors T29, T31, T32, and T33 are turned on, the on-bias voltage VOBS is applied to the second and eighth nodes n2 and n8, and the anode reset voltage VAR is applied to the fourth and seventh nodes n4 and n7.

During the fourth period P14, as illustrated in FIG. 14D, the switch transistors T1 to T6 of the first and second drivers 10 and 20, the seventh switch transistor T27, the eighth switch transistor T28, and the tenth switch transistor T30 are turned off in response to the gate off voltage (VGH or VGL). During the fourth period P14, the light-emitting elements EL1 and EL2 do not emit light.

During the fifth period P15 of the first refresh frame period RFR1, the voltages of the first, fourth, fifth, and sixth scan signals SCAN1(n), SCAN4(n), SCAN5(n), and SCAN6(n) are the gate low voltage VGL, and the voltages of the second and third scan signals SCAN2(n), SCAN2'(n), SCAN3(n), and SCAN3(n+1) are the gate high voltage VGH. During the fifth period P15, the voltages of the first and second EM signals EM1(n) and EM2(n) may be the gate low voltage VGL, and the third EM signal EM3(n) may be the gate high voltage VGH. In this case, during the fifth period P15, the third and tenth switch transistors T3 and T30 are turned on, and light may be emitted. In this case, the first light-emitting element EL1 may emit light with luminance corresponding to the grayscale value of the first pixel data by a current that is generated according to the gate-source voltage Vgs of the first driving transistor DT1 charged in the first capacitor Cst1. During the fifth period P15, other switch transistors T1, T2, T4 to T6, T27, T28, T29, and T31 to T33 excluding the third and tenth switch transistors T3 and T30 may be in the off state.

During the fifth period P15, the voltages of the first, second, and third EM signals EM1(n), EM2(n), and EM3(n) may be the gate low voltage VGL. In this case, during the fifth period P15, as illustrated in FIG. 14E, the third, sixth, and tenth switch transistors T3, T6, and T30 may be turned on, the first light-emitting element EL1 may emit light by a current that is generated according to the gate-source voltage Vgs of the first driving transistor DT1 charged in the first capacitor Cst1, and the second light-emitting element EL2 may emit light by a current that is generated according to the gate-source voltage Vgs of the second driving transistor DT2 charged in the second capacitor Cst2. As a result, in one pixel circuit, the first pixel data can be reproduced with a wide viewing angle and the second pixel data can be reproduced with a narrow viewing angle.

Referring to FIGS. 13 and 15A to 15E, the second refresh frame period RFR2 may include the first period P21, the second period P22, the third period P23, the fourth period P24, and the fifth period P25. During the second refresh frame period RFR2, the voltages of the first and fourth scan signals SCAN1(*n*) and SCAN4(*n*) that are input to the first driver 10 may be the gate low voltage VGL, and the voltage of the second-first scan signal SCAN2(*n*) may be the gate high voltage VGH. In this case, during the second refresh frame period RFR2, the switch transistors T1, T2, and T3 of the first driver 20 and the seventh switch transistor T27 are maintained in the off state.

During the first period P21 of the second refresh frame period RFR2, the voltages of the first, fourth, fifth, and sixth scan signals SCAN1(*n*), SCAN4(*n*), SCAN5(*n*), and SCAN6(*n*) are the gate low voltage VGL. The voltages of the third-first and third-second scan signals SCAN3(*n*) and SCAN3(*n*+1) are generated as the pulse of the gate low voltage VGL that is sequentially shifted during the first period P21. The voltages of the second-first scan signal SCAN2(*n*) and the second-second scan signal SCAN2'(*n*) are the gate high voltage VGH during the first period P21. The voltages of the EM signals EM1(*n*), EM2(*n*), and EM3(*n*) are the gate high voltage VGH during the first period P21. Accordingly, during the first period P21, as illustrated in FIG. 15A, the ninth, eleventh, twelfth, and thirteenth switch transistors T29, T31, T32, and T33 are turned on, the on-bias voltage VOBS is applied to the second and eighth nodes n2 and n8, and the anode reset voltage VAR is applied to the fourth and seventh nodes n4 and n7.

Figure 15A:
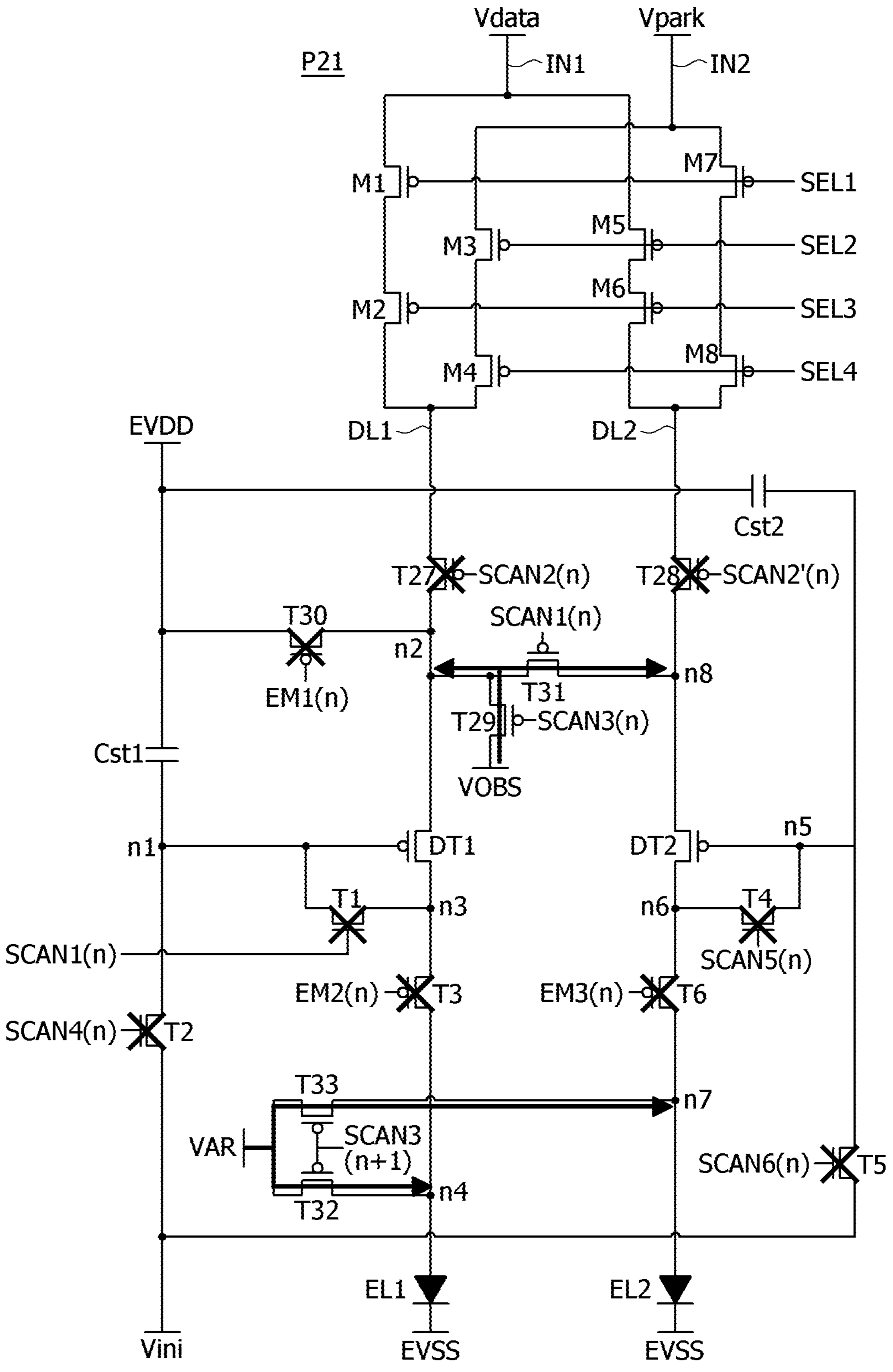
FIGS. 15A to 15E are circuit diagrams illustrating the operation of the pixel circuit illustrated in FIG. 11 during the second refresh frame period in stages.
Figure 16A:
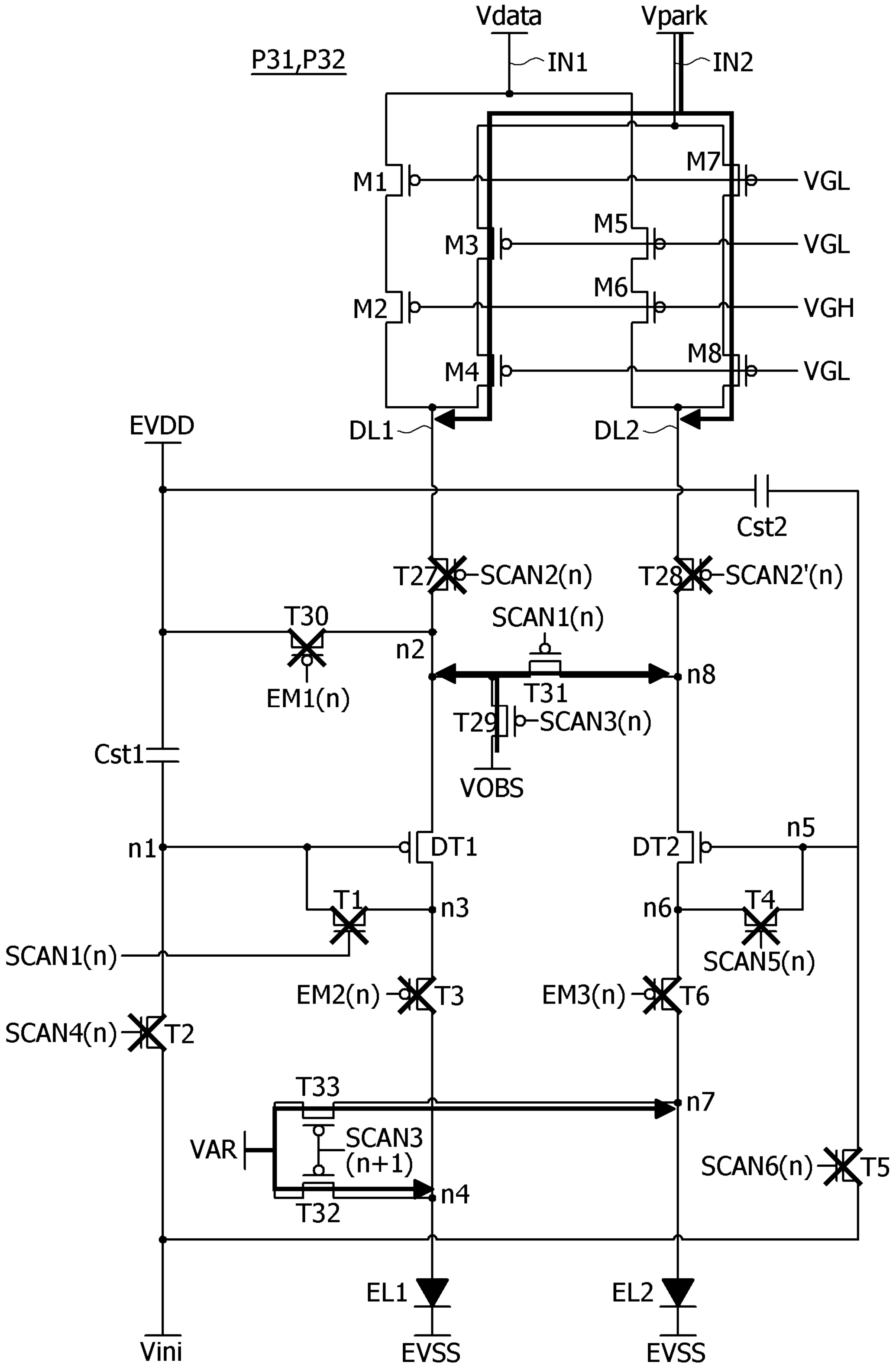
FIGS. 16A and 16B are circuit diagrams illustrating the operation of the pixel circuit illustrated in FIG. 11 during the skip frame period in stages.
Figure 16B:
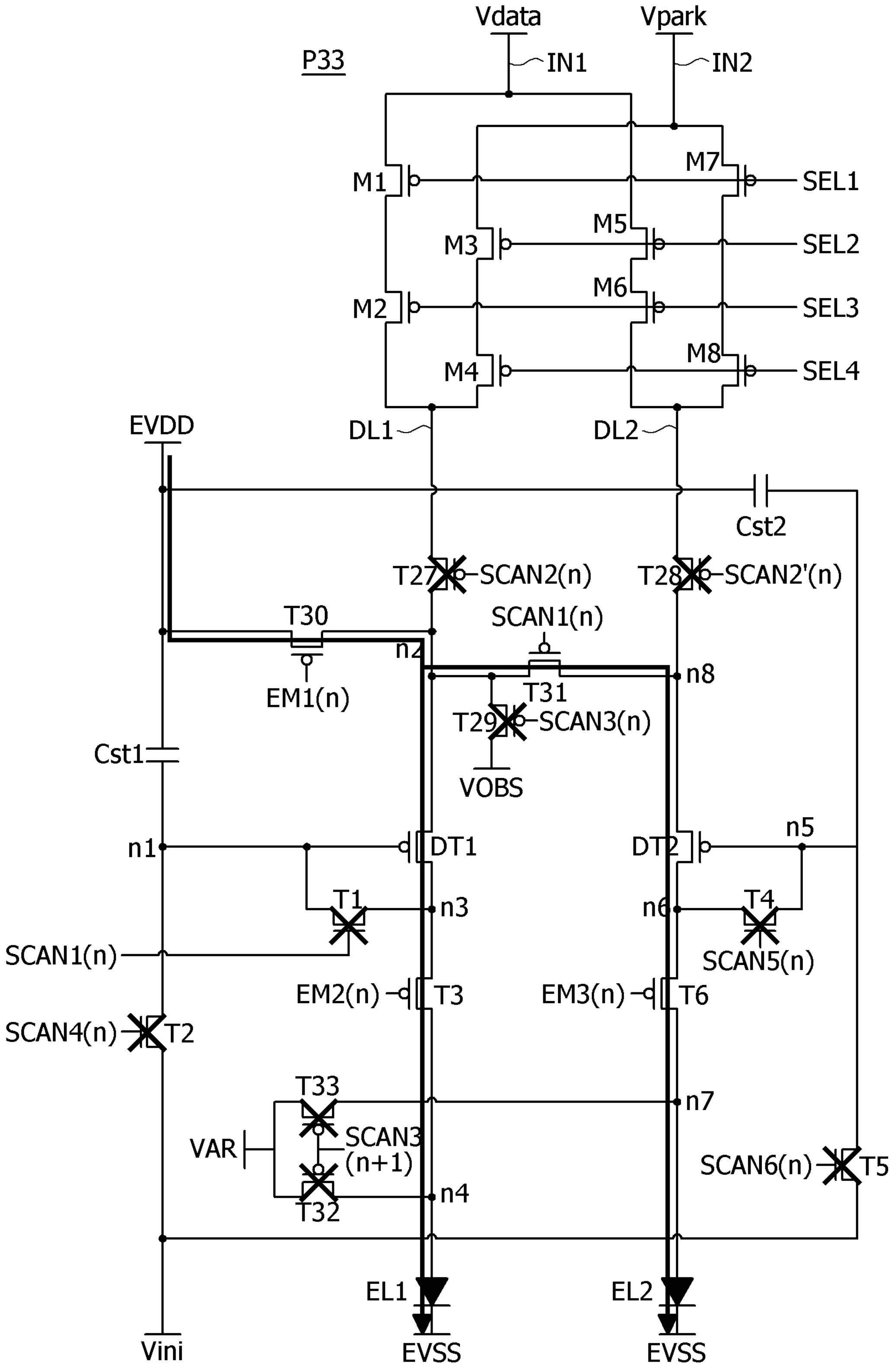

During the first period P21, as illustrated in FIG. 15A, the switch transistors T1 to T6 of the first and second drivers 10 and 20, the seventh switch transistor T27, the eighth switch transistor T28, and the tenth switch transistor T30 are turned off in response to the gate off voltage (VGH or VGL). During the first period P21, the light-emitting elements EL1 and EL2 do not emit light.

Figure 15B:
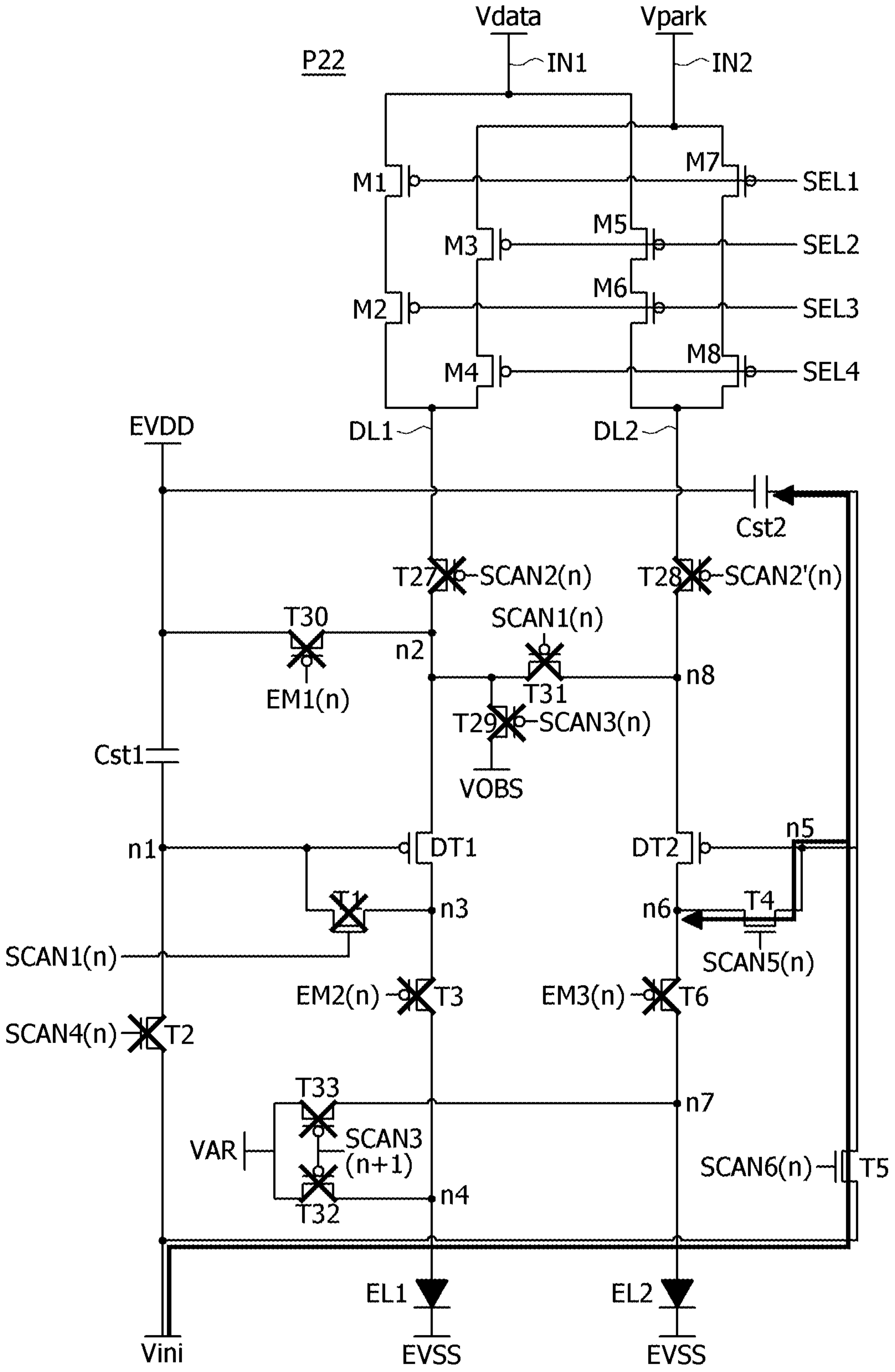

During the second period P22 of the second refresh frame period RFR2, the voltages of the first and fourth scan signals SCAN1(*n*) and SCAN4(*n*) are the gate low voltage VGL, and the voltages of other gate signals SCAN2(*n*), SCAN2'(*n*), SCAN3(*n*), SCAN3(*n*+1), SCAN4(*n*), SCAN5(*n*), SCAN6(*n*), EM1(*n*), EM2(*n*), and EM3(*n*) are the gate high voltage VGH. Accordingly, during the second period P22, as illustrated in FIG. 15B, the fourth and fifth switch transistors T4 and T5 are turned on, and the initialization voltage Vini is applied to the fifth and sixth nodes n5 and n6. Other switch transistors T1, T2, T3, and T6 to T33 are in the off state. During the second period P22, the light-emitting elements EL1 and EL2 do not emit light.

During the third period P23 of the second refresh frame period RFR2, the data switch part 40 supplies the second pixel data voltage Vdata to the second data line DL2 and supplies the park voltage Vpark to the first data line DL1.

Figure 15C:
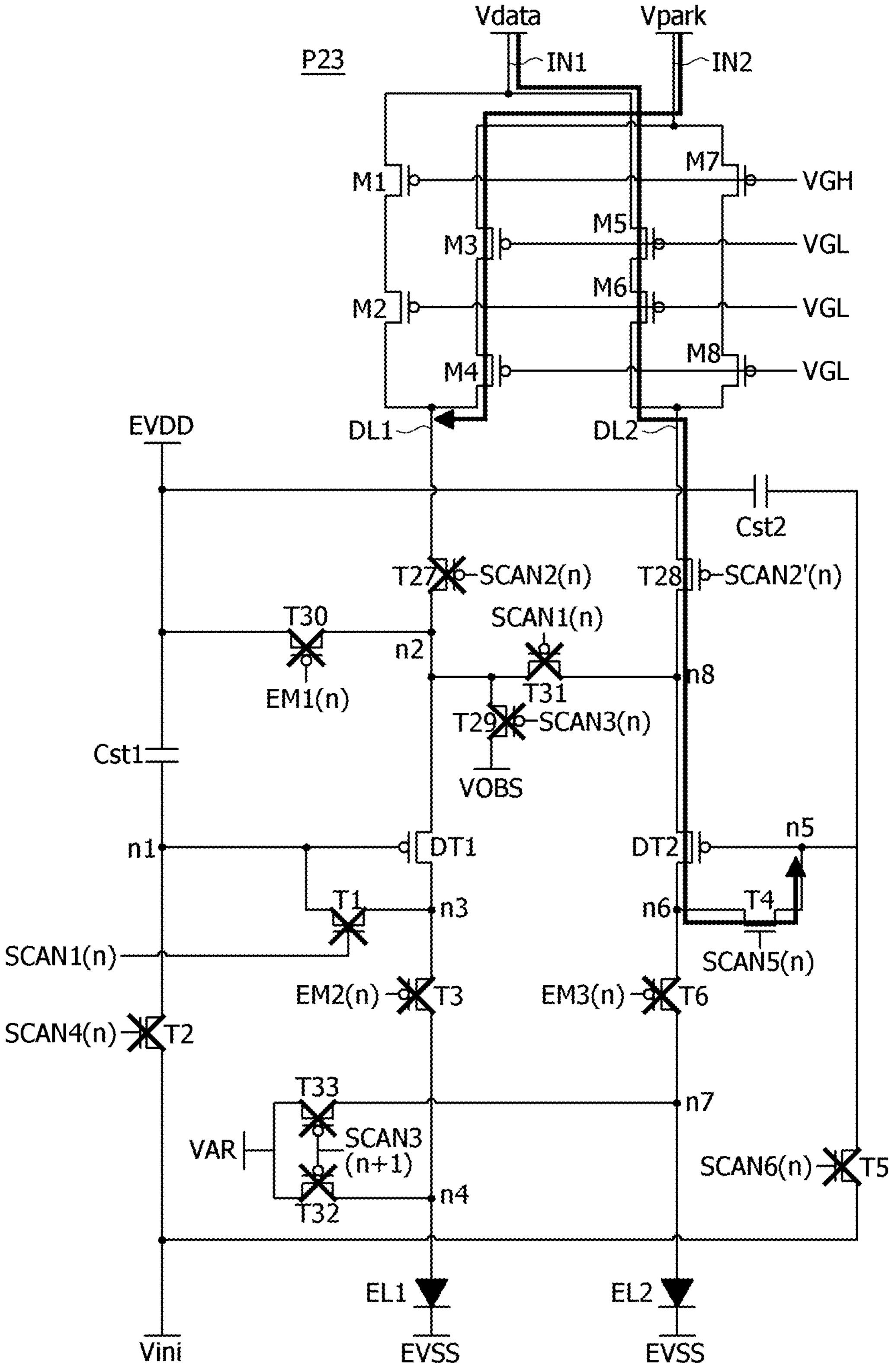

During the third period P23, the voltages of the second, third, and fourth selection signals SEL2, SEL3, and SEL4 are the gate low voltage VGL, and the voltage of the first selection signal SEL1 is the gate high voltage VGH. As a result, as illustrated in FIG. 15C, the third, fourth, fifth, and sixth transistors M3, M4, M5, and M6 are turned on, the second pixel data voltage Vdata is applied to the second data line DL2, and the park voltage Vpark is applied to the first data line DL1.

During the third period P23, the voltage of the second-second scan signal SCAN2'(*n*) is generated as the pulse of the gate low voltage VGL that is synchronized with the second pixel data voltage Vdata. During the third period P23, the voltages of the fifth, second-first, and third scan signals SCAN5(*n*), SCAN2'(*n*), SCAN3(*n*), and SCAN3(*n*+1) and the EM signals EM1(*n*), EM2(*n*), and EM3(*n*) are the gate high voltage VGH. During the third period P23, the voltages of the first, fourth, and sixth scan signals SCAN1(*n*), SCAN4(*n*), and SCAN6(*n*) are maintained at the gate low voltage VGL. As illustrated in FIG. 15C, when the eighth switch transistor T28 is turned on in response to the gate low voltage VGL of the second-second scan signal SCAN2'(*n*), the second pixel data voltage Vdata is applied to the eighth node n8. The data voltage Vdata is also applied to the fifth and sixth nodes n5 and n6 via the second driving transistor DT2 in the on state. When the third period P23 ends, the voltage of the eighth node n8 is the data voltage Vdata, and the voltage of each of the fifth and sixth nodes n5 and n6 is a voltage corresponding to a sum of the data voltage Vdata and the threshold voltage Vth of the second driving transistor DT2. During the third period P23, the light-emitting elements EL1 and EL2 do not emit light.

During the fourth period P24 of the second refresh frame period RFR2, the voltages of the first, fourth, fifth, and sixth scan signals SCAN1(*n*), SCAN4(*n*), SCAN5(*n*), and SCAN6(*n*) are the gate low voltage VGL. The voltages of the third-first and third-second scan signals SCAN3(*n*) and SCAN3(*n*+1) are generated as the pulse of the gate low voltage VGL that is sequentially shifted during the fourth period P24. The voltages of the second-first scan signal SCAN2(*n*) and the second-second scan signal SCAN2'(*n*) are the gate high voltage VGH during the fourth period P14. The voltages of the EM signals EM1(*n*), EM2(*n*), and EM3(*n*) are the gate high voltage VGH during the fourth period P24. Accordingly, during the fourth period P24, as illustrated in FIG. 15D, the ninth, eleventh, twelfth, and thirteenth switch transistors T29, T31, T32, and T33 are turned on, the on-bias voltage VOBS is applied to the second and eighth nodes n2 and n8, and the anode reset voltage VAR is applied to the fourth and seventh nodes n4 and n7.

Figure 15D:
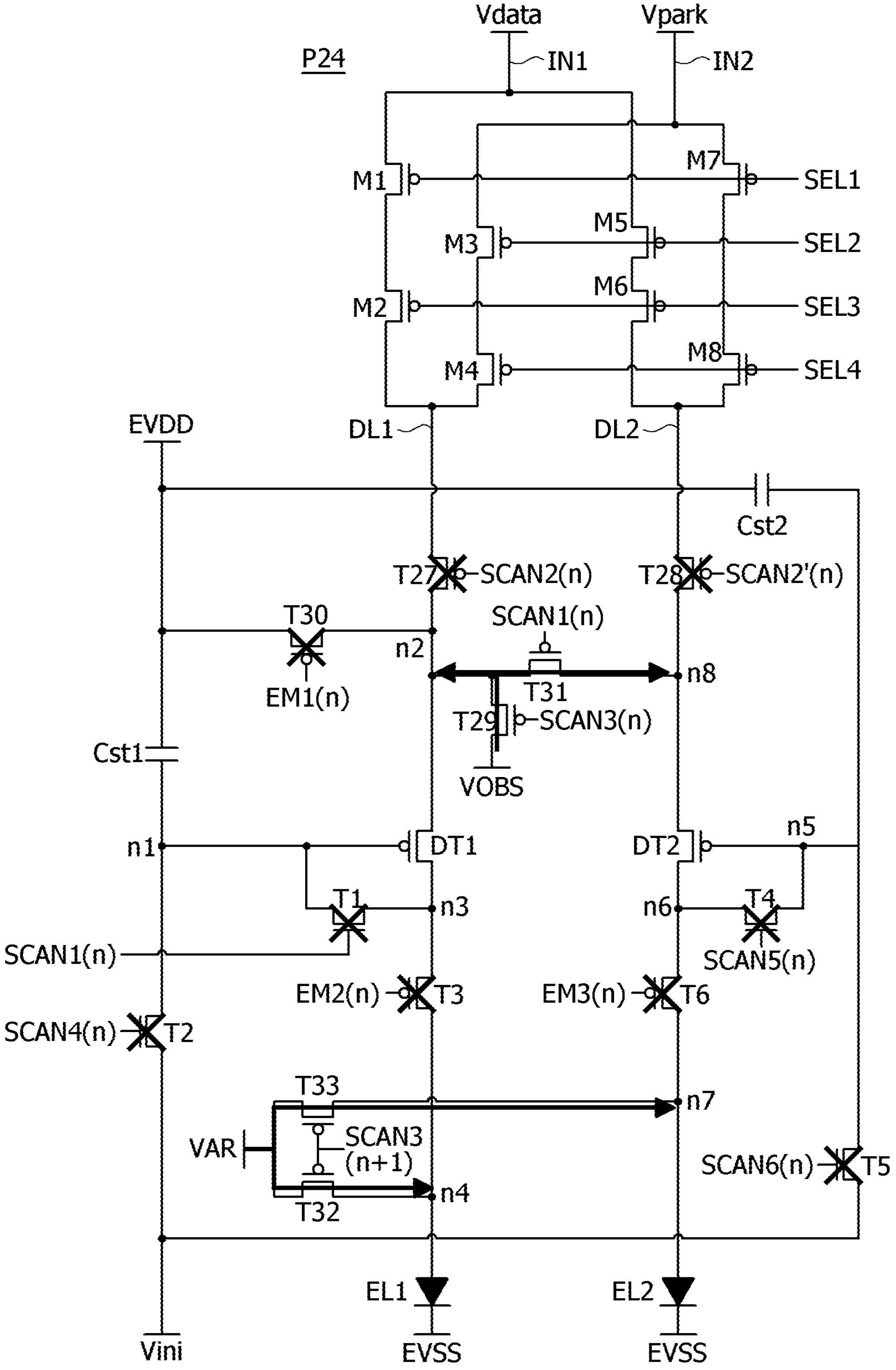

During the fourth period P24, as illustrated in FIG. 15D, the switch transistors T1 to T6 of the first and second drivers 10 and 20, the seventh switch transistor T27, the eighth switch transistor T28, and the tenth switch transistor T30 are turned off in response to the gate off voltage (VGH or VGL). During the fourth period P24, the light-emitting elements EL1 and EL2 do not emit light.

During the fifth period P25 of the second refresh frame period RFR2, the voltages of the first, fourth, fifth, and sixth scan signals SCAN1(*n*), SCAN4(*n*), SCAN5(*n*), and SCAN6(*n*) are the gate low voltage VGL, and the voltages of the second and third scan signals SCAN2(*n*), SCAN2'(*n*), SCAN3(*n*), and SCAN3(*n*+1) are the gate high voltage VGH. During the fifth period P25, the voltages of the first and third EM signals EM1(*n*) and EM3(*n*) may be the gate low voltage VGL, and the voltage of the second EM signal EM2(*n*) may be the gate high voltage VGH. In this case, during the fifth period P25, the sixth and tenth switch transistors T6 and T30 are turned on, and light may be emitted. In this case, the second light-emitting element EL2 may emit light with luminance corresponding to the grayscale value of the second pixel data by a current that is generated according to the gate-source voltage Vgs of the second driving transistor DT2 charged in the second capacitor Cst2. During the fifth period P25, other switch transistors T1 to T6, T27, T28, T29, and T31 to T33 excluding the sixth and tenth switch transistors T6 and T30 may be in the off state.

Figure 15E:
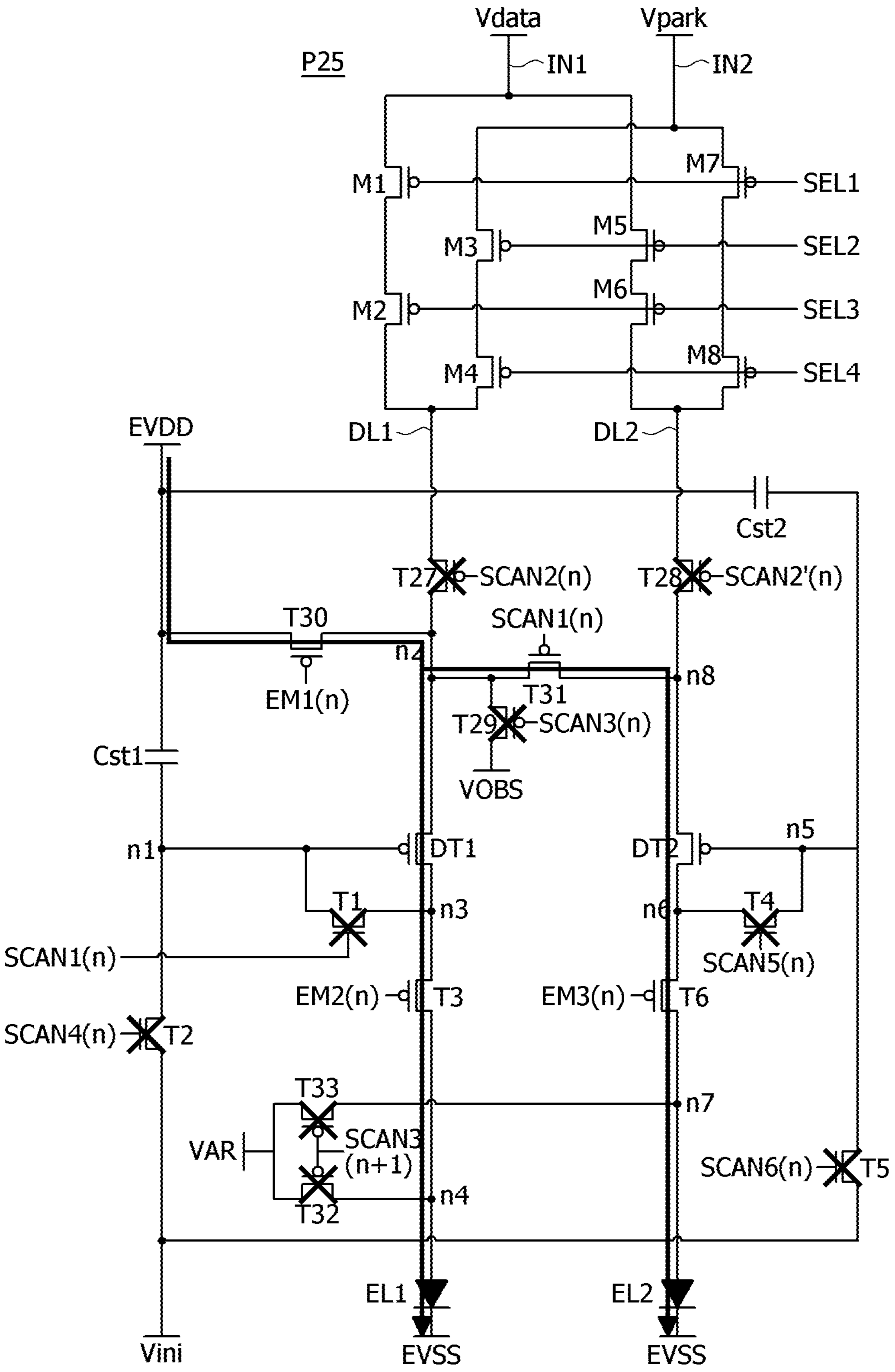

During the fifth period P25, the voltages of the first, second, and third EM signals EM1(*n*), EM2(*n*), and EM3(*n*) may be the gate low voltage VGL. In this case, during the fifth period P25, as illustrated in FIG. 15E, the third, sixth, and the tenth switch transistors T3, T6, and T30 may be turned on, the first light-emitting element EL1 may emit light by a current that is generated according to the gate-source voltage Vgs of the first driving transistor DT1 charged in the first capacitor Cst1, and the second light-emitting element EL2 may emit light by a current that is generated according to the gate-source voltage Vgs of the second driving transistor DT2 charged in the second capacitor Cst2. As a result, in one pixel circuit, the first pixel data can be reproduced with a wide viewing angle and the second pixel data can be reproduced with a narrow viewing angle.

Referring to FIGS. 13, 16A, and 16B, the skip frame period SFR may include a first period P31, a second period P32, and a third period P33. During a period between the first period P31 and the second period P32, all switch transistors T1 to T33 may be turned off and main nodes n1 and n7 may be floated.

During the first and second periods P31 and P32 of the skip frame period SFR, the voltages of the first, fourth, fifth, and sixth scan signals SCAN1(*n*), SCAN4(*n*), SCAN5(*n*), and SCAN6(*n*) may be the gate low voltage VGL, and the voltages of the second scan signals SCAN2(*n*) and SCAN2'(*n*) and the EM signals EM1, EM2, and EM3 may be the gate high voltage VGH. The voltages of the third-first and third-second scan signals SCAN3(*n*) and SCAN3(*n*+1) are generated as the pulse of the gate low voltage VGL that is sequentially shifted during the first period P31. Accordingly, during the first and second periods P31 and P32, the switch transistors T1 to T6 of the first and second drivers 10 and 20, the seventh switch transistor T27, the eighth switch transistor T28, and the tenth switch transistor T30 are turned off. During the first and second periods P31 and P32, as illustrated in FIG. 16A, the ninth, eleventh, twelfth, and thirteenth switch transistors T29, T31, T32, and T33 are turned on, the on-bias voltage VOBS is applied to the second and eighth nodes n2 and n8, and the anode reset voltage VAR is applied to the fourth and seventh nodes n4 and n7.

During the third period P33 of the skip frame period SFR, the voltages of the first, fourth, fifth, and sixth scan signals SCAN1(*n*), SCAN4(*n*), SCAN5(*n*), and SCAN6(*n*) are the gate low voltage VGL, and the voltages of the second and third scan signals SCAN2(*n*), SCAN2'(*n*), SCAN3(*n*), and SCAN3(*n*+1) are the gate high voltage VGH. During the third period P33, the voltages of the first and second EM signals EM1(*n*) and EM2(*n*) may be the gate low voltage VGL, and the voltage of the third EM signal EM3(*n*) may be the gate high voltage VGH. In this case, during the third period P33, the third and tenth switch transistors T3 and T30 are turned on and light may be emitted. In this case, the first light-emitting element EL1 may emit light with luminance corresponding to the grayscale value of the first pixel data by a current that is generated according to the gate-source voltage Vgs of the first driving transistor DT1 charged in the first capacitor Cst1. Meanwhile, during the third period P33, the voltages of the first and third EM signals EM1(*n*) and EM3(*n*) may be the gate low voltage VGL, and the voltage of the second EM signal EM2(*n*) may be the gate high voltage VGH. In this case, during the third period P33, the sixth and tenth switch transistors T6 and T30 may be turned on and light may be emitted. In this case, the second light-emitting element EL2 may emit light with luminance corresponding to the grayscale value of the second pixel data by a current that is generated according to the gate-source voltage Vgs of the second driving transistor DT2 charged in the second capacitor Cst2.

During the third period P33, the voltages of the first, second, and third EM signals EM1(*n*), EM2(*n*), and EM3(*n*) may be the gate low voltage VGL. In this case, during the third period P33, as illustrated in FIG. 16B, the third, sixth, and tenth switch transistors T3, T6, and T30 may be turned, the first light-emitting element EL1 may emit light by a current that is generated according to the gate-source voltage Vgs of the first driving transistor DT1 charged in the first capacitor Cst1, and the second light-emitting element EL2 may emit light by a current that is generated according to the gate-source voltage Vgs of the second driving transistor DT2 charged in the second capacitor Cst2. As a result, in one pixel circuit, the first pixel data can be reproduced with a wide viewing angle and the second pixel data can be reproduced with a narrow viewing angle.

According to one or more embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more embodiments of the present disclosure may be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A display panel, comprising:

a plurality of data lines;

a plurality of gate lines;

a plurality of power lines;

a plurality of mode selection lines; and a plurality of sub-pixels, wherein each of the plurality of sub-pixels includes:

a first light-emitting element;

a second light-emitting element;

a first driver configured to receive a pixel driving voltage, a first pixel data voltage, and a plurality of gate signals that swing between a gate high voltage and a gate low voltage as input and supply a current to the first light-emitting element;

a second driver configured to receive the pixel driving voltage, a second pixel data voltage, and a plurality of gate signals that swing between the gate high voltage and the gate low voltage as input and supply a current to the second light-emitting element; and a shared switch part configured to supply the first pixel data voltage to the first driver and supply the second pixel data voltage to the second driver, wherein the first driver includes:

a first driving transistor that includes a gate electrode connected to a first node, a first electrode connected to a second node, and a second electrode connected to a third node, and is configured to drive the first light-emitting element in a first refresh frame period;

a first capacitor connected between a first voltage node to which the pixel driving voltage is applied and the first node;

a first switch transistor that is connected between the first node and the third node, and is turned on in response to the gate high voltage of a first scan signal and turned off in response to the gate low voltage of the first scan signal;

a second switch transistor that is connected between the first node and a third voltage node to which an initialization voltage is applied, and is turned on in response to the gate high voltage of a fourth scan signal and turned off in response to the gate low voltage of the fourth scan signal; and a third switch transistor that is connected between the third node and a fourth node, and is turned on in response to the gate low voltage of a second light emission signal and turned off in response to the gate high voltage of the second light emission signal, and wherein the first light-emitting element includes an anode electrode connected to the fourth node and a cathode electrode connected to a second voltage node to which a cathode voltage is applied.

2. The display panel according to claim 1, further comprising:

a wide viewing angle lens that overlaps a light emission area of the first light-emitting element; and a narrow viewing angle lens that overlaps a light emission area of the second light-emitting element.

3. The display panel according to claim 1, wherein the second driver includes:

a second driving transistor that includes a gate electrode connected to a fifth node, a first electrode connected to the second node or an eighth node, and a second electrode connected to a sixth node, and is configured to drive the second light-emitting element in a second refresh frame period;

a second capacitor connected between the first voltage node and the fifth node;

a fourth switch transistor that is connected between the fifth node and the sixth node, and is turned on in response to the gate high voltage of a fifth scan signal and turned off in response to the gate low voltage of the fifth scan signal;

a fifth switch transistor that is connected between the fifth node and the third voltage node, and is turned on in response to the gate high voltage of a sixth scan signal and turned off in response to the gate low voltage of the sixth scan signal; and a sixth switch transistor that is connected between the sixth node and a seventh node, and is turned on in response to the gate low voltage of a third light emission signal and turned off in response to the gate high voltage of the third light emission signal, wherein the second light-emitting element includes an anode electrode connected to the seventh node and a cathode electrode connected to the second voltage node.

4. The display panel according to claim 3, wherein the shared switch part includes:

a seventh switch transistor that is connected between one data line and the second node, and is turned on in response to the gate low voltage of a second scan signal and turned off in response to the gate high voltage of the second scan signal;

an eighth switch transistor that is connected between the second node and a fifth voltage node to which an on-bias voltage is applied, and is turned on in response to the gate low voltage of a third-first scan signal and turned off in response to the gate high voltage of the third-first scan signal;

a ninth switch transistor that is connected between the first voltage node and the second node, and is turned on in response to the gate low voltage of a first light emission signal and turned off in response to the gate high voltage of the first light emission signal;

a tenth switch transistor that is connected between the fourth node and a fourth voltage node to which an anode reset voltage is applied, and is turned on in response to the gate low voltage of a third-second scan signal and turned off in response to the gate high voltage of the third-second scan signal; and an eleventh switch transistor that is connected between the seventh node and the fourth voltage node, and is turned on in response to the gate low voltage of the third-second scan signal and turned off in response to the gate high voltage of the third-second scan signal, wherein pulses of the third-first scan signal and the third-second scan signal are sequentially generated as the gate low voltage, wherein the first pixel data voltage is applied to the data line in the first refresh frame period, and the second pixel data voltage is applied to the data line in the second refresh frame period, and wherein the shared switch part is configured to receive the first pixel data voltage and the second pixel data voltage via the data line as input.

5. The display panel according to claim 3, wherein the shared switch part includes:

a seventh switch transistor that is connected between a first data line and the second node, and is turned off in response to the gate low voltage of a second-first scan signal and turned off in response to the gate high voltage of the second-first scan signal;

an eighth switch transistor that is connected between a second data line and the eighth node, and is turned on in response to the gate low voltage of a second-second scan signal and turned off in response to the gate high voltage of the second-second scan signal;

a ninth switch transistor that is connected between the second node and a fifth voltage node to which an on-bias voltage is applied, and is turned on in response to the gate low voltage of a third-first scan signal and turned off in response to the gate high voltage of the third-first scan signal;

a tenth switch transistor that is connected between the first voltage node and the second node, and is turned on in response to the gate low voltage of a first light emission signal and turned off in response to the gate high voltage of the first light emission signal;

an eleventh switch transistor that is connected between the second node and the eighth node, and is turned on in response to the gate low voltage of the first scan signal and turned off in response to the gate high voltage of the first scan signal;

a twelfth switch transistor that is connected between the fourth node and a fourth voltage node to which an anode reset voltage is applied, and is turned on in response to the gate low voltage of a third-second scan signal and turned off in response to the gate high voltage of the third-second scan signal; and a thirteenth switch transistor that is connected between the seventh node and the fourth voltage node, and is turned on in response to the gate low voltage of the third-second scan signal and turned off in response to the gate high voltage of the third-second scan signal, wherein pulses of the third-first scan signal and the third-second scan signal are sequentially generated as the gate low voltage, wherein the eleventh switch transistor is turned on when the first switch transistor is turned off, and the eleventh switch transistor is turned off when the first switch transistor is turned on, and wherein the shared switch part is configured to receive the first pixel data voltage via the first data line and the second pixel data voltage via the second data line.

6. The display panel according to claim 5, further comprising:

a data switch part configured to apply the first pixel data voltage to the first data line and a park voltage to the second data line in the first refresh frame period, and apply the second pixel data voltage to the second data line and the park voltage to the first data line in the second refresh frame period.

7. The display panel according to claim 6, wherein the data switch part includes:

first and second transistors connected in series between a first input node and the first data line;

third and fourth transistors connected in series between a second input node and the first data line;

fifth and sixth transistors connected in series between the first input node and the second data line; and seventh and eighth transistors connected in series between the second input node and the second data line; and wherein the first and seventh transistors are turned on in response to a gate on voltage of a first selection signal from a first selection line among the plurality of mode selection lines, and are turned off in response to a gate off voltage of the first selection signal, wherein the third and fifth transistors are turned on in response to a gate on voltage of a second selection signal from a second selection line among the plurality of mode selection lines, and are turned off in response to a gate off voltage of the second selection signal, wherein the second and sixth transistors are turned on in response to a gate on voltage of a third selection signal from a third selection line among the plurality of mode selection lines, and are turned off in response to a gate off voltage of the third selection signal, and wherein the fourth and eighth transistors are turned on in response to a gate on voltage of a fourth selection signal from a fourth selection line among the plurality of mode selection lines, and are turned off in response to a gate off voltage of the fourth selection signal.

8. The display panel according to claim 3, wherein the shared switch part includes:

a seventh switch transistor that is connected between a first data line and the second node, and is turned on in response to the gate low voltage of a second-first scan signal and turned off in response to the gate high voltage of the second-first scan signal;

an eighth switch transistor that is connected between a second data line and the eighth node, and is turned on in response to the gate low voltage of a second-second scan signal and turned off in response to the gate high voltage of the second-second scan signal;

a ninth switch transistor that is connected between the second node and a fifth voltage node to which an on-bias voltage is applied, and is turned on in response to the gate low voltage of a third-first scan signal and turned off in response to the gate high voltage of the third-first scan signal;

a tenth switch transistor that is connected between the first voltage node and the second node, and is turned on in response to the gate low voltage of a first light emission signal and turned off in response to the gate high voltage of the first light emission signal;

an eleventh switch transistor that is connected between the fourth node and a fourth voltage node to which an anode reset voltage is applied, and is turned on in response to the gate low voltage of a third-second scan signal and turned off in response to the gate high voltage of the third-second scan signal; and a twelfth switch transistor that is connected between the seventh node and the fourth voltage node, and is turned on in response to the gate low voltage of the third-second scan signal and turned off in response to the gate high voltage of the third-second scan signal, and wherein pulses of the third-first scan signal and the third-second scan signal are sequentially generated as the gate low voltage.

9. A display device, comprising:

a display panel including a plurality of data lines, a plurality of gate lines, a plurality of power lines, and a plurality of sub-pixels;

a data driver configured to supply data voltages to the plurality of data lines; and a gate driver configured to supply gate signals to the plurality of gate lines, wherein each of the plurality of sub-pixels includes:

a first light-emitting element;

a second light-emitting element;

a first driver configured to receive a pixel driving voltage, a first pixel data voltage, and a plurality of gate signals that swing between a gate high voltage and a gate low voltage as input and supply a current to the first light-emitting element;

a second driver configured to receive the pixel driving voltage, a second pixel data voltage, and a plurality of gate signals that swing between the gate high voltage and the gate low voltage as input and supply a current to the second light-emitting element; and a shared switch part configured to supply the first pixel data voltage to the first driver and supply the second pixel data voltage to the second driver, wherein the first driver includes:

a first driving transistor that includes a gate electrode connected to a first node, a first electrode connected to a second node, and a second electrode connected to a third node, and is configured to drive the first light-emitting element in a first refresh frame period;

a first capacitor connected between a first voltage node to which the pixel driving voltage is applied and the first node;

a first switch transistor that is connected between the first node and the third node, and is turned on in response to the gate high voltage of a first scan signal and turned off in response to the gate low voltage of the first scan signal;

a second switch transistor that is connected between the first node and a third voltage node to which an initialization voltage is applied, and is turned on in response to the gate high voltage of a fourth scan signal and turned off in response to the gate low voltage of the fourth scan signal; and a third switch transistor that is connected between the third node and a fourth node, and is turned on in response to the gate low voltage of a second light emission signal and turned off in response to the gate high voltage of the second light emission signal, and wherein the first light-emitting element includes an anode electrode connected to the fourth node and a cathode electrode connected to a second voltage node to which a cathode voltage is applied.

10. The display device according to claim 9, further comprising:

a wide viewing angle lens that overlaps a light emission area of the first light-emitting element; and a narrow viewing angle lens that overlaps a light emission area of the second light-emitting element.

11. The display device according to claim 9, wherein the second driver includes:

a second driving transistor that includes a gate electrode connected to a fifth node, a first electrode connected to the second node or an eighth node, and a second electrode connected to a sixth node, and is configured to drive the second light-emitting element in a second refresh frame period;

a second capacitor connected between the first voltage node and the fifth node;

a fourth switch transistor that is connected between the fifth node and the sixth node, and is turned on in response to the gate high voltage of a fifth scan signal and turned off in response to the gate low voltage of the fifth scan signal;

a fifth switch transistor that is connected between the fifth node and the third voltage node, and is turned on in response to the gate high voltage of a sixth scan signal and turned off in response to the gate low voltage of the sixth scan signal; and a sixth switch transistor that is connected between the sixth node and a seventh node, and is turned on in response to the gate low voltage of a third light emission signal and turned off in response to the gate high voltage of the third light emission signal, and wherein the second light-emitting element includes an anode electrode connected to the seventh node and a cathode electrode connected to the second voltage node.

12. The display device according to claim 11, wherein the shared switch part includes:

a seventh switch transistor that is connected between a data line and the second node, and is turned on in response to the gate low voltage of a second scan signal and turned off in response to the gate high voltage of the second scan signal;

an eighth switch transistor that is connected between the second node and a fifth voltage node to which an on-bias voltage is applied, and is turned on in response to the gate low voltage of a third-first scan signal and turned off in response to the gate high voltage of the third-first scan signal;

a ninth switch transistor that is connected between the first voltage node and the second node, and is turned on in response to the gate low voltage of a first light emission signal and turned off in response to the gate high voltage of the first light emission signal;

a tenth switch transistor that is connected between the fourth node and a fourth voltage node to which an anode reset voltage is applied, and is turned on in response to the gate low voltage of a third-second scan signal and turned off in response to the gate high voltage of the third-second scan signal; and an eleventh switch transistor that is connected between the seventh node and the fourth voltage node, and is turned on in response to the gate low voltage of the third-second scan signal and turned off in response to the gate high voltage of the third-second scan signal, and wherein pulses of the third-first scan signal and the third-second scan signal are sequentially generated as the gate low voltage, and wherein the first pixel data voltage is applied to the data line in the first refresh frame period, and the second pixel data voltage is applied to the data line in the second refresh frame period.

13. The display device according to claim 12, wherein one or more of the first light-emitting element and the second light-emitting element are configured to emit light in at least one of the first refresh frame period, the second refresh frame period, and a skip frame period during which pixel data is not updated.

14. The display device according to claim 11, wherein the shared switch part includes:

a seventh switch transistor that is connected between a first data line and the second node, and is turned off in response to the gate low voltage of a second-first scan signal and turned off in response to the gate high voltage of the second-first scan signal;

an eighth switch transistor that is connected between a second data line and the eighth node, and is turned on in response to the gate low voltage of a second-second scan signal and turned off in response to the gate high voltage of the second-second scan signal;

a ninth switch transistor that is connected between the second node and a fifth voltage node to which an on-bias voltage is applied, and is turned on in response to the gate low voltage of a third-first scan signal and turned off in response to the gate high voltage of the third-first scan signal;

a tenth switch transistor that is connected between the first voltage node and the second node, and is turned on in response to the gate low voltage of a first light emission signal and turned off in response to the gate high voltage of the first light emission signal;

an eleventh switch transistor that is connected between the second node and the eighth node, and is turned on in response to the gate low voltage of the first scan signal and turned off in response to the gate high voltage of the first scan signal;

a twelfth switch transistor that is connected between the fourth node and a fourth voltage node to which an anode reset voltage is applied, and is turned on in response to the gate low voltage of a third-second scan signal and turned off in response to the gate high voltage of the third-second scan signal; and a thirteenth switch transistor that is connected between the seventh node and the fourth voltage node, and is turned on in response to the gate low voltage of the third-second scan signal and turned off in response to the gate high voltage of the third-second scan signal, and wherein pulses of the third-first scan signal and the third-second scan signal are sequentially generated as the gate low voltage, and wherein the eleventh switch transistor is turned on when the first switch transistor is turned off, and the eleventh switch transistor is turned off when the first switch transistor is turned on.

15. The display device according to claim 14, further comprising:

a data switch part configured to apply the first pixel data voltage to the first data line and a park voltage to the second data line in the first refresh frame period, and apply the second pixel data voltage to the second data line and the park voltage to the first data line in the second refresh frame period.

16. The display device according to claim 15, wherein the data switch part includes:

first and second transistors connected in series between a first input node and the first data line;

third and fourth transistors connected in series between a second input node and the first data line;

fifth and sixth transistors connected in series between the first input node and the second data line; and seventh and eighth transistors connected in series between the second input node and the second data line, wherein the first and seventh transistors are turned on in response to a gate on voltage of a first selection signal from a first selection line among a plurality of mode selection lines, and are turned off in response to a gate off voltage of the first selection signal, wherein the third and fifth transistors are turned on in response to a gate on voltage of a second selection signal from a second selection line among the plurality of mode selection lines, and are turned off in response to a gate off voltage of the second selection signal, wherein the second and sixth transistors are turned on in response to a gate on voltage of a third selection signal from a third selection line among the plurality of mode selection lines, and are turned off in response to a gate off voltage of the third selection signal, and wherein the fourth and eighth transistors are turned on in response to a gate on voltage of a fourth selection signal from a fourth selection line among the plurality of mode selection lines, and are turned off in response to a gate off voltage of the fourth selection signal.

17. The display device according to claim 11, wherein the shared switch part includes:

a seventh switch transistor that is connected between a first data line and the second node, and is turned on in response to the gate low voltage of a second-first scan signal and turned off in response to the gate high voltage of the second-first scan signal;

an eighth switch transistor that is connected between a second data line and the eighth node, and is turned on in response to the gate low voltage of a second-second scan signal and turned off in response to the gate high voltage of the second-second scan signal;

a ninth switch transistor that is connected between the second node and a fifth voltage node to which an on-bias voltage is applied, and is turned on in response to the gate low voltage of a third-first scan signal and turned off in response to the gate high voltage of the third-first scan signal;

a tenth switch transistor that is connected between the first voltage node and the second node, and is turned on in response to the gate low voltage of a first light emission signal and turned off in response to the gate high voltage of the first light emission signal;

an eleventh switch transistor that is connected between the fourth node and a fourth voltage node to which an anode reset voltage is applied, and is turned on in response to the gate low voltage of a third-second scan signal and turned off in response to the gate high voltage of the third-second scan signal; and a twelfth switch transistor that is connected between the seventh node and the fourth voltage node, and is turned on in response to the gate low voltage of the third-second scan signal and turned off in response to the gate high voltage of the third-second scan signal, and wherein pulses of the third-first scan signal and the third-second scan signal are sequentially generated as the gate low voltage.

* * * * *